United States Patent
Akkarakaran et al.

(10) Patent No.: US 12,022,423 B2
(45) Date of Patent: Jun. 25, 2024

(54) INTEGRATED ACCESS BACKHAUL (IAB) NODE POSITIONING

(71) Applicant: QUALCOMM Incorporated, San Diego, CA (US)

(72) Inventors: Sony Akkarakaran, Poway, CA (US); Navid Abedini, Somerset, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 17/070,214

(22) Filed: Oct. 14, 2020

(65) Prior Publication Data

US 2021/0120517 A1 Apr. 22, 2021

Related U.S. Application Data

(60) Provisional application No. 62/923,319, filed on Oct. 18, 2019, provisional application No. 62/923,395, filed on Oct. 18, 2019.

(51) Int. Cl.
*H04W 64/00* (2009.01)
*G01S 5/02* (2010.01)

(52) U.S. Cl.
CPC ....... *H04W 64/003* (2013.01); *G01S 5/02213* (2020.05); *G01S 5/0242* (2013.01)

(58) Field of Classification Search
CPC . H04W 64/003; G01S 5/02213; G01S 5/0242
See application file for complete search history.

(56) References Cited

U.S. PATENT DOCUMENTS 9,788,262 B2 * 10/2017 Tietz ............... H04W 48/16
10,327,109 B1 6/2019 Maheshwari et al.
(Continued)

FOREIGN PATENT DOCUMENTS

EP 2173130 A1 * 4/2010 .......... H04W 64/003
EP 3471289 A1 * 4/2019 .......... H04B 7/0617

OTHER PUBLICATIONS

"3rd Generation Partnership Project; Technical Specification Group Radio Access Network; NR; Study on Integrated Access and Backhaul; (Release 16)", 3GPP Draft, 38874-G00, 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051576885, pp. 1-111, Retrieved from the Internet: URL: http://www.3gpp.org/ftp/tsg%5Fran/WG2%5FRL2/Specifications/201812%5Ffinal%5Fspecs%5Fafter%5FRAN%5F82/38874%2Dg00%2Ezip, [retrieved on Jan. 11, 2019] Section 9.7, Cited in the Application, Paragraph 6 .1.1 Abstract Section 6.2 IAB Architectures Proposed, p. 13-p. 17 Section 9.7 Topology Adaptation, p. 76-p. 86, 9.2 IAB Topologies, 9.3 Integration of IAB-node, 9.4 Modifications to CU/DU Architecture, 9.4.1 Modifications of IAB-donor/IAB-node, DU and IAB-Donor CU for Architecture Group, 1 72, p. 64-p. 72. Paragraph 7.3.1.
(Continued)

*Primary Examiner* — Muthuswamy G Manoharan
(74) *Attorney, Agent, or Firm* — Procopio, Cory, Hargreaves & Savitch LLP/Qualcomm

(57) ABSTRACT

An integrated access backhaul (IAB) node with an unknown position may use the mobile terminated (MT) function to send or receive reference signals to or from multiple base stations in one or more positioning sessions for positioning of the IAB node. The distributed unit (DU) function may be used additionally, or alternatively, to send or receive reference signals to or from multiple nodes, e.g., user equipments (UEs) or MT functions of downstream IAB nodes. Position-
(Continued)

ing measurements from the reference signals may be sent to a location server, which may determine the position of the IAB node. The location server may further receive an indication of the mobility of the IAB node, which may be used for positioning of UEs, e.g., by excluding information about a mobile IAB node during positioning.

33 Claims, 26 Drawing Sheets

(56) References Cited

U.S. PATENT DOCUMENTS

| | | | |
|---|---|---|---|
| 2010/0331013 A1 | 12/2010 | Zhang | |
| 2014/0274064 A1* | 9/2014 | Al-Shalash | H04W 36/0009 455/437 |
| 2015/0156708 A1* | 6/2015 | Tietz | H04W 64/00 455/434 |
| 2021/0219155 A1* | 7/2021 | Ye | H04L 5/0048 |
| 2021/0227435 A1 | 7/2021 | Hsieh | |
| 2021/0345211 A1* | 11/2021 | Keskitalo | H04W 84/047 |

OTHER PUBLICATIONS

International Search Report and Written Opinion—PCT/US2020/055835—ISA/EPO—Feb. 5, 2021.

Qualcomm Inc (Rapporteur): "IAB NSA," 3GPP Draft, 3GPP TSG RAN WG3 Meeting #100, R3-183563, IAB-NSA, 3rd Generation Partnership Project (3GPP), Mobile Competence Centre, 650, Route Des Lucioles, F-06921, Sophia-Antipolis Cedex, France, vol. RAN WG3, No. Busan, Korea; May 21, 2018-May 25, 2018, May 28, 2018 (May 28, 2018), XP051527689, 8 pages, Retrieved from the Internet: URL: http://www.3gpp.org/ftp/tsg%5Fran/WG3%5Flu/TSGR3%5F100/Docs/R3%2D183563%2Ezip [retrieved on May 28, 2018] paragraph 6.3.1.

* cited by examiner

INTEGRATED ACCESS BACKHAUL (IAB) NODE POSITIONING

CLAIM OF PRIORITY UNDER 35 U.S.C. § 119

This application claims the benefit of U.S. Provisional Application Nos. 62/923,319, entitled "BASE STATION POSITIONING," filed Oct. 18, 2019, and 62/923,395, entitled "INTEGRATED ACCESS BACKHAUL (IAB) NODE POSITIONING," filed Oct. 18, 2019, which are assigned to the assignee hereof and which are expressly incorporated herein by reference in their entireties.

TECHNICAL FIELD

The following relates generally to wireless communications, and more specifically to techniques for supporting location services for user equipments (UEs) in a wireless network.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a positioning engine, e.g., in the UE or external to the UE, such as a location server including a position measurement function (PMF), a Location Management Function (LMF) or Location Management Component (LMC) in a NR network, or a Secure User Plane Location (SUPL) Location Platform (SLP) or Enhanced Serving Mobile Location Center (eS-MLC) in LTE, may determine a position or location of a supported UE using radio access network information. The information may be associated with UE-based positioning techniques or UE-assisted positioning techniques, e.g., in which downlink (DL) reference signal transmissions from one or more base stations may be measured by the UE or uplink reference signal transmissions from the UE may be measured by one or more base stations, and the resulting measurements are used by the UE or the location server to determine the location of the UE. These methods may support various location services (for example, navigation systems, emergency communications), and supplement one or more additional location systems supported by wireless communications devices (such as global positioning system (GPS) technology).

Positioning procedures used to determine the position of a UE using radio access network information assume that the locations of supporting base stations are known to the positioning engine. The locations of the base stations, for example, may be measured offline, e.g., using GPS technology or site-surveys, and are programmed, e.g., stored, in the positioning engine or may be provided to the UE by the location server in positioning assistance data. There are, however, base stations that may have unknown locations. For example, a fully stationary base station may have no GPS receiver or site survey, or the results of the site survey may not be precise. Occasionally mobile base stations, e.g., such as a home router, may be occasionally re-located rendering previously known locations invalid. Fully mobile base stations, such as a mobile integrated access and backhaul (IAB) node, e.g., on a taxi or train, may not have a positioning function or may not have updated its latest position fix.

SUMMARY

An integrated access backhaul (IAB) node with an unknown position may use the mobile terminated (MT) function to send or receive reference signals to or from multiple base stations in one or more positioning sessions for positioning of the IAB node. The distributed unit (DU) function may be used additionally, or alternatively, to send or receive reference signals to or from multiple nodes, e.g., user equipments (UEs) or MT functions of downstream IAB nodes. Positioning measurements from the reference signals may be sent to a location server, which may determine the position of the IAB node. The location server may further receive an indication of the mobility of the IAB node, which may be used for positioning of UEs, e.g., by excluding information about a mobile IAB node during positioning.

In one implementation, a method, on an integrated access backhaul (IAB) node, for positioning of the IAB node, wherein the IAB node comprises a mobile terminated (MT) function and a distributed unit (DU) function, includes sending or receiving messages for one or more positioning sessions to determine a position of the IAB node; and sending or receiving reference signals for positioning of the IAB node to or from multiple nodes in the wireless network in the one or more positioning sessions.

In one implementation, an integrated access backhaul (IAB) node in a wireless network configured to perform positioning for the IAB node, wherein the IAB node comprises a mobile terminated (MT) function and a distributed unit (DU) function, includes an external interface configured to communicate with other nodes in the wireless network; at least one memory; and at least one processor coupled to the external interface and the at least one memory, the at least one processor configured to: send or receive messages for one or more positioning sessions to determine a position of the IAB node; and send or receive reference signals for positioning of the IAB node to or from multiple nodes in the wireless network in the one or more positioning sessions.

In one implementation, an integrated access backhaul (IAB) node in a wireless network configured to perform positioning for the IAB node, wherein the IAB node comprises a mobile terminated (MT) function and a distributed unit (DU) function, includes means for sending or receiving messages for one or more positioning sessions to determine a position of the IAB node; and means for sending or receiving reference signals for positioning of the IAB node to or from multiple nodes in the wireless network in the one or more positioning sessions.

In one implementation, a non-transitory storage medium including program code stored thereon, the program code is operable to configure at least one processor in an integrated access backhaul (IAB) node in a wireless network to perform positioning for the IAB node, wherein the IAB node comprises a mobile terminated (MT) function and a distributed unit (DU) function, the non-transitory storage medium includes program code to send or receive messages for one or more positioning sessions to determine a position of the IAB node; and program code to send or receive reference signals for positioning of the IAB node to or from multiple nodes in the wireless network in the one or more positioning sessions.

In one implementation, a method for positioning for an integrated access backhaul (IAB) node with an unknown position in a wireless network performed by a location server, wherein the IAB node comprises a mobile terminated (MT) function and a distributed unit (DU) function, includes receiving location information from the IAB node, the location information comprising positioning measurements from reference signals received by the IAB node for positioning from multiple nodes in the wireless network; and determining a position for the IAB node using the received location information.

In one implementation, a location server configured to perform positioning for an integrated access backhaul (IAB) node with an unknown position in a wireless network, wherein the IAB node comprises a mobile terminated (MT) function and a distributed unit (DU) function, includes an external interface configured to communicate with other nodes in the wireless network; at least one memory; and at least one processor coupled to the external interface and the at least one memory, the at least one processor configured to: receive location information from the IAB node, the location information comprising positioning measurements from reference signals received by the IAB node for positioning from multiple nodes in the wireless network; and determine a position for the IAB node using the received location information.

In one implementation, a location server configured to perform positioning for an integrated access backhaul (IAB) node with an unknown position in a wireless network, wherein the IAB node comprises a mobile terminated (MT) function and a distributed unit (DU) function, the location server includes means for receiving location information from the IAB node, the location information comprising positioning measurements from reference signals received by the IAB node for positioning from multiple nodes in the wireless network; and means for determining a position for the IAB node using the received location information.

In one implementation, a non-transitory storage medium including program code stored thereon, the program code is operable to configure at least one processor in a location server to perform positioning for an integrated access backhaul (IAB) node with an unknown position in a wireless network, wherein the IAB node comprises a mobile terminated (MT) function and a distributed unit (DU) function, the non-transitory storage medium includes program code to receive location information from the IAB node, the location information comprising positioning measurements from reference signals received by the IAB node for positioning from multiple nodes in the wireless network; and program code to determine a position for the IAB node using the received location information.

In one implementation, a method for positioning a user equipment (UE) performed by a location server, includes receiving from an integrated access backhaul (IAB) node an indication of mobility of the IAB node; using the indication of mobility of the IAB node for positioning of the UE.

In one implementation, a location server configured to perform positioning for a user equipment (UE), includes an external interface configured to communicate with other nodes in the wireless network; at least one memory; and at least one processor coupled to the external interface and the at least one memory, the at least one processor configured to: receive from an integrated access backhaul (IAB) node an indication of mobility of the IAB node; use the indication of mobility of the IAB node for positioning of the UE.

In one implementation, a location server configured to perform positioning for a user equipment (UE), the location server includes means for receiving from an integrated access backhaul (IAB) node an indication of mobility of the IAB node; and means for using the indication of mobility of the IAB node for positioning of the UE.

In one implementation, a non-transitory storage medium including program code stored thereon, the program code is operable to configure at least one processor in a location server to perform positioning for a user equipment (UE), the non-transitory storage medium includes program code to receive from an integrated access backhaul (IAB) node an indication of mobility of the IAB node; and program code to use the indication of mobility of the IAB node for positioning of the UE.

In one implementation, a method for positioning a user equipment (UE) performed by the UE, includes receiving positioning assistance data from a location server including an indication of mobility for an integrated access backhaul (IAB) node; performing positioning measurements from a plurality of base stations, wherein the indication of mobility of the IAB node is used during the positioning measurements.

In one implementation, a user equipment (UE) configured to perform positioning for the UE, includes a wireless transceiver configured to communicate with base stations in a wireless network; at least one memory; and at least one processor coupled to the wireless transceiver and the at least one memory, the at least one processor configured to: receive positioning assistance data from a location server including an indication of mobility for an integrated access backhaul (IAB) node; perform positioning measurements from a plurality of base stations, wherein the indication of mobility of the IAB node is used during the positioning measurements.

In one implementation, a user equipment (UE) configured to perform positioning for the UE, the UE includes means for receiving positioning assistance data from a location server including an indication of mobility for an integrated access backhaul (IAB) node; and means for performing positioning measurements from a plurality of base stations, wherein the indication of mobility of the IAB node is used during the positioning measurements.

In one implementation, a non-transitory storage medium including program code stored thereon, the program code is operable to configure at least one processor in a user equipment (UE) to perform positioning for the UE, the non-transitory storage medium includes program code to receive positioning assistance data from a location server including an indication of mobility for an integrated access backhaul (IAB) node; and program code to perform positioning measurements from a plurality of base stations, wherein the indication of mobility of the IAB node is used during the positioning measurements.

In one implementation, a method for positioning for a base station with an unknown position performed by location server in a wireless network, includes engaging in a plurality of positioning sessions to estimate positions for one or more user equipments (UEs), wherein the base station participates in at least one of the plurality of positioning sessions and at least one of the plurality of positioning sessions includes one or more other base stations having known positions; receiving position measurements associated with the base station and the one or more UEs in each of the plurality of positioning sessions; and determining an estimated position for the base station using the position measurements associated with the base station and the one or more UEs.

In one implementation, a location server configured for positioning of a base station with an unknown position in a wireless network, includes an external interface configured to communicate with other nodes in the wireless network; at least one memory; and at least one processor coupled to the external interface and the at least one memory, the at least one processor configured to: engage in a plurality of positioning sessions to estimate positions for one or more user equipments (UEs), wherein the base station participates in at least one of the plurality of positioning sessions and at least one of the plurality of positioning sessions includes one or more other base stations having known positions; receive position measurements associated with the base station and the one or more UEs in each of the plurality of positioning sessions; and determine an estimated position for the base station using the position measurements associated with the base station and the one or more UEs.

In one implementation, a location server configured for positioning of a base station with an unknown position in a wireless network, includes means for engaging in a plurality of positioning sessions to estimate positions for one or more user equipments (UEs), wherein the base station participates in at least one of the plurality of positioning sessions and at least one of the plurality of positioning sessions includes one or more other base stations having known positions; means for receiving position measurements associated with the base station and the one or more UEs in each of the plurality of positioning sessions; and means for determining an estimated position for the base station using the position measurements associated with the base station and the one or more UEs.

In one implementation, a non-transitory storage medium including program code stored thereon, the program code is operable to configure at least one processor in a location server to perform positioning of a base station with an unknown position in a wireless network, includes program code to engage in a plurality of positioning sessions to estimate positions for one or more user equipments (UEs), wherein the base station participates in at least one of the plurality of positioning sessions and at least one of the plurality of positioning sessions includes one or more other base stations having known positions; program code to receive position measurements associated with the base station and the one or more UEs in each of the plurality of positioning sessions; and program code to determine an estimated position for the base station using the position measurements associated with the base station and the one or more UEs.

In one implementation, a network entity configured for positioning for a node having an unknown position in a wireless network, includes an external interface configured to communicate with other nodes in the wireless network; at least one memory; and at least one processor coupled to the external interface and the at least one memory, the at least one processor configured to: send a command to a user equipment (UE) instructing the UE to perform a positioning measurement with the node, wherein the node comprises one of a base station or another UE.

In one implementation, a network entity configured for positioning for a node having an unknown position in a wireless network, includes means for sending a command to a user equipment (UE) instructing the UE to perform a positioning measurement with the node, wherein the node comprises one of a base station or another UE.

In one implementation, a non-transitory storage medium including program code stored thereon, the program code is operable to configure at least one processor in a network entity configured for positioning for a node having an unknown position in a wireless network, includes program code to send a command to a user equipment (UE) instructing the UE to perform a positioning measurement with the node, wherein the node comprises one of a base station or another UE.

In one implementation, a method for positioning for a node having an unknown position in a wireless network performed by a user equipment (UE), includes receiving a command from a network entity in the wireless network, the command instructing the UE to perform a positioning measurement with the node, wherein the node comprises one of a base station or another UE; and performing a position measurement with the node.

In one implementation, a user equipment (UE) configured for positioning for a node having an unknown position in a wireless network, includes an external interface configured to communicate with other nodes in the wireless network; at least one memory; and at least one processor coupled to the external interface and the at least one memory, the at least one processor configured to: receiving a command from a network entity in the wireless network, the command instructing the UE to perform a positioning measurement with the node, wherein the node comprises one of a base station or another UE; and performing a position measurement with the node.

In one implementation, a user equipment (UE) configured for positioning for a node having an unknown position in a wireless network, includes means for receiving a command from a network entity in the wireless network, the command instructing the UE to perform a positioning measurement with the node, wherein the node comprises one of a base station or another UE; and means for performing a position measurement with the node.

In one implementation, a non-transitory storage medium including program code stored thereon, the program code is operable to configure at least one processor in a user equipment (UE) configured for positioning for a node having an unknown position in a wireless network, includes program code to receive a command from a network entity in the wireless network, the command instructing the UE to perform a positioning measurement with the node, wherein the node comprises one of a base station or another UE; and program code to perform a position measurement with the node.

In one implementation, a method for positioning for a base station having an unknown position in a wireless network performed by the base station, includes receiving a request for capability of performing positioning procedures to determine a position of the base station; and responding to the request indicating the capability of performing positioning procedures to determine the position of the base station.

In one implementation, a base station configured for positioning the base station which has an unknown position in a wireless network, includes an external interface configured to communicate with other nodes in the wireless network; at least one memory; and at least one processor coupled to the external interface and the at least one memory, the at least one processor configured to: receive a request for capability of performing positioning procedures to determine a position of the base station; and respond to the request indicating the capability of performing positioning procedures to determine the position of the base station.

In one implementation, a base station configured for positioning the base station which has an unknown position in a wireless network, includes means for receiving a request for capability of performing positioning procedures to determine a position of the base station; and means for responding to the request indicating the capability of performing positioning procedures to determine the position of the base station.

In one implementation, a non-transitory storage medium including program code stored thereon, the program code is operable to configure at least one processor in base station configured for positioning the base station which has an unknown position in a wireless network, includes program code to receive a request for capability of performing positioning procedures to determine a position of the base station; and program code to respond to the request indicating the capability of performing positioning procedures to determine the position of the base station.

DETAILED DESCRIPTION

In location determination, positioning procedures such as Observed Time Difference of Arrival (OTDOA), Round Trip Time (RTT), Angle of Arrival (AoA), Angle of Departure (AoD), etc., may be used to determine the position of user equipment (UE). Positioning procedures rely on positioning measurements of DL or UL reference signals that is performed by the UE and/or base stations to determine a distance between a UE and a base station, a difference in distance from the UE to two or more base stations, an angle with respect to one or more base stations, etc. Based on knowledge of the positions of the base stations, the position of the UE can be determined using the positioning measurements.

Some base stations, however, may not have a known position. For example, some base stations may be mobile and may have moved since a position was last determined. Additionally, some base stations may not a capability to determine its own position, e.g., base stations may not have a Global Navigation Satellite System (GNSS) receiver. While site surveys may be used to map the positions of base stations, some base stations may not have been included in a site survey, or if they were included, the site survey may be inaccurate and the resulting positions of positions may be unreliable. Base stations without known positions are not useful for position determination of a UE.

One type of base station that is being considered for wireless communication systems, e.g., 5G NR network that uses Next-Generation Node Bases (referred to as a gNB) base station, is an Integrated Access and Backhaul (IAB) node that uses a wireless backhaul connection to another baes station (gNB), i.e., referred to as an IAB donor, which has a wired connection to the core network. In high frequency deployments, e.g., millimeter wave (mmWave) frequencies, prolific deployment of IAB nodes may help compensate for sever path and penetration losses due to the high frequency spectrum, and alleviate the difficulties of provisioning wired (eg, fiber-based) backhaul to such a dense deployment of base stations. Moreover, some IAB nodes may be mobile, e.g., located on vehicles, such as taxis or trains.

Accordingly, techniques and procedures that may be associated with determining the position of mobile base stations, such as mobile IAB nodes, may be desirable so that positioning of a UE may be performed using reference signals from the IAB nodes.

Figure 1:
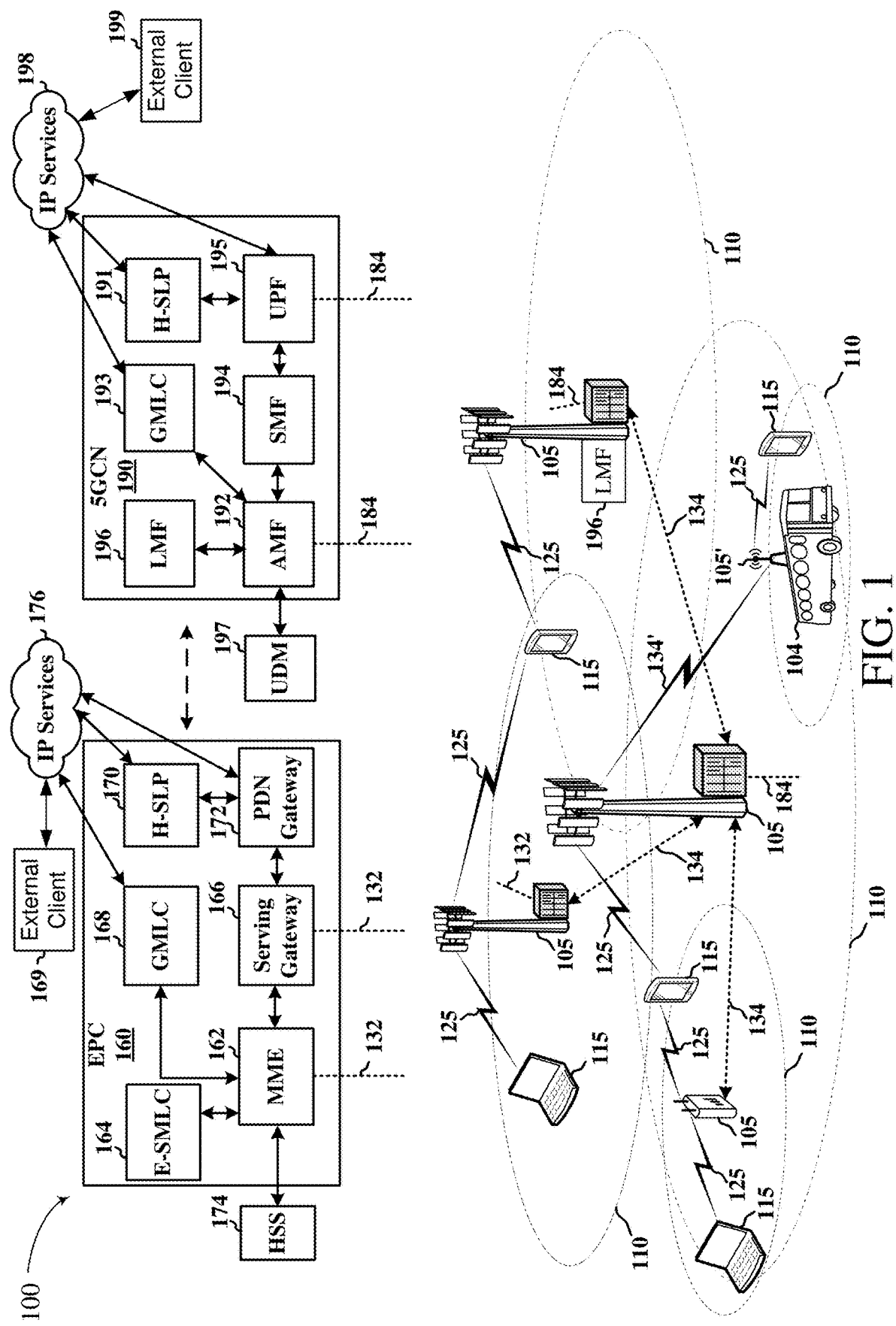
FIG. 1 illustrates an example of a wireless communications system that supports one or more aspects of the present disclosure.

FIG. 1 illustrates an example of a wireless communications system 100 in accordance with one or more aspects of the present disclosure. The wireless communications system 100 includes base stations 105, UEs 115, and one or more core networks, illustrated as an Evolved Packet Core (EPC) 160 and a Fifth Generation Core (5GC) 190. While two core networks are shown the wireless communications system may use only one core network, e.g., the 5GC 190. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 115. Examples of UEs 115 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 115 may be referred to as IoT devices (such as a parking meter, gas pump, toaster, vehicles, heart monitor, etc.). Some of the UEs 115 may be referred to as IIoT devices, such as sensors, instruments, and other devices networked together, in an industrial application. The UE 115 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The locations of base stations 105 may be known, e.g., by measuring offline, using a Global Navigation Satellite System (GNSS) such as GPS, or a site-survey. The known locations of base stations 105 may be stored in a location server, such as the LMF 196 in 164/1965GC 190, for positioning of UEs 115. The locations of some base stations 105, however, may be unknown. For example, some base stations 105 may have no positioning function. For example, some base stations 105 may have no GNSS receiver or positioning function. Fully stationary base stations 105 may have no site survey or an inaccurate site survey. Occasionally mobile base stations 105, such as a home router, may be occasionally moved, and the location may not be updated. Fully mobile base stations 105, such as mobile integrated access and backhaul (IAB) nodes, e.g., on vehicles, may have no positioning function or may not have updated its current location. For example, as illustrated in FIG. 1, base station 105' on vehicle 104 may be a mobile IAB node, while the base station 105 with which IAB node 105' communicates with via backhaul link 134' is the IAB-donor.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the EPC 160 and/or 5GC 190 and with one another. For example, base stations 105 may interface with their respective core networks through backhaul links (for example, via an S1, N2, N3, or other interface). For example, eNB base stations 105 may interface with EPC 160 via backhaul links 132, while gNB base stations 105 may interface with 5GC 190 via backhaul links 184. Base stations 105 may communicate with one another over backhaul links 134 (for example, via an X2, Xn, or other interface) either directly (for example, directly between base stations 105) or indirectly (for example, via core network or intermediate base stations). The backhaul links 134 may be wired or may be wireless, as illustrated by backhaul link 134 to movable base station 105'.

The core networks 160/190 may provide user authentication, access authorization, tracking, Internet Protocol (IP) connectivity, and other access, routing, or mobility functions.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 115 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 115 and the 5GC 190 and which, for positioning functionality, may communicate with the LMF 196, which may support location determination of UEs. In some implementations, the LMF 196 may be co-located with a base station 105 in the NG-RAN and may be referred to as a Location Management Component (LMC). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198. The IP Services 198 may include the Internet, an intranet, an IP Multimedia Subsystem (IMS), a PS Streaming Service, and/or other IP services.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 160/190 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling duration of $T_s=1/30,720,000$ seconds. Time intervals of a communications resource may be organized according to radio frames each having a duration of 10 milliseconds (ms), where the frame duration may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol duration may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, etc.) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (for example, set of subcarriers or RBs) within a carrier (for example, "in-band" deployment of a narrowband protocol type).

In a system employing MCM techniques, a resource element may consist of one symbol duration (for example, a duration of one modulation symbol) and one subcarrier, where the symbol duration and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, etc.) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

As described herein, wireless communications system 100 may be an NR system and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105, or as part of a mobility or beam management procedure for directional transmission associated with the enhanced channel resources.

A base station 105 may configure a CSI-RS transmission on one or more CSI-RS resources of the channel. A CSI-RS resource may start at any OFDM symbol of a slot and occupy one or more symbols depending on a configured number of ports. For example, a CSI-RS resource may span one symbol of a slot and contain one port for transmission. The one or more CSI-RS resources may span a number of CSI-RS resource sets configured according to a CSI-RS resource setting of the base station 105. The structure of the one or more CSI-RS resources, CSI-RS resource sets, and CSI-RS resource settings within a CSI-RS transmission may be referred to as a multi-level resource setting. For example, a multi-level CSI-RS resource setting of the base station 105 may include up to 16 CSI-RS resource sets and each CSI-RS resource set may contain up to 64 CSI-RS resources. In some examples, the base station 105 may support a configured number of distinct CSI-RS resources (for example, 128) over one or more CSI-RS resource sets.

In some examples, a base station 105 may provide an indication (such as the tag "Repetition=ON") associated with a CSI-RS transmission directed to a UE 115. The indication may define whether the UE 115 may assume the included CSI-RS resources within the reference signal (for example, a non-zero power (NZP) CSI-RS transmission) are associated with the same downlink spatial domain transmission filter and correspond to a single transmit beam at the base station 105. The indication may be configured according to a higher layer signaling parameter (for example, report Quantity) associated with all the reporting settings linked with the CSI-RS resource set. For example, the base station 105 may configure the reportQuantity parameter to a set indication (for example "cri-RSRP", "none", etc.) that indicates a single transmit beam.

At reception, the UE 115 may identify the configured set indication associated with the received higher layer signaling parameter. In some examples (such as "cri-RSRP" reporting), the UE 115 may determine CSI parameters for the one or more CSI-RS resources and report the measurements according to a refined reporting configuration. For example, the UE 115 may determine CSI parameters (for example, RSRP values) for the one or more channel resources. The UE 115 may then condition the reporting according to a configured channel resource indicator (CRI) value, as one example, where the CRI value corresponds to an index of a resource entry associated with the one or more CSI-RS resources in a corresponding CSI-RS resource set for channel measurement.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems, emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Wireless communications system 100 may be or include a multicarrier beamformed communication system, such as a mmW wireless communication system. Aspects of wireless communications system 100 may include use of PRS transmissions by the base station 105 or sounding reference signal (SRS) transmissions by the UE 115 for UE location determination. For downlink-based UE location determination, a location server 164/196, e.g., LMF 196 in a NR network or E-SMLC 164 in LTE (sometimes referred to as location server 164/196164/196), may be used to provide PRS assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques. 164/196

A position estimation of a node may be determined by a location server 164/196164/196, using measurements obtained from reference signals, e.g., PRS signals from one or more base stations, SRS signals from the UE or both PRS signals and SRS signals. For example, downlink (DL) based positioning methods include DL Time Difference of Arrival (DL-TDOA), DL Angle of Departure (DL AoD), Enhanced Cell ID (ECID); uplink (UL) based positioning methods may include UL Time Difference of Arrival (UL-TDOA), UL Angle of Arrival (UL AoA), UL Relative Time of Arrival (UL-RTOA); and DL and UL based positioning methods include Round-trip time (RTT) with one or more neighboring base stations, e.g., multi-RTT.

Additionally, RAT independent techniques may be used to estimate a position of the UE 115. For example, the communications system 100 may further utilize information from space vehicles (SVs) (not illustrated) for a Global Navigation Satellite System (GNSS) like GPS, GLONASS, Galileo or Beidou or some other local or regional Satellite Positioning System (SPS) such as IRNSS, EGNOS or WAAS. Location related measurements obtained by UE 115 may include measurements of signals received from the SVs and/or may include measurements of signals received from terrestrial transmitters fixed at known locations (e.g., such as base stations 105). The UE 115 or location server 164/196 to which UE 115 may send the measurements, may then obtain a location estimate for the UE 115 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 115 relative to three or more terrestrial transmitters (e.g. base stations 105) fixed at known locations or relative to four or more SVs with accurately known orbital data, or combinations thereof, based at least in part, on pilots, positioning reference signals (PRS) or other positioning related signals transmitted by the transmitters or satellites and received at the UE 115.

An "RF signal" comprises an electromagnetic wave that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

The term "position estimate" is used herein to refer to an estimate of a position for an entity, e.g., a base station 105 or UE 115, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square).

A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

Figure 2:
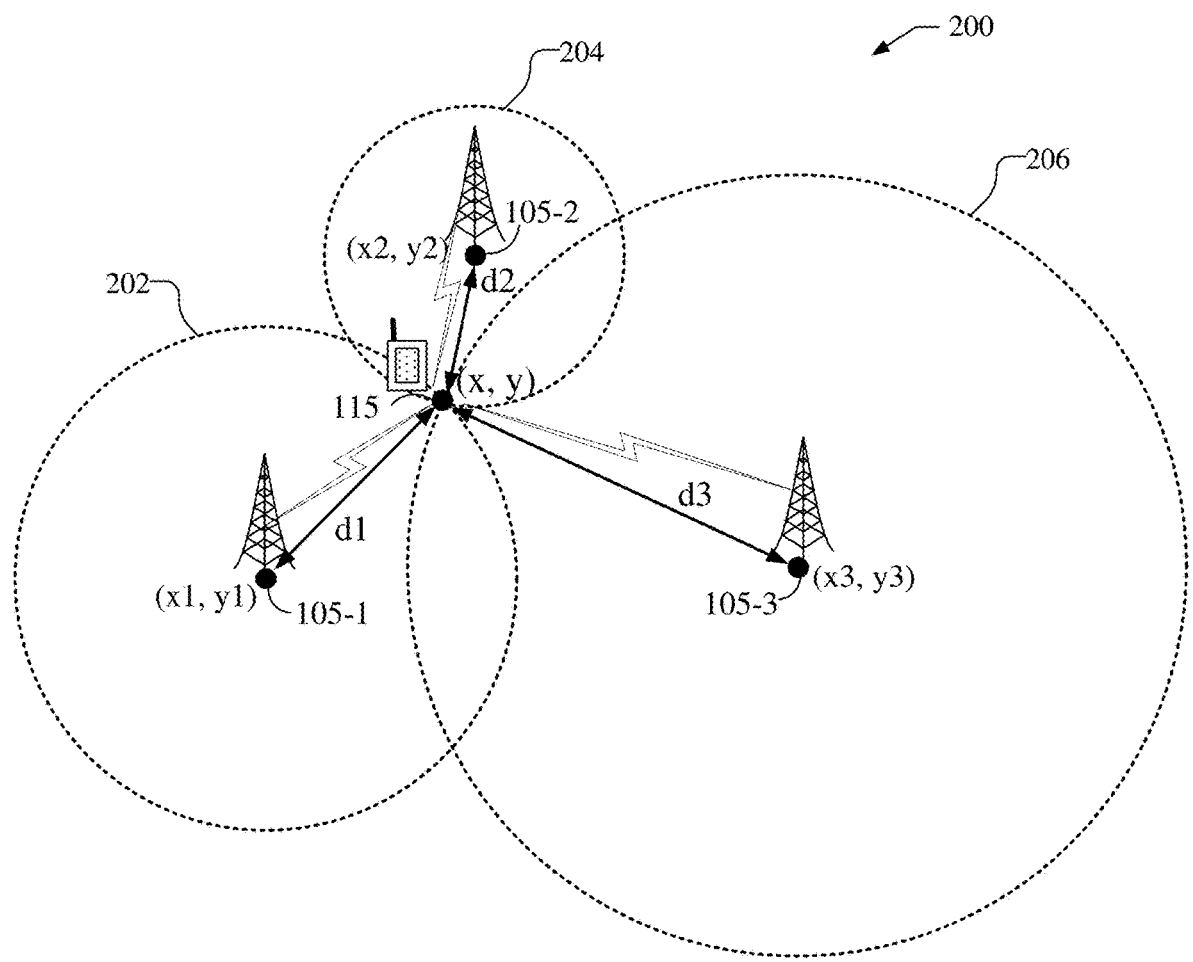
FIG. 2 illustrates a simplified environment and an exemplary technique for determining a position of a node.

FIG. 2 illustrates a simplified environment 200 and an exemplary technique for determining a position of a node, for example, UE 115. The UE 115 may communicate wirelessly with a plurality of base stations 105-1, 105-2, 105-3 (sometimes collectively referred to as base stations 105) using radio frequency (RF) signals and standardized protocols for the modulation of the RF signals and the exchanging of information packets. By extracting different types of information from the exchanged signals, and utilizing the layout of the network (i.e., the network geometry), the position of the UE 115 may be determined in a predefined reference coordinate system. As shown in FIG. 2, the position (x, y) of the UE 115 may be specified using a two-dimensional coordinate system; however, the aspects disclosed herein are not so limited, and may also be applicable to determining positions using a three-dimensional coordinate system, if the extra dimension is desired. Additionally, while three base stations are shown in FIG. 2, aspects may utilize additional base stations or other UEs.

In order to determine the position (x, y) of the UE 115, the UE 115 or location server 164/196 may need to know the network geometry. The network geometry may include the positions of each of the base stations 105 in a reference coordinate system ((xk, yk), where k=1, 2, 3). The network geometry may be stored by the location server 164/196 and may be provided to the UE 115 in any manner, such as, for example, providing this information in beacon signals, providing the information using a dedicated server external on an external network, providing the information using uniform resource identifiers, etc.

The distance (dk, where k=1, 2, 3) between the UE 115 and each of the base stations 105-$k$ may be determined, e.g. by the UE 115, base station 105 or a combination thereof. As will be described in more detail below, there are a number of different approaches for estimating these distances (dk) by exploiting different characteristics of the RF signals exchanged between the UE 115 and base stations 105-1, 105-2, 105-3. Such characteristics may include, as will be discussed below, reception and transmission time (Rx-Tx), the round trip time (RTT) of the signals, and/or the strength of the signals (RSSI).

In other aspects, the distances (dk) may in part be determined or refined using other sources of information that are not associated with the base stations 105. For example, other positioning systems, such as GPS, may be used to provide a rough estimate of dk. (Note that it is likely that GPS may have insufficient signal strength in the anticipated operating environments (indoors, metropolitan, etc.) to provide a consistently accurate estimate of dk. However, GPS signals may be combined with other information to assist in the position determination process.) Other relative positioning devices may reside in the UE 115 which can be used as a basis to provide rough estimates of relative position and/or direction (e.g., on-board accelerometers).

Once each distance dk is determined, the position of the UE 115 may then be determined using a variety of known geometric techniques, such as, for example, trilateration.

From FIG. 2, it can be seen that the position of the UE 115 ideally lies at the common intersection of all of the circles 202, 204, and 206 drawn using dotted lines. Each circle being defined by radius dk and center (xk, yk), where k=1, 2, 3. In practice, the intersection of these circles may not lie at a single point due to the noise and other errors in the networking system.

Determining the distance between the UE 115 and each base station 105 may involve exploiting time information of the RF signals. In an aspect, determining the Rx-Tx or RTT of signals exchanged between the UE 115 and any base station can be performed and converted to a distance (dk). Rx-Tx techniques determine the time between the time of transmission of a signal and the time of reception of the signal. RTT techniques can measure the time between sending a signaling message and receiving a response. These methods may utilize calibration to remove any processing delays. In some environments, it may be assumed that the processing delays for the UE 115 and the base stations 105 are the same. However, such an assumption may not be true in practice.

Figure 3:
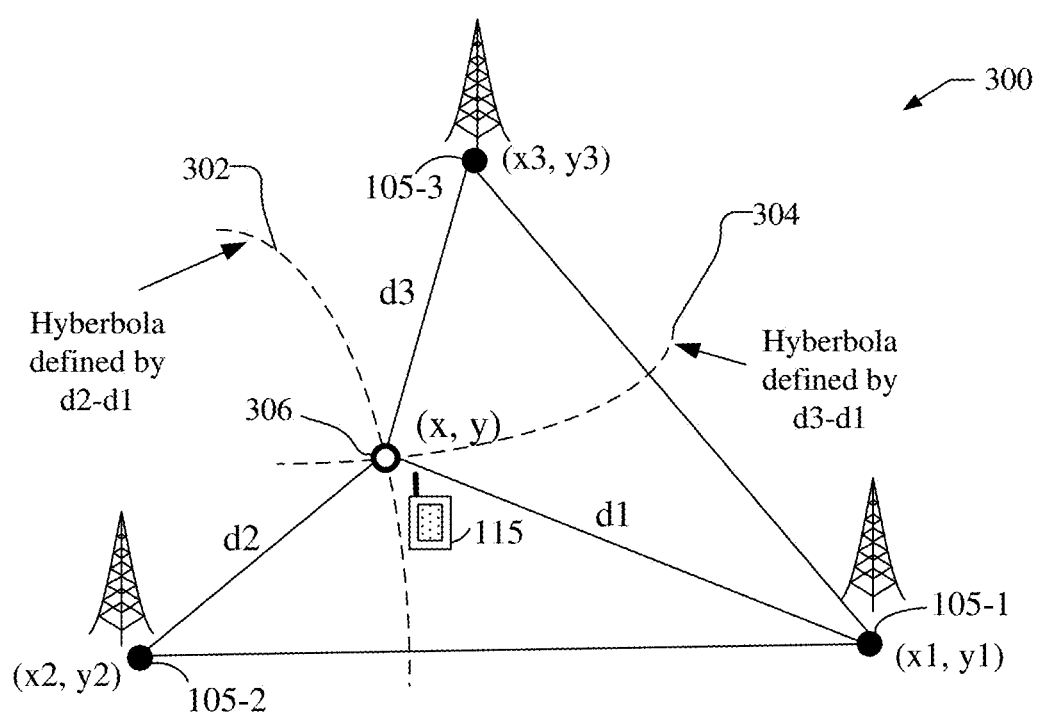
FIG. 3 illustrates a simplified environment and another exemplary technique for determining a position of a node.

FIG. 3 illustrates a simplified environment 300, similar to FIG. 2, and another exemplary technique for determining a position of a node, e.g., UE 115. In FIG. 3, the UE 115 measures the Time of Arrival (TOA) of reference signals from each of the base stations 105 relative to an internal time base of the UE 115. Between each pair of base stations 105, the UE 115 measures the Reference Signal Time Difference (RSTD), which is the relative timing difference for the TOA between a pair of base stations, e.g., a reference base station 105 (e.g. base station 105-1) and a measured base station (e.g. base station 105-2), which is determined as the smallest time difference between two subframe boundaries received from two base stations. For example, an RSTD may be measured as the difference between the TOA of a reference signal from the reference base station 105 and the TOA of a corresponding reference signal from the measured base station 105.

The determination of the UE 115 location may then be based on the following observations. As is well known in the art, OTDOA location can be based on three quantities: Time Difference of Arrival (TDOA), Real Time Difference (RTD) and Geometric Time Difference (GTD). A TDOA can be the time interval that is observed by UE 115 between the reception of a DL reference signal (RS) from each of two different base stations 105 and can correspond to an RSTD measurement. If a DL RS from base station 105-1 in FIG. 3 is received by UE 115 at a time t1, and a corresponding DL RS from base station 105-2 is received by UE 115 at a time t2, the TDOA value is (t2−t1) (or the negative of this). RTD can mean the relative synchronization difference in the network between two base stations. If the base station 105-1 sends a DL RS at a time t3, and the base station 105-2 sends a corresponding DL RS at a time t4, the RTD between them is (t4−t3). If the base stations transmit at exactly the same time, the base stations are synchronized and the RTD is zero. The GTD is the time difference between the reception of a DL RS from each of two different base stations due to geometry. If the length of a propagation path between base station 105-1 and the UE 115 is d1, and the length of a propagation path between base station 105-2 and the UE 115 is d2, then GTD is ((d2_31 d1)/c), where c is the speed of radio waves. The relationship between these three quantities is:

$$TDOA = RTD + GTD \quad (Eq\ 1)$$

GTD is the quantity that is useful for location purposes (e.g. using OTDOA), since it contains information about the position of UE 115. If only TDOA values are known (e.g. measured RSTDs), no location of UE 115 can typically be calculated with an asynchronous network, since RTD values must also be known. However, if RTD values are also available, then the UE 115 (for UE based OTDOA) or base station 105-1 or location server 164/196 (for UE assisted OTDOA) may determine the location of UE 115 using TDOA (or RSTD) measurements for at least two pairs of base stations and typically more pairs of base stations. This is illustrated in FIG. 3. A determination of the GTD between base stations 105-1 and 105-2 in FIG. 3 may locate the UE 115 on a hyperbola 302 illustrated in FIG. 3. A similar determination of a GTD between base stations 105-1 and 105-3 in FIG. 3 (via a measurement of an RSTD or TDOA between base stations 105-1 and 105-3 by UE 115) may similarly locate the UE 115 on a hyperbola 304 illustrated in FIG. 3. The intersection of the two hyperbolas at the point 306 in FIG. 3 may then locate the UE 115 (though typically more hyperbolas would be obtained from RSTD measurements for more pairs of base stations to remove ambiguity and reduce error in the location of UE 115).

In synchronous networks, RTDs are usually zero (or close to zero). In asynchronous networks, the RTDs could be determined using TDOA (RSTD) and RTT measurements. If the RTT between UE 115 and each of base station 105-1 and base station 105-2 is determined (e.g. as described later in association with FIG. 4), and the UE 115 measures in addition the TDOA (e.g. RSTD) between the two base stations, the RTD could be determined as:

$$RTD = TDOA - GTD \quad (Eq\ 2)$$

Giving:

$$RTD = TDOA - (RTT2 - RTT1)/2 \quad (Eq\ 3)$$

Where RTT1 is the RTT between UE 115 and base station 105-1 and RTT2 is the RTT between UE 115 and base station 105-2.

The UE 115, base station 105-1 or LMF 152 may use Equation 3 to determine timing information in the form of RTDs for pairs of base stations 105 based on measurements of RSTD between pairs of base stations and measurements of RTT for each base station 105.

Thus, for a UE based OTDOA positioning method, the UE 115 needs to measure the RSTDs for multiple pairs of base stations, and needs the location of each base station, which the UE 115 may receive in assistance data from the serving base station 105-1 (or broadcast by the base station 105-1) or from a location server such as LMF 152. The UE 115 may additionally need to determine the RTD for each pair of base stations, which may be determined as described above according to equation 3 using RSTD and RTT measurements. The UE 115 may receive the RTT for each base station 105 from a location server, e.g., LMF 152, or from base station 105-1 or may calculate the RTT based on Rx-Tx measurements for each base station provided by the network (e.g. provided by base station 105-1).

FIGS. 2 and 3 illustrate two examples of positioning methods. It should be understood that other known positioning methods, such as AoA or AoD, may similarly be used to determine the position of a node. Further, it should be understood that while FIGS. 2 and 3 are described in terms of UE based positioning methods, UE assisted based positioning may similarly be used, e.g., where the positioning measurements are provided to a location server, e.g., location server 164/196 in FIG. 1, for estimating the position of the UE. Moreover, it should be understood that while FIGS. 2 and 3 describe determining the position of a UE 115, similar methods may be used to determine the position of a base station 105, if the position of the base station 105 is unknown.

Figure 4:
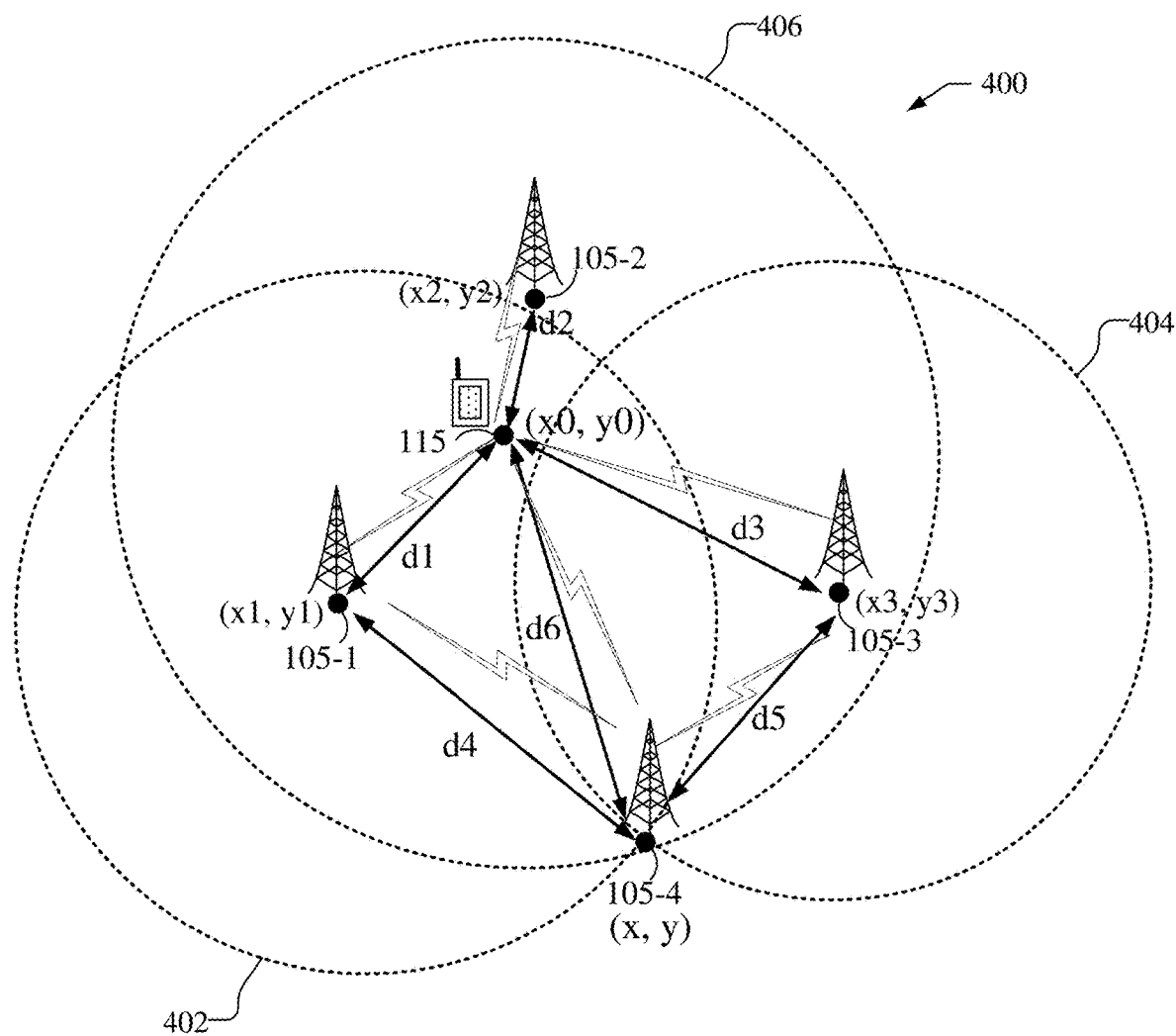
FIG. 4 illustrates a simplified environment and an exemplary technique for determining a position of a base station.

FIG. 4 illustrates a simplified environment 400, similar to FIG. 2, and an exemplary technique used for determining a position of a node, such as a base station 105. FIG. 4 is similar to FIG. 2, but instead of determining a position of UE 115, the position of base station 105-4, which may be, e.g., an IAB node, is determined. The base station 105-4 may communicate wirelessly with a plurality of base stations 105-1, 105-3, and UE 115 using radio frequency (RF) signals and standardized protocols for the modulation of the RF signals and the exchanging of information packets. By extracting different types of information from the exchanged signals, and utilizing the layout of the network (i.e., the network geometry), the base station 105-4 or a position engine, such as location server 164/196 shown in FIG. 1 or a position engine within the UE 115, may determine the position of base station 105-4 in a predefined reference coordinate system. As shown in FIG. 4, the base station 105-4 may specify its position (x, y) using a two-dimensional coordinate system; however, the aspects disclosed herein are not so limited, and may also be applicable to determining positions using a three-dimensional coordinate system, if the extra dimension is desired. Additionally, while base station 105-4 communicates with two base stations, 105-1 and 105-3, and one UE 115 in FIG. 4, aspects may utilize additional or fewer base stations or additional or fewer UEs.

Similar to the position determination illustrated in FIG. 2, the base station 105-4 may determine its position (x,y), using known positions of the base station 105-1 (x1,y1), base station 105-3 (x3,y3), and the UE 115 (x0,y0). The base station 105-4 may determine distances d4, d5, and d6 to base stations 105-1 and 105-3 and UE 115, respectively. These distances may be determined by exploiting different characteristics of the RF signals exchanged between the base station 105-4 and the other nodes, e.g., base stations 105-1, 105-3, and UE 115, such as Rx-Tx, RTT, RSSI, etc.

Once each distance is determined, the base station 105-4, location server 164/196, or UE 115 may then solve for the position (x, y) of the base station 105-4 using a variety of known geometric techniques, such as, for example, trilateration. From FIG. 4, it can be seen that the position of the base station 105-4 ideally lies at the common intersection of all of the circles 402, 404, and 406 drawn using dotted lines. Each circle 402, 404, and 406 being defined by the radius of distance d4, d5, and d6 and centers (x1, y1), (x3,y3), and (x0,y0), respectively. In practice, the intersection of these circles may not lie at a single point due to the noise and other errors in the networking system.

By way of example, the position of the UE 115 (x0,y0) may be determined, e.g., as illustrated in FIG. 2 or FIG. 3, prior to determining the position of base station 105-4. In another implementation, the position of the UE 115 (x0,y0) and the position of the base station 105-4 may be determined within the same positioning session, e.g., using additional information from base station 105-2 at position (x2,y2).

Determining the distance between the base station 105-4 and other nodes, e.g., base stations 105-1, 105-3, and UE 115 may involve exploiting time information of the RF signals. In an aspect, determining the Rx-Tx or RTT of signals exchanged between the UE 115 and any base station can be performed and converted to a distance. Rx-Tx techniques determine the time between the time of transmission of a signal and the time of reception of the signal. RTT techniques can measure the time between sending a signaling message and receiving a response. These methods may utilize calibration to remove any processing delays. In some environments, it may be assumed that the processing delays for the UE 115 and the base stations 105 are the same. However, such an assumption may not be true in practice.

Similarly, the position of base station 105-4 may be determined using techniques illustrated in FIG. 3 or using other known positioning techniques, such as angle-based methods (e.g., AoA, AoD), or hybrid angle-based and timing-based (RTT, TDOA) methods.

Figure 5:
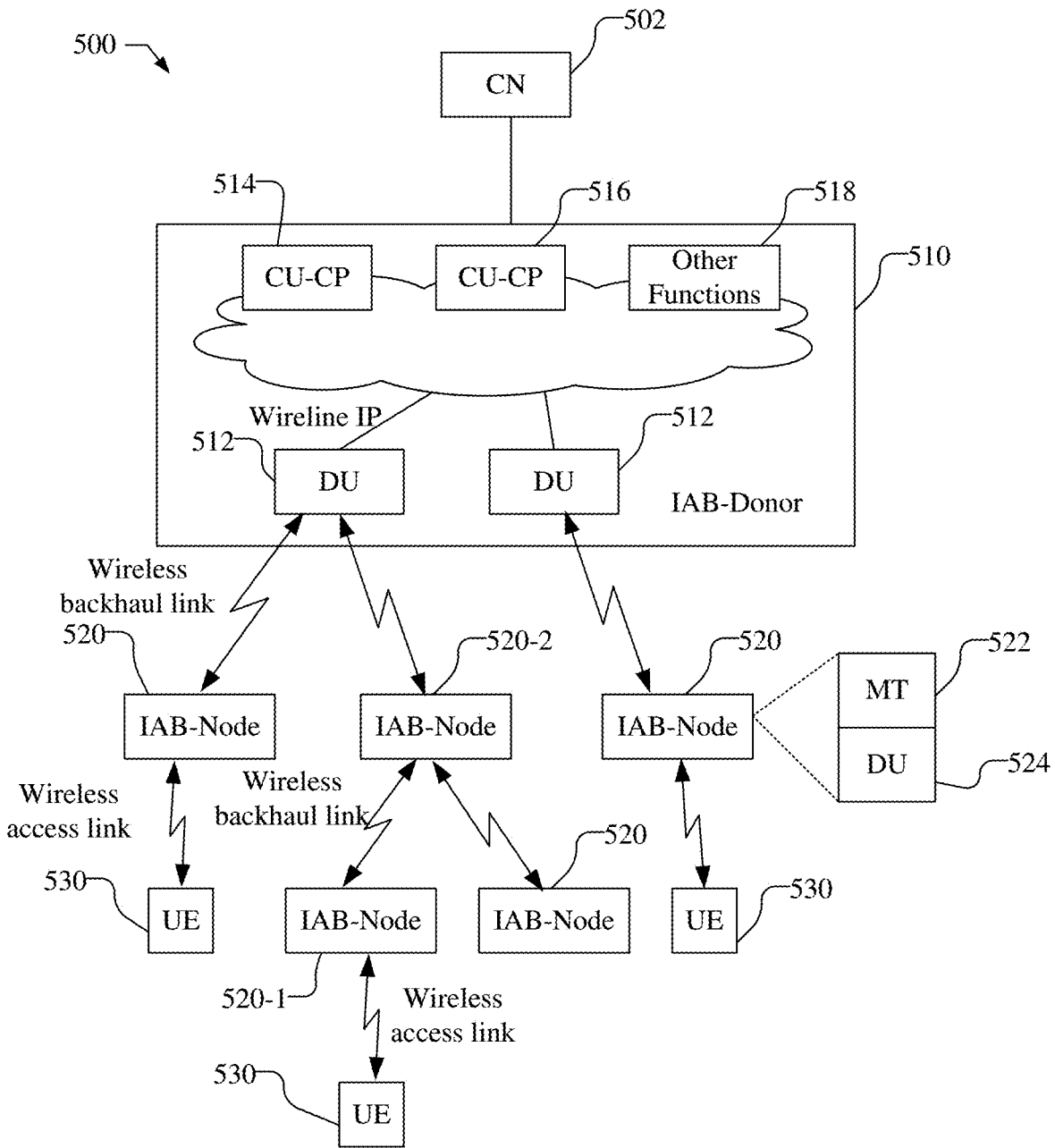
FIG. 5 shows an example of an integrated access backhaul (IAB) architecture in standalone mode, illustrating the functions and interfaces for IAB.

FIG. 5 shows an example of an IAB architecture 500 in standalone mode, illustrating the functions and interfaces for IAB. IAB in general, by way of example, is described in 3GPP Technical Report (TR) 38.874. IAB may use known functions and interfaces defined for access, such as Mobile-Termination (MT), gNB-Distributed Unit (gNB-DU), and gNB-Central Unit (gNB-CU), as well as the corresponding interfaces NR Uu (between MT and gNB), F1, NG, X2 and N4 are used as baseline for the IAB architectures.

FIG. 5 illustrates one IAB-donor 510, multiple IAB-nodes 520, and multiple UEs 530. The IAB-donor 510 may be treated as a single logical node that comprises a set of functions, such as Distributed Unit (DU) 512, Central Unit (CU)-Control Plane (CU-CP) 514, CU-User Plane (CU-UP) 516, and other possible functions 518. The IAB-donor 510 may be split according these functions, which can all be either colocated or non-colocated. The IAB-donor 510 interfaces with the core network (CN) 502, which may be the 5GC 190 or EPC 160. The DU 512 interfaces with CU-CP 514, CU-CP 516 or other functions 518 with a wireline IP link.

Each IAB-node 520 includes an MT 522 and DU 524. The IAB-node 520 does not interface directly with the CN 502 but interfaces either with the IAB-donor 510, a parent IAB-node 520, a child IAB-node 520, or a UE 530. The MT function in the IAB-node 520 is similar to the MT component found in UEs. The MT 522 in an IAB-node terminates the radio interface layers of the backhaul Uu interface, e.g., wireless backhaul link, toward a single DU 512 in the IAB-donor 510, or with a single DU 524 of a parent IAB-node 520, e.g., as illustrated by child IAB-node 520-1 interfacing with parent IAB-node 520-2. The DU 524 terminates the radio interface layers with the UEs 530, e.g., a wireless access link, or with the MT 522 of a child IAB-node 520, e.g., a wireless backhaul link, e.g., as illustrated by parent IAB-node 520-2 interfacing with child IAB-node 520-1.

The IAB node may operate in standalone or in a non-standalone operation. For example, a UE may connect to an IAB-node and choose a different operation mode than the IAB-node or connect to a different type of core network than the IAB-node is connected.

Figures 6A, 6B, 6C:
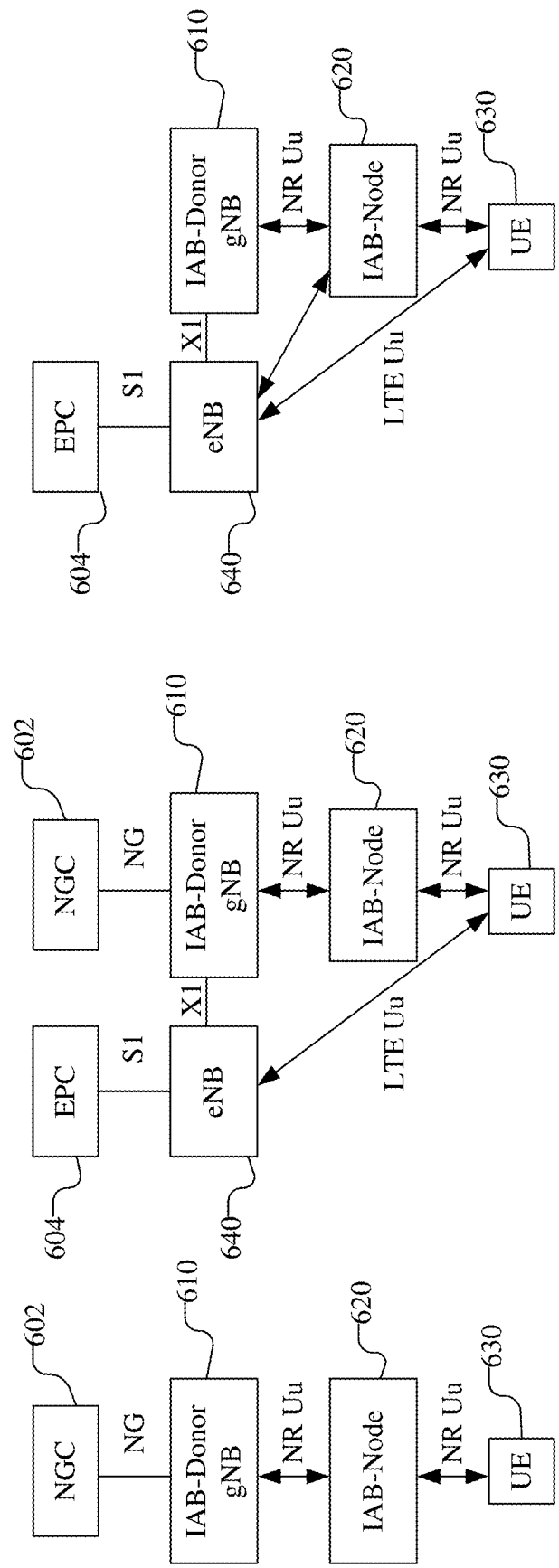
FIGS. 6A, 6B, and 6C illustrate various modes of standalone and non-standalone operation of an IAB.

FIG. 6A, by way of example, illustrates operation of an IAB 620 in standalone operation with a Next Generation Core (NGC) 602, such as 5GC 190. An IAB-donor gNB 610 connects to the NGC 602 with an NG interface and the DU function of the IAB-donor gNB 610 connects to the MT function of the IAB node 620 with a wireless backhaul link, NR Uu. The DU function of the IAB node 620 connects to a UE 630 with a wireless access link, NR Uu.

FIG. 6B, by way of example, illustrates the UE 630 in non-standalone operation with an Evolved Packet Core (EPC) 604, such as EPC 160, while the IAB-node 620 operates in standalone mode with the NGC 602, such as 5GC 190. As illustrated, an eNB 640 communicates with the EPC 604 with an S1 interface and communicates with the UE 630 with an LTE Uu interface. The eNB 640 and the IAB-donor gNB 610 may communicate with an X2 interface.

FIG. 6C, by way of example, illustrates the UE 630 and the IAB node 620 in non-standalone operation with the EPC 604, such as EPC 160. As illustrated, the IAB-donor gNB communicates with the EPC 604 with an S1-U interface and communicates with the eNB 640 with an X2 interface. The IAB-node 620 may communicate with the eNB 640 and the IAB-donor gNB 610.

IAB nodes may be used for positioning of UEs if the position of the IAB node is known. There may be various types of IAB nodes, however, which may vary with respect to known locations or mobility. For example, some IAB nodes may be fixed, e.g., fully stationary, and may have a known position, similar to conventional non-IAB base stations.

Other IAB nodes may be fixed, e.g., fully stationary, but may have an unknown position. For example, IAB nodes may be mounted to objects, such as a lamp post, etc., but may not have a Global Navigation Satellite System (GNSS) receiver attached. The position of such an IAB-node may be determined "offline," e.g., with an external GNSS receiver, and programmed into the IAB-node, or may determine its position using positioning methods.

Some IAB nodes may mobile and may also require positioning, e.g., using a GNSS receiver or other positioning methods. The position of such IAB nodes may be known temporarily, but may vary due to the mobility of the IAB node. For example, IAB nodes may have "limited mobility," such as a home router that is moved, but infrequently. The position of such an IAB node may need to be updated from time-to-time, e.g., when the IAB is moved. Another example of limited mobility may be an IAB node that is mounted to an elevator, where IAB moves frequently, but the range of motion is limited. Additionally, IAB nodes may be "fully mobile," such as IAB nodes that are mounted on a vehicle, such as a taxi or high-speed train. Such an IAB node may require frequent updates to its position.

During positioning sessions, from the perspective of a UE, IAB operation may be transparent to the positioning operations. For example, the DU in a IAB node appears the same a non-IAB gNBs to the UE. The positioning protocol, e.g., LTE Positioning Protocol (LPP), is between the UE and the location server, e.g., LMF, and may be transparent to IAB operation. For UE-based positioning, assistance data may include the position of IAB-DU nodes, in the same manner as non-IAB base stations.

From the perspective of the DU in an IAB node, the positioning protocol with the location server, e.g., New Radio Position Protocol A (NRPPa), is extended to the DU. The positioning protocol, e.g., NRPPa, terminates at the CU from the location server perspective, can be effectively extended to each DU. For example, the CU may relay packets to and from the appropriate DU over F1-AP interface, either in containerized form or via new F1-AP messages that replicate all the information fields in the NRPPa packets.

Thus, positioning of a UE may be independent of the IAB operation. However, as discussed above, an IAB node, whether it is fully stationary or mobile, may require positioning in order to be utilized in UE positioning.

As discussed above in FIG. 5, currently, the MT 522 in an IAB node 520 may be used to communicate with a single DU unit, e.g., in the IAB-donor 510 or a parent IAB node. One reference point, however, is not adequate for positioning. For example, typically positioning procedures such a trilateration or other techniques, require a plurality, e.g., three or more, reference points.

Accordingly, in one implementation, the MT function of an IAB node may be used for positioning by engaging in one or more positioning sessions and sending or receiving reference signals to or from a plurality of other base station. The reference signals, for example, may be at least one of DL PRS, UL PRS, SRS, synchronization signal block (SSB) signals, channel state information reference signals (CSI-RS), or a combination. The other base stations may be non-IAB base stations, or other IAB-DUs. For example, ancestors, descendants, or other nodes of the same IAB donor-DU or CU, or nodes of a different IAB donor-DU or CU may be used.

By way of example, in one implementation with multiple parent IAB-DUs, the transmission or reception of reference signals used for positioning may be with parent IAB-DUs, i.e., DUs from other IAB nodes or DUs from one or more IAB donors. A single or separate capabilities may be reported for the maximum number of possible parent IAB-DUs and for the maximum number of IAB-DUs with which positioning measurements can be made as part of a positioning session. If the parent IAB-DUs have known positions, then the position of the IAB node may be determined using known positioning procedures. On the other hand, if the positions of one or more of the parent IAB-DUs are not known, the positions of the parent IAB-DUs may be determined along with the position of the IAB node. For example, an iterative approach may be used to determine the position of the parent IAB-DUs prior to the position of the IAB node, and then determine the position of the IAB node using the now known positions of the parent IAB-DUs. In a joint approach, the positions of the parent IAB-DUs and the position of the IAB node may be solved at the same time.

In another implementation, the DU function in the IAB node may be used in the determination of the position IAB node instead of or in addition to the use of the MT function. The DU in the IAB node, for example, may be in communication with multiple other nodes with known positions, e.g., known with more accuracy than that of the DU function of the IAB node. By way of example, a node that may be used may be one or more UEs, or the MT function of other downstream IAB-nodes. The DU function of the IAB node may perform position measurements, e.g., one or more of TDOA, RTT, AoA, AoD, and signal strength positioning measurements, with the other nodes, and the position of the DU function may then be determined. The position measurements may be part of, e.g., a positioning session for those nodes (i.e., the positions of the other nodes are being determined), or as separate measurements triggered by RRC/MAC-CE/DCI commands. For example, the positioning sessions for the other nodes may be initiated to obtain positioning measurements for the IAB node. Note that a positioning session for one of the other nodes may be a session between that node and a positioning server, such as an LMF or an eSMLC. In the approach described above, such a session need not be present between the IAB node itself and the LMF, however, in order to use the positioning sessions at the other nodes to obtain useful measurements about the IAB node, the IAB node must participate or engage in those positioning sessions, e.g., by transmitting PRS which those other nodes will measure, or by receiving PRS that those other nodes will transmit. To facilitate these operations, a base-station-to-positioning-node session (such as LPPa, between LTE eNB and eSMLC, or NR-PPa, between NR gNB an LMF) may be initiated between the IAB node and the LMF, so as to configure the IAB node compatibly with the other nodes whose positioning sessions are used to extract measurements involving the IAB node.

The use of the DU function in the IAB node for positioning, instead of the MT function, may be advantageous, e.g., when the MT and DU for the IAB node are not colocated. For example, one MT function may server multiple non-colocated DUs. As the DU of the IAB node is used for positioning for UEs, i.e., the DU of the IAB node serves as the base station for UEs, and the MT-to-DU position offset may be unknown, determining the position of the DU function of the IAB node instead of the MT function may be more useful for future UE positioning determination.

Even if MT and DU of the IAB node are colocated, using both the MT and DU measurements may improve performance and potentially avoid or reduce the need for PRS monitoring from or transmission to additional nodes beyond those that the IAB node is already communicating with for data traffic.

Additionally, in another implementation, an IAB node may provide an indication of mobility, e.g., to other nodes, e.g., a location server, base station (e.g., other IAB nodes or IAB donor), or to UEs. For example, an IAB node may indicate one or more of mobility type, or position or uncertainty type, or current position or uncertainty, or a combination thereof. The IAB node, for example, may indicate whether it is fully stationary, occasionally mobile, or fully mobile, etc. The indication may be provided, e.g., over F1-AP to a CU, over NR-PPa to a location server, such as an LMF, or over RRC/MAC-CE/DCI to a UE. Such indications provided by IAB nodes may be used by a location server in the preparation of assistance data for a UE. For example, if an IAB node is mobile, e.g., occasionally mobile or fully mobile, the location server may exclude the IAB node from positioning assistance data. Moreover, in a UE assistance positioning procedure, a location server may exclude from a position determination any positioning measurements related to an IAB node that is indicated as being mobile. A UE may choose to not perform positioning measurements with an IAB node that has been indicated as being mobile, unless explicitly commanded to measure them. Moreover, in a UE based positioning procedure, the UE may exclude from a position determination any positioning measurements related to an IAB node that is indicated as being mobile.

Figure 7:
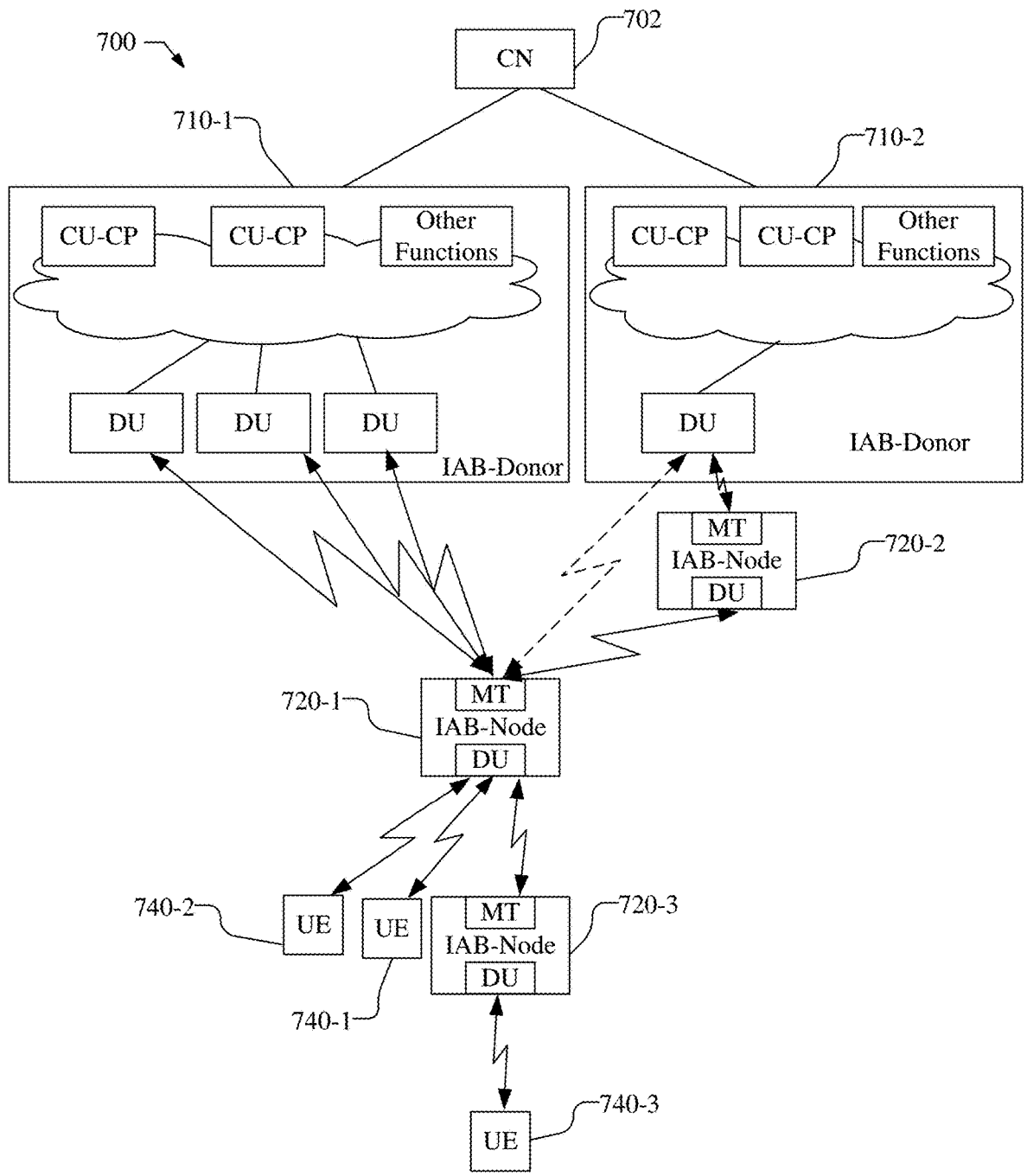
FIG. 7 illustrates an IAB architecture capable of determining a position of an IAB node.

FIG. 7 illustrates an IAB architecture 700 for determining a position of an IAB node 720-1. As illustrated, in one implementation, the MT function of IAB node 720-1 may engage in positioning sessions, via wireless backhaul links, with a plurality of other base station stations, illustrated as IAB DUs in IAB donor 710-1 and the IAB DU in parent IAB node 720-2 and a location server, e.g., in or attached to the core network (CN) 702. In some implementations, as illustrated by the dotted arrow, the MT function of IAB node 720-1 may engage in a positioning session with a second IAB donor 710-2. The IAB node 720-1 may be limited to engaging with one IAB DU at a time, in which case, the positioning sessions with the DUs of IAB donor 710-1 and the DU of IAB node 720-2 and/or IAB donor 710-2 may be separated in time. Additionally, the MT function of IAB node 720-1 may engage in a positioning session with a non-IAB node, such as a gNB or eNB, e.g., as illustrated in FIGS. 6B and 6C. The positioning sessions with the IAB DUs may include sending and/or receiving reference signals, such as at least one of DL PRS, UL PRS, SRS, SSB, CSI-RSI or a combination thereof. The positioning measurements performed by IAB node 720-1, for example, may include one or more of Rx-Tx, TDOA, RTT, AoA, AoD, signal strength etc. If the MT function of the IAB node 720-1 is limited to engaging with one IAB DU at a time, the positioning measurements performed by IAB node 720-1, for example, may include one or more of RTT, AoA, AoD, signal strength etc. Since TDOA measurement involves difference of timing to/from two separate nodes, TDOA may not be suitable for this case.

Additionally or alternatively, the position of the IAB node 720-1 may be determined using the DU function of the IAB node 720-1. For example, as illustrated, the DU function of IAB node 720-1 may engage in a positioning session, via wireless backhaul link, with the MT function of a child IAB node 720-3, and may engage in positioning sessions, via wireless access links, with UEs 740-1 and 740-2. It may be useful to use the DU function in the IAB node 720-1, without the MT function, for positioning if the DU function and the MT function of IAB node 720-1 are not colocated. The positioning sessions used with the DU function of IAB node 720-1 may include sending and/or receiving reference signals, such as at least one of DL PRS, UL PRS, SRS, SSB, CSI-RS or a combination thereof. The positioning measurements may include one or more of Rx-Tx, TDOA, RTT, AoA, AoD, signal strength etc.

Figure 8:
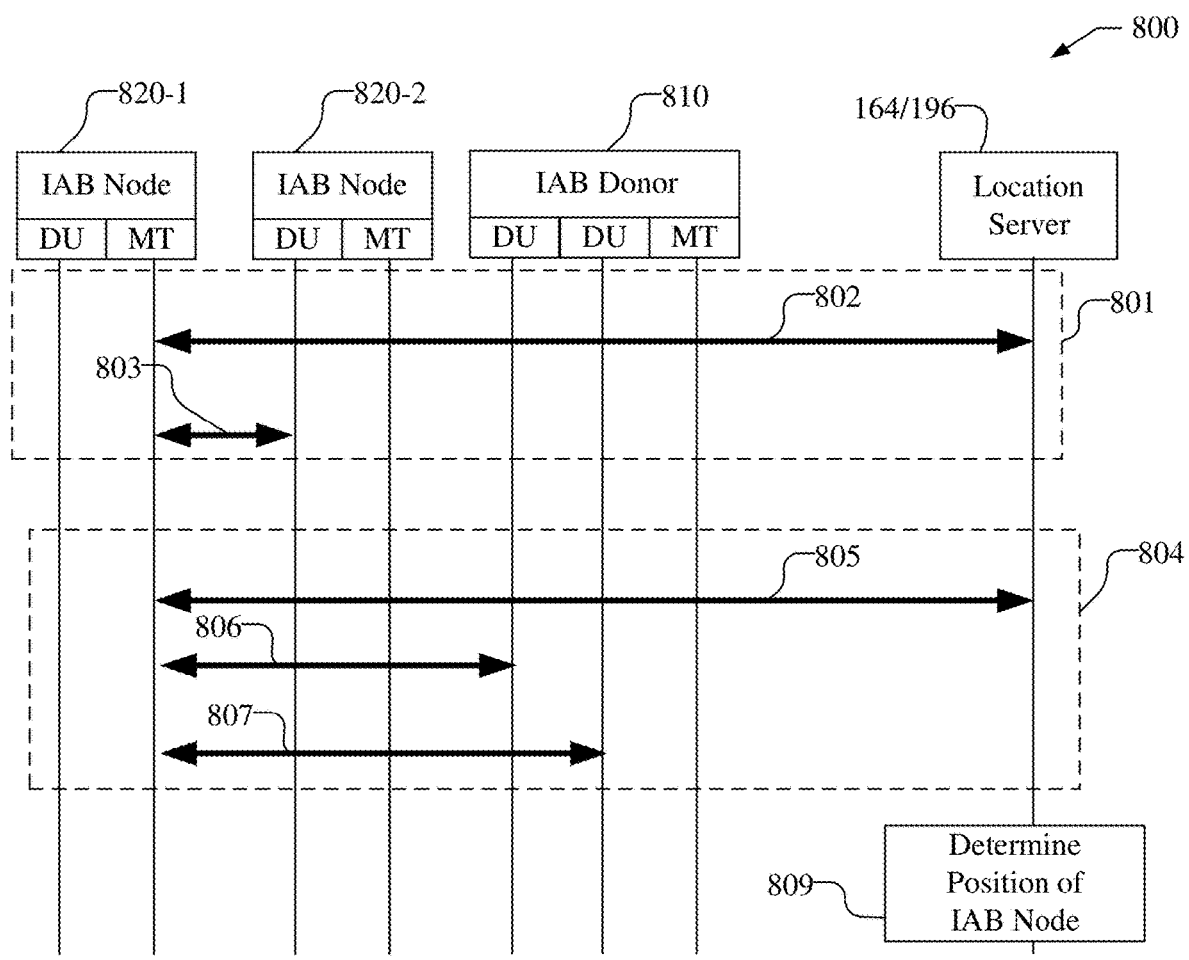
FIG. 8 shows a simplified exemplary procedure for determining a position of an IAB node.

FIG. 8 shows a simplified exemplary procedure 800 for determining a position of an IAB node 820-1. As illustrated, at a first stage 801, the MT function of IAB node 820-1 and a location server 164/196 may engage in a positioning session, illustrated by arrow 802, e.g., through IAB donor 810. The MT function of the IAB node 820-1 may engage with multiple other base stations in one or more positioning sessions. For example, the MT function of the IAB node 820-1 may engage in a positioning session with multiple IAB DUs or non-IAB base stations (not shown). As illustrated, in the positioning session 802, positioning measurements are made using reference signals between the MT function of the IAB node 820-1 and the DU function of IAB node 820-2, illustrated with arrow 803. Within the same positioning session or in additional positioning sessions, additional positioning measurements are made with IAB-DUs. For example, as illustrated in FIG. 8, in a second stage 804, the MT function of IAB node 820-1 and the location server 164/196 may engage in a new positioning session, illustrated by arrow 805, e.g., through IAB donor 810. Positioning measurements are made using reference signals between the MT function of the IAB node 820-1 and the DU functions of IAB donor 810, illustrated with arrows 806 and 807. If desired, IAB node 820-1 may engage in a positioning session with multiple IAB DUs or non-IAB base stations (not shown), including separate IAB donors. The reference signals may be, e.g., DL, UL, or DL and UL reference signals, and may be PRS, SRS, SSB, CSI-RSI or a combination thereof. The positioning measurements may include one or more of Rx-Tx, TDOA, RTT, AoA, AoD, signal strength etc. The positioning measurements may be provided by the IAB node 820-1 to the location server 164/196. In some implementations, IAB node 820-2 and/or IAB donor 810 may provide the positioning measurements to the location server 164/196. The location server 164/196 may receive the positioning measurements and at block 809 determines a position for the IAB node 820-1.

Figure 9:
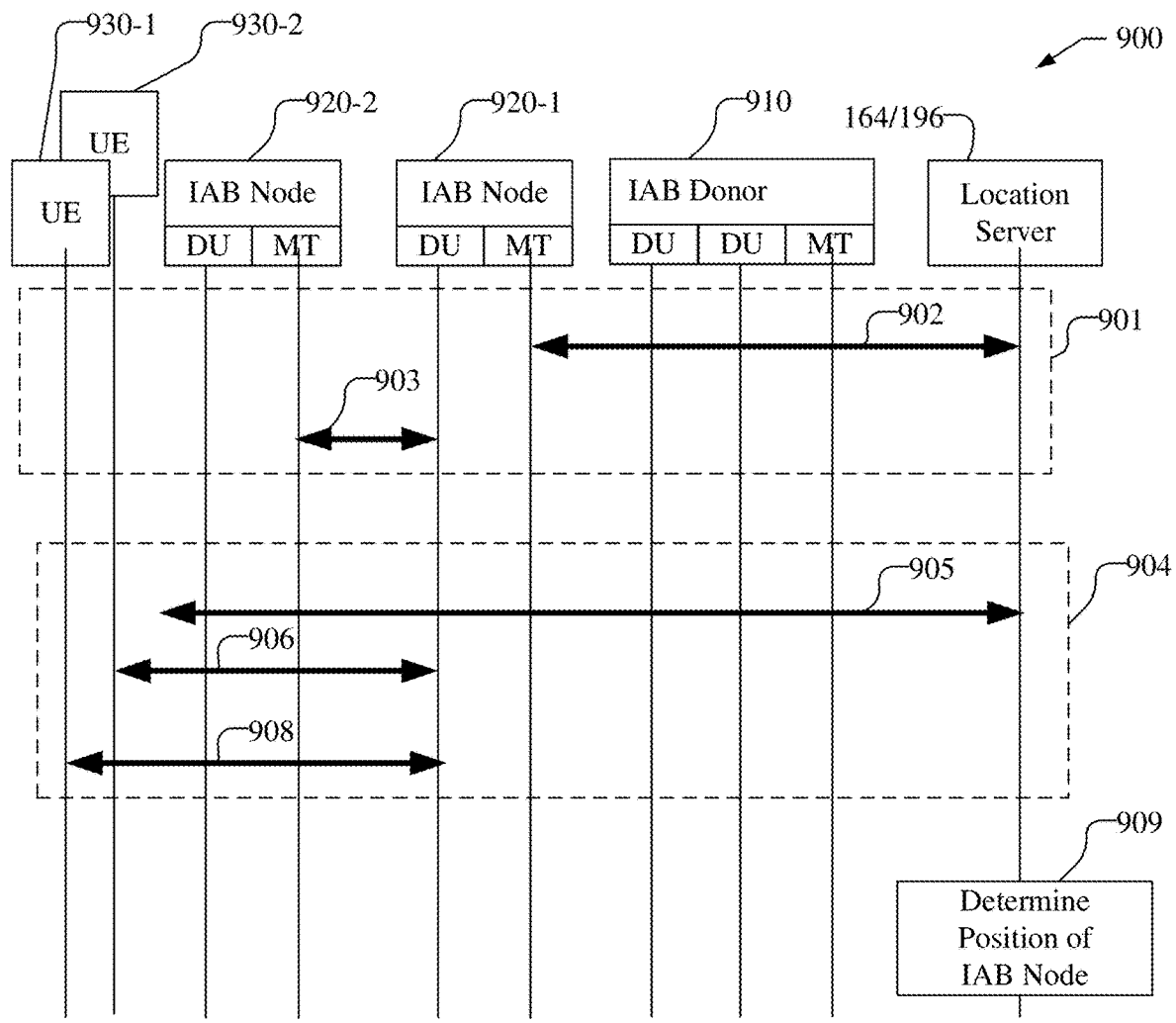
FIG. 9 shows another simplified exemplary procedure for determining a position of an IAB node.

FIG. 9 shows another simplified exemplary procedure 900 for determining a position of an IAB node 920-1. As illustrated, at a first stage 901, the MT function of IAB node 920-1 and a location server 164/196 may engage in a positioning session illustrated by arrow 902, which may forward by IAB donor 910. The DU function of the IAB node 920-1 may engage with multiple other nodes, include a base stations (e.g., child IAB node 920-2), and UEs 930-1 and 930-2, in one or more positioning sessions. As illustrated, in the positioning session 902, positioning measurements are made using reference signals between the DU function of the IAB node 920-1 and the MT function of IAB node 920-2, illustrated with arrow 903. Within the same positioning session or in additional positioning sessions, additional positioning measurements are made with the same (e.g., at a different time) or different nodes. For example, as illustrated in FIG. 9, in a second stage 904, the MT function of IAB node 920-1 and the location server 164/196 may engage in a new positioning session, illustrated by arrow 905, e.g., through IAB donor 910. Positioning measurements are made using reference signals between the DU function of the IAB node 920-1 and the UEs 930-1 and 930-2, illustrated by arrows 906 and 908. The reference signals may be, e.g., DL, UL, or DL and UL reference signals, and may be PRS, SRS, SSB, CSI-RSI or a combination thereof. The positioning measurements may include one or more of Rx-Tx, TDOA, RTT, AoA, AoD, signal strength etc. The positioning measurements may be provided by the IAB node 920-1 to the location server 164/196. In some implementations, IAB node 920-2 and/or UEs 930-1 and/or 930-2 may provide the positioning measurements to the location server 164/196. The location server 164/196 may receive the positioning measurements and at block 909 determines a position for the IAB node 920-1.

Figure 10:
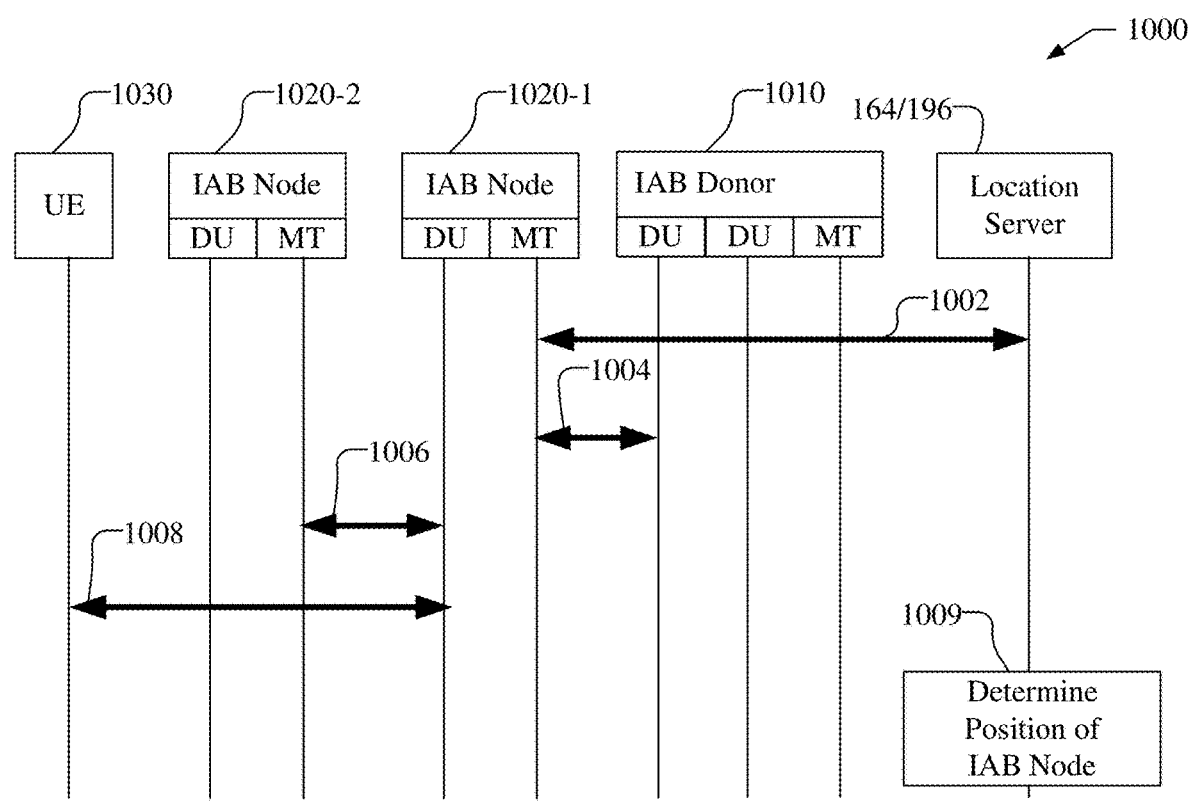
FIG. 10 shows another simplified exemplary procedure for determining a position of an IAB node.

FIG. 10 shows another simplified exemplary procedure 1000 for determining a position of an IAB node 1020-1. As illustrated, the MT function of IAB node 1020-1 and a location server 164/196 may engage in a positioning session illustrated by arrow 1002, e.g., through IAB donor 164/1960. The MT function of the IAB node 1020-1 may engage in the positioning session with the DU functions of IAB donor 1010, illustrated by arrows 1004 and the DU function of IAB node 1020-1 may engage in the positioning session with the MT functions of child IAB node 1020-2 and with UE 1030. The reference signals may be, e.g., DL, UL, or DL and UL reference signals, and may be PRS, SRS, SSB, CSI-RSI or a combination thereof. The positioning measurements may include one or more of Rx-Tx, TDOA, RTT, AoA, AoD, signal strength etc. The positioning measurements may be provided by the IAB node 1020-1 to the location server 164/196. In some implementations, IAB donor 1010, IAB node 1020-2 and/or UE 115 may provide the positioning measurements to the location server 164/196. The location server 164/196 may receive the positioning measurements and at block 1009 determines a position for the IAB node 1020-1.

Figure 11:
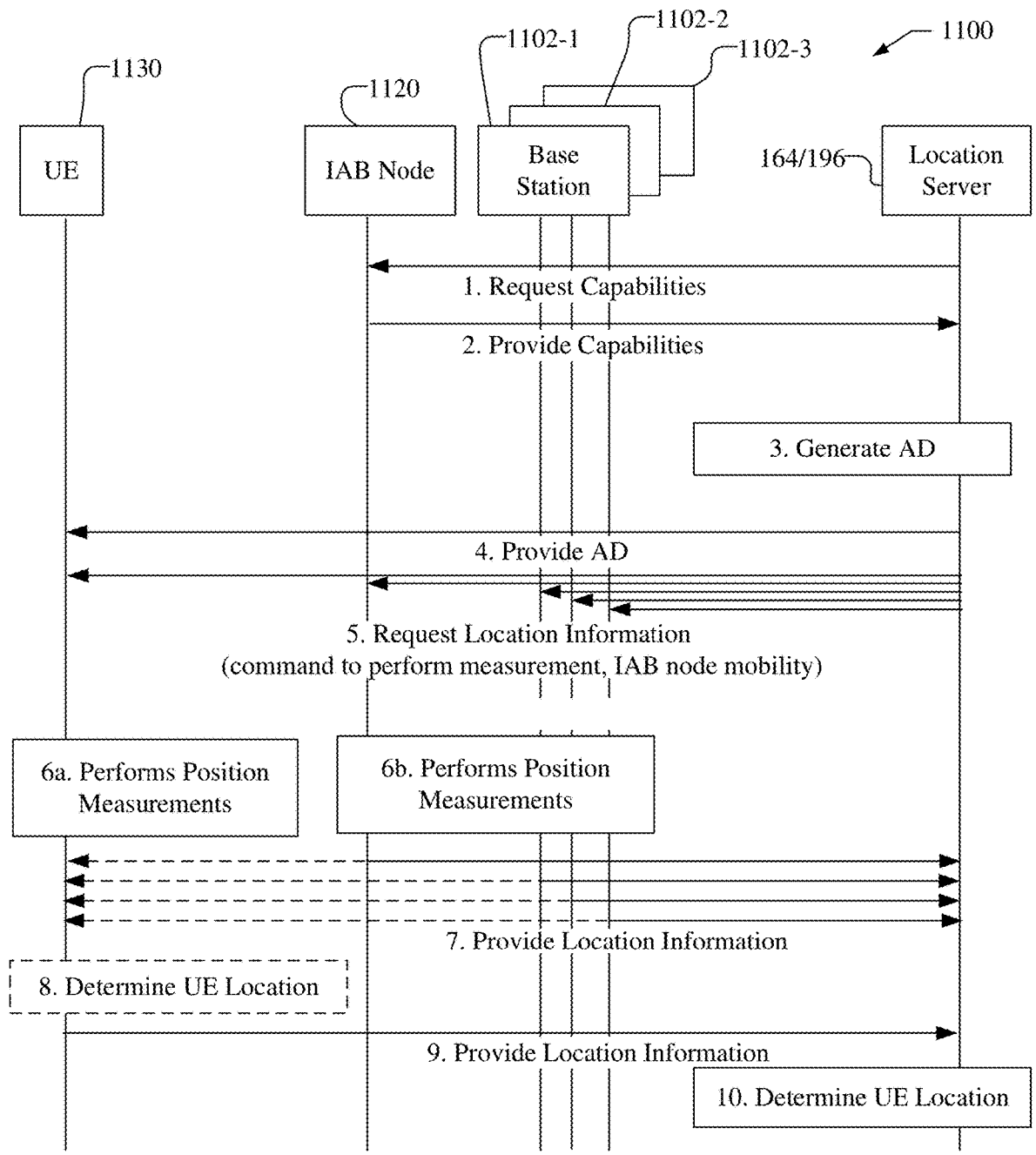
FIG. 11 shows a procedure 1100 including messages that may be used for determining a position of a UE using an indication of mobility of an IAB node.

FIG. 11 shows a procedure 1100 including messages that may be used for determining a position of a UE using an indication of mobility of an IAB node 1120.

At stage 1, a location server 164/196 may send a Request Capabilities message to IAB node 1020 to be positioned, e.g., via intervening network entities, such as an AMF (not shown) and an IAB donor, which may be one of bay stations 1102-1, 1102-2, or 1102-3 to request the capabilities of IAB node 1020. The Request Capabilities message may indicate the type of capabilities needed. For example, the query may be for positioning capabilities of the IAB node 1020 to send or receive reference signals to one or more parent IAB-DUs, non-IAB nodes or other IAB nodes.

At stage 2, the IAB node 1020 returns a Provide Capabilities message to location server 164/196 comprising the positioning capabilities of IAB node 1020, e.g., an ability to send or receive reference signals to one or more parent IAB-DUs, non-IAB nodes or other IAB nodes. The IAB node 1020 may also provide an indication of mobility, e.g., whether the IAB node 1020 is fully stationary, occasionally mobile, or fully mobile, etc.

At stage 3, the location server 164/196 may generate positioning assistance data (AD). The assistance data may include assistance data for the IAB node 1120 as well as base stations 1102-1, 1102-2, and 1102-3, which may include IAB nodes, including parent or child IAB nodes or IAB donor, or non-IAB nodes. The assistance data, for example, may include the locations of base stations 1102-1, 1102-2, and 1102-3, which may be used by the UE 1130, e.g., in a UE based positioning procedure. The assistance data may further include, e.g., the mobility indication for the IAB node 1020 and any of the base stations 1102-1, 1102-2, and 1102-3, if known.

At stage 4, the location server 164/196 provides the assistance data to the UE 115.

At stage 5, the location server 164/196 sends a Request Location Information message to the UE 115 to request desired location information, e.g., positioning measurements. The message may include, e.g., the type of positioning measurements, the desired accuracy, response time, etc. Moreover, the message may include a command to perform positioning measurements with IAB node 1020, the command may indicate if the positioning measurement is mandatory. The command may indicate that the UE 1130 is to initiate a positioning session to determine the position of the UE and that positioning measurements of the IAB node 1020 are to be obtained or that the positioning session is for the IAB node 1020. Depending on the reported ability of the IAB node 1120 to send or receive reference signals to one or more parent IAB-DUs, non-IAB nodes or other IAB nodes, the location server 164/196 may send additional Request Location Information messages to the IAB node 1120 or to other UEs, as well as base stations for determining a position of the IAB node 1020.

At stage 6a, the UE 1130 performs the requested positioning measurement using the reference signal transmissions from the base stations 1102-1, 1102-2, and 1102-3 and IAB node 1120. For example, the positioning measurements may be one or more of a TOA, RSTD, or Rx-Tx, AoA, AoD, signal strength, etc. It should be understood that the UE 1130 may further perform positioning measurements with additional nodes, e.g., other UEs and base stations, some of which may have known positions and some of which may have unknown positions. The UE 1130 may use the mobility of the IAB node 1120 in the process performing positioning measurements, e.g., e.g., by excluding positioning measurements with IAB node 1120 if the IAB node 1120 is indicated as being mobile in the assistance data received at stage 5.

At stage 6b, the base stations 1102-1, 1102-2, and 1102-3 and IAB node 1120 perform the requested positioning measurement using the reference signal transmissions from the UE 1130. For example, the positioning measurements may be one or more of a TOA, RSTD, or Rx-Tx, AoA, AoD, signal strength, etc. It should be understood that the base stations 1102-1, 1102-2, and 1102-3 and IAB node 1120 may further perform positioning measurements with additional nodes, e.g., additional UEs and between base stations or with other base stations, some of which may have known positions and some of which may have unknown positions.

It should be understood that one or both of stages 6a and 6b may be performed. For example, for RTT positioning measurements, both stages 6a and 6b would be performed.

At stage 7, the base stations 1102-1, 1102-2, and 1102-3 and/or IAB node 1120 may provide the location information obtained at stage 6b to the location server 164/196. The location information, for example, may be the desired positioning measurements. As illustrated with dotted arrows in stage 7, the base stations 1102-1, 1102-2, and 1102-3 and IAB node 1120 may provide the location information obtained at stage 6b to the UE 1130 instead of the location server 164/196, e.g., in a UE based positioning procedure.

At optional stage 8, e.g., for a UE based positioning procedure, the UE 1130 may determine the position of the IAB node 1020, e.g., using the position measurements from stage 6a and the assistance data received at stage 4, and the location information received from the base stations at stage 7 if performed. The UE 1130 may additionally determine the position of the UE 1130 along with the position of the IAB node 1020, e.g., in an iterative approach or in a joint approach. The UE 1130 may use the mobility of the IAB node 1120 in the process of determining the position of the UE 1130, e.g., by excluding positioning measurements with IAB node 1120 if the IAB node 1120 is indicated as being mobile in the assistance data received at stage 5.

At stage 9, the UE 1130 provides the location information to the location server 164/196. The location information, for example, may be the positioning measurements obtained at stage 6a or the position of the IAB node 1020 and/or UE 1130 determined at stage 8, or both.

At stage 10, the location server 164/196 may determine or confirm the position of the IAB node 1020, e.g., using the location information received at one or both stages 7 and 9. The location server 164/196 may determine the position of the UE 1130 along with the position of the IAB node 1020, e.g., in an iterative approach or in a joint approach. The location server may use the mobility of the IAB node 1120 in the process of determining the position of the UE, e.g., by excluding positioning measurements with IAB node 1120 if the IAB node 1120 is indicated as being mobile, e.g., in stage 2.

Figure 12:
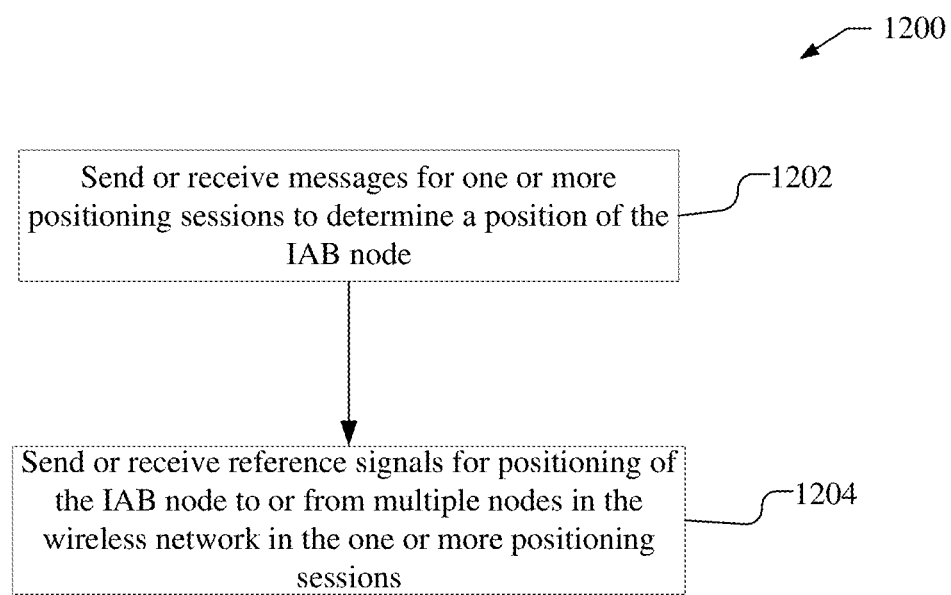
FIG. 12 shows a process flow illustrating a method for positioning an integrated access backhaul (IAB) node with an unknown position in a wireless network that is performed by the IAB node.

FIG. 12 shows a process flow 1200 illustrating a method for positioning an integrated access backhaul (IAB) node with an unknown position in a wireless network that is performed by the IAB node. The IAB node may be an IAB node such as described in FIGS. 5-11. The IAB node includes a mobile terminated (MT) function and a distributed unit (DU) function. The process flow 1200 may start at block 1202 where the IAB node sends or receives messages for one or more positioning sessions to determine a position of the IAB node, e.g., as illustrated at stages 802 and 805 in FIG. 8, and stage 1002 in FIG. 10 and stages 1, 2, 5, and 7 in FIG. 11. At block 1204, the IAB node sends or receives reference signals for positioning to or from multiple nodes in the wireless network in the one or more positioning sessions, e.g., as illustrated by stages 803, 806, and 807 in FIG. 8, and stages 1004, 1006, and 1008 in FIG. 10, and stages 6a and 6b in FIG. 11.

In some implementations, the reference signals are sent or received with the MT function and the multiple nodes comprise multiple base stations, e.g., as illustrated by stages 803, 806, and 807 in FIG. 8, and stage 1004 in FIG. 10. In some implementations, the IAB node may further send or receive reference signals for positioning with the DU function to or from multiple nodes in the wireless network, wherein the multiple nodes comprise user equipments (UEs) or MT functions of downstream IAB nodes, e.g., as illustrated by stages 1006 and 1008 of FIG. 10.

In some implementations, the multiple nodes may be non-IAB nodes or other IAB nodes. For example, the multiple nodes may be ancestors, descendants, or other nodes of a same donor IAB DU or donor IAB central unit (CU), or nodes of a different donor IAB DU or different donor IAB CU.

In some implementations, the multiple nodes may be multiple parent IAB-DUs. The IAB node may engage in a plurality of positioning sessions, wherein the MT function sends or receives reference signals for positioning to or from one parent IAB-DU in each positioning session, e.g., as discussed in reference to FIG. 7 and FIG. 8. The positioning measurements, for example, may be one or more of reception and transmission time (Rx-Tx), Round Trip Time (RTT), Angle of Arrival (AoA), Angle of Departure (AoD), and signal strength with each parent IAB-DU.

In one implementation, the IAB node may engage in one positioning session, wherein the MT function sends or receives reference signals for positioning to or from multiple parent IAB-DUs in the one positioning session, e.g., as discussed in reference to FIG. 7 and FIG. 8. The positioning measurements, for example, may be one or more of reception and transmission time (Rx-Tx), Time Difference of Arrival (TDOA), Round Trip Time (RTT), Angle of Arrival (AoA), Angle of Departure (AoD), and signal strength positioning measurements with the multiple parent IAB-DUs.

In one implementation, the reference signals for positioning may be at least one of downlink positioning reference signals (PRS), uplink PRS, sounding reference signals (SRS), synchronization signal block (SSB) signals, and channel state information reference signals (CSI-RS), or a combination thereof.

In one implementation, the reference signals are sent or received with the DU function of the IAB node and the multiple nodes comprise user equipments (UEs) or MT functions of downstream IAB nodes, e.g., as illustrated in stages 1006 and 1008 of FIG. 10.

In one implementation, a message sent or received in the one or more positioning sessions comprises a message to indicate a capability to send or receive reference signals to one or more parent IAB-DUs, non-IAB nodes or other IAB nodes, e.g., as illustrated in stage 2 of FIG. 11.

In one implementation, the IAB node may additionally perform positioning measurements based on the reference signals received from one or more nodes in the wireless network, and a message sent in the one or more positioning sessions may comprise location information based on the positioning measurements to a location server for positioning of the IAB node, e.g., as discussed with respect to stages 803, 806, 807 and 809 in FIG. 8, and stages 1004 and 1009 in FIG. 10.

Figure 13A:
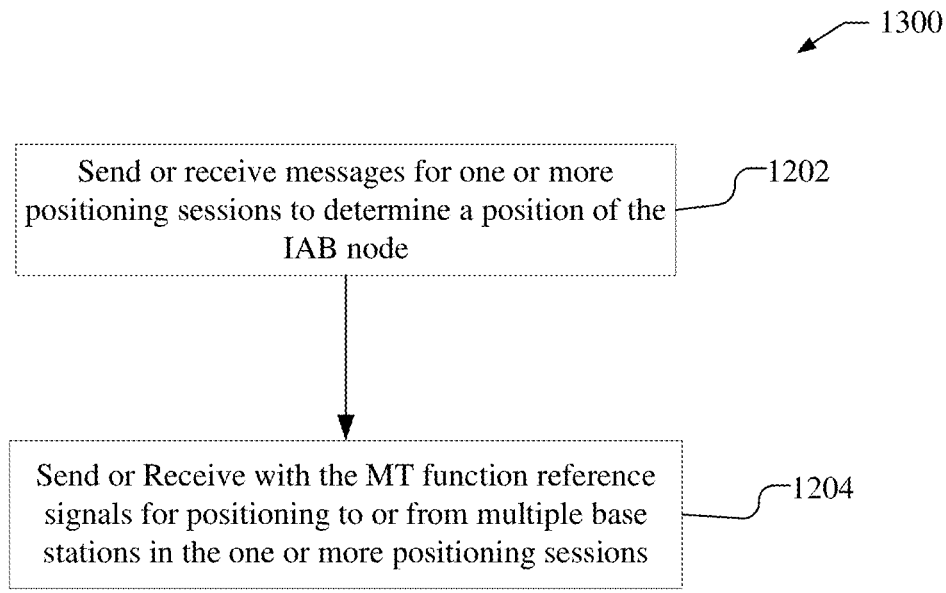
FIG. 13A shows another process flow illustrating a method for positioning an integrated access backhaul (IAB) node with an unknown position in a wireless network that is performed by the IAB node.

FIG. 13A shows a process flow 1300 illustrating a method for positioning an integrated access backhaul (IAB) node with an unknown position in a wireless network that is performed by the IAB node. The IAB node may be an IAB node such as described in FIGS. 5-11. The IAB node includes a mobile terminated (MT) function and a distributed unit (DU) function. The process flow 1300 may start at block 1302 where the IAB node sends or receives messages for one or more positioning sessions to determine a position of the IAB node, e.g., as illustrated at stages 802 and 805 in FIG. 8, and stage 1002 in FIG. 10. At block 1304, the MT function of the IAB node sends or receives reference signals for positioning of the IAB node to or from multiple base stations in the one or more positioning sessions, e.g., as illustrated by stages 803, 806, and 807 in FIG. 8, and stage 1004 in FIG. 10.

In some implementations, the multiple base stations may be non-IAB nodes or other IAB nodes. For example, the multiple base stations may be ancestors, descendants, or other nodes of a same donor IAB DU or donor IAB central unit (CU), or nodes of a different donor IAB DU or different donor IAB CU.

In some implementations, the multiple base stations may be multiple parent IAB-DUs. The IAB node may engage in a plurality of positioning sessions, wherein the MT function sends or receives reference signals for positioning to or from one parent IAB-DU in each positioning session, e.g., as discussed in reference to FIG. 7 and FIG. 8. The positioning measurements, for example, may be one or more of reception and transmission time (Rx-Tx), Round Trip Time (RTT), Angle of Arrival (AoA), Angle of Departure (AoD), and signal strength with each parent IAB-DU.

In one implementation, the IAB node may engage in one positioning session, wherein the MT function sends or receives reference signals for positioning to or from multiple parent IAB-DUs in the one positioning session, e.g., as discussed in reference to FIG. 7 and FIG. 8. The positioning measurements, for example, may be one or more of reception and transmission time (Rx-Tx), Time Difference of Arrival (TDOA), Round Trip Time (RTT), Angle of Arrival (AoA), Angle of Departure (AoD), and signal strength positioning measurements with the multiple parent IAB-DUs.

In one implementation, the reference signals for positioning may be at least one of downlink positioning reference signals (PRS), uplink PRS, sounding reference signals (SRS), synchronization signal block (SSB) signals, and channel state information reference signals (CSI-RS), or a combination thereof.

In one implementation, the MT function of the IAB node may additionally send or receive reference signals for positioning with the DU function of the IAB node to or from multiple nodes in the wireless network, wherein the multiple nodes comprise user equipments (UEs) or MT functions of downstream IAB nodes, e.g., as illustrated in stages 1006 and 1008 of FIG. 10.

In one implementation, the IAB node may indicate a capability to send or receive reference signals to one or more parent IAB-DUs, non-IAB nodes or other IAB nodes, e.g., as illustrated in stage 2 of FIG. 11.

In one implementation, the IAB node may additionally perform positioning measurements based on the reference signals received from one or more nodes, and may send sending location information based on the positioning measurements to a location server for determining a position of the IAB node, e.g., as discussed with respect to stages 803, 806, 807 and 809 in FIG. 8, and stages 1004 and 1009 in FIG. 10.

Figure 13B:
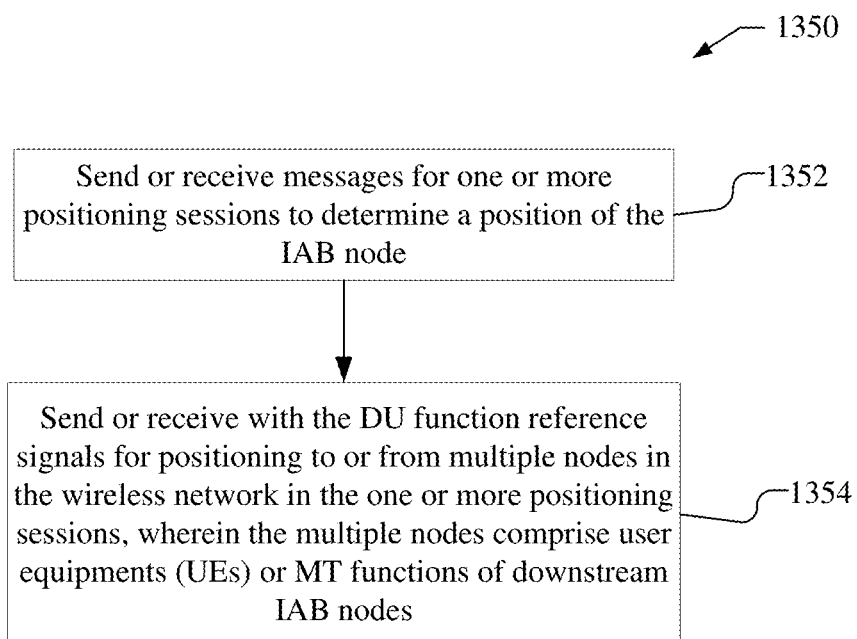
FIG. 13B shows another process flow illustrating a method for positioning an integrated access backhaul (IAB) node with an unknown position in a wireless network that is performed by the IAB node.

FIG. 13B shows a process flow 1350 illustrating a method for positioning an integrated access backhaul (IAB) node with an unknown position in a wireless network that is performed by the IAB node. The IAB node may be an IAB node such as described in FIGS. 5-11. The IAB node includes a mobile terminated (MT) function and a distributed unit (DU) function. The process flow 1350 may start at block 1352 where the IAB node sends or receives messages for in one or more positioning sessions to determine a position of the IAB node, e.g., as illustrated at stages 902 and 905 in FIG. 9, and stage 1002 in FIG. 10. At block 1354, the IAB node sends or receives with the DU function reference signals for positioning to or from multiple nodes in the wireless network in the one or more positioning sessions, wherein the multiple nodes comprise user equipments (UEs) or MT functions of downstream IAB nodes, e.g., as illustrated by stages 906 and 908 in FIG. 9, and stages 1006 and 1008 in FIG. 10.

In one implementation, the IAB node performs one or more of reception and transmission time (Rx-Tx), Time Difference of Arrival (TDOA), Round Trip Time (RTT), Angle of Arrival (AoA), Angle of Departure (AoD), and signal strength positioning measurements with the multiple nodes.

In one implementation, the MT function and the DU function of the IAB node are not co-located and other nodes in the wireless network derive their positions using the DU function.

Figure 14:
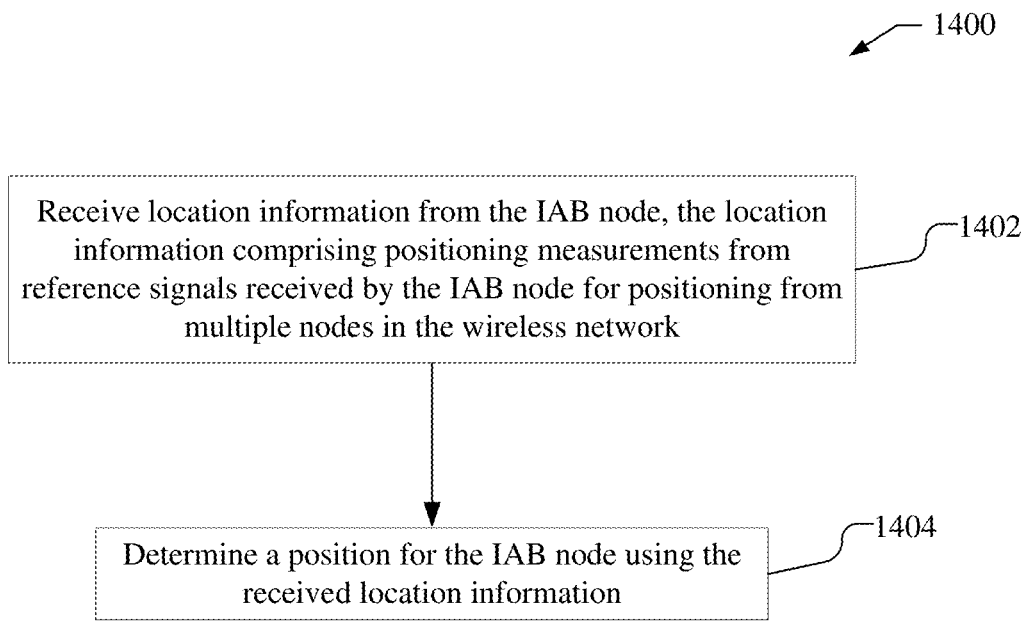
FIG. 14 shows a process flow illustrating a method for positioning for an integrated access backhaul (IAB) node with an unknown position in a wireless network performed by a location server.

FIG. 14 shows a process flow 1400 illustrating a method for positioning for an integrated access backhaul (IAB) node with an unknown position in a wireless network performed by a location server, such as location server 164/196. The IAB node may be an IAB node such as described in FIGS. 5-11. The IAB node includes a mobile terminated (MT) function and a distributed unit (DU) function. The process flow 1400 may start at block 1402 where the location server receives location information from the IAB node, the location information comprising positioning measurements from reference signals received by the IAB node for positioning from multiple nodes in the wireless network, e.g., as discussed at stage 809 in FIG. 9, stage 909 in FIG. 9, and stage 1009 in FIG. 10. At block 1404, the location server determines a position for the IAB node using the received location information, e.g., as discussed at stage 809 in FIG. 9, stage 909 in FIG. 9, and stage 1009 in FIG. 10.

In one implementation, the reference signals are received by the MT function in the IAB node and the multiple nodes are base stations comprising one or more of parent IAB-DUs, non-IAB nodes or other IAB nodes, e.g., as illustrated by stages 803, 806, and 807 in FIG. 8, and stage 1004 in FIG. 10.

In one implementation, the reference signals are received by the DU function in the IAB node and the multiple nodes comprise user equipments (Ues) or MT functions of downstream IAB nodes, e.g., as illustrated by stages 906 and 908 in FIG. 9, and stages 1006 and 1008 in FIG. 10.

Figure 15:
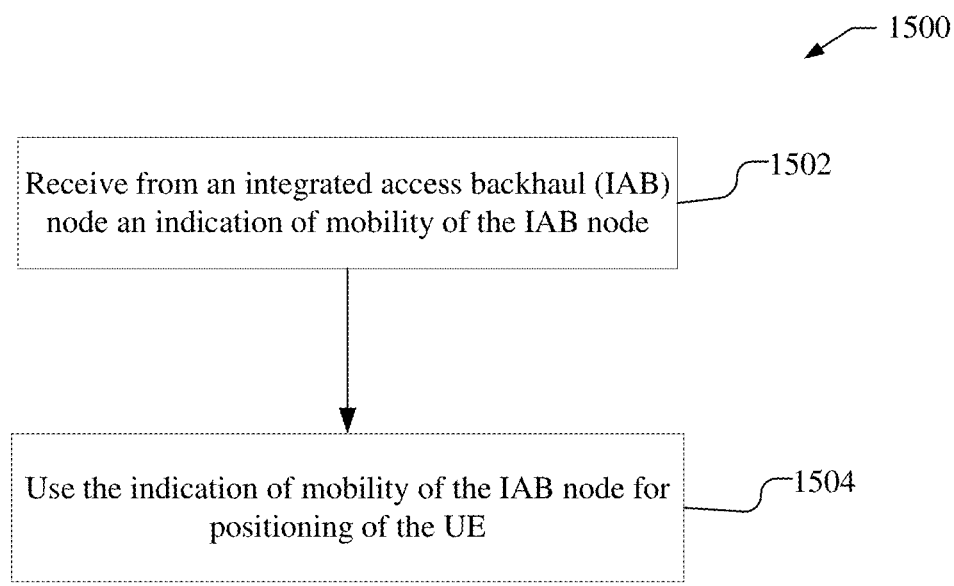
FIG. 15 shows a process flow illustrating a method for positioning a user equipment (UE).

FIG. 15 shows a process flow 1500 illustrating a method for positioning a user equipment (UE), e.g., UE 1130, performed by a location server, such as location server 164/196. The process flow 1500 may start at block 1502 where the location server receives from an integrated access backhaul (IAB) node an indication of mobility of the IAB node, e.g., as discussed at stage 2 in FIG. 11. At block 1504, the location server uses the indication of mobility of the IAB node for positioning of the UE, e.g., as discussed at stages 3, 4, and 10 of FIG. 11.

In one implementation, the indication of mobility may comprise fully mobile, fully stationary, or occasionally mobile.

In one implementation, the indication of mobility of the IAB node for positioning of the UE is used by generating positioning assistance data for UE excluding the IAB node when the indication of mobility of the IAB node indicates that the IAB node is mobile, e.g., as discussed at stage 3 of FIG. 11.

In one implementation, the indication of mobility of the IAB node for positioning of the UE is used by receiving positioning measurements generated using the IAB node and excluding the positioning measurements generated using the IAB node for positioning of the UE when the indication of mobility of the IAB node indicates that the IAB node is mobile, e.g., as discussed at stages 9 and 10 of FIG. 11.

Figure 16:
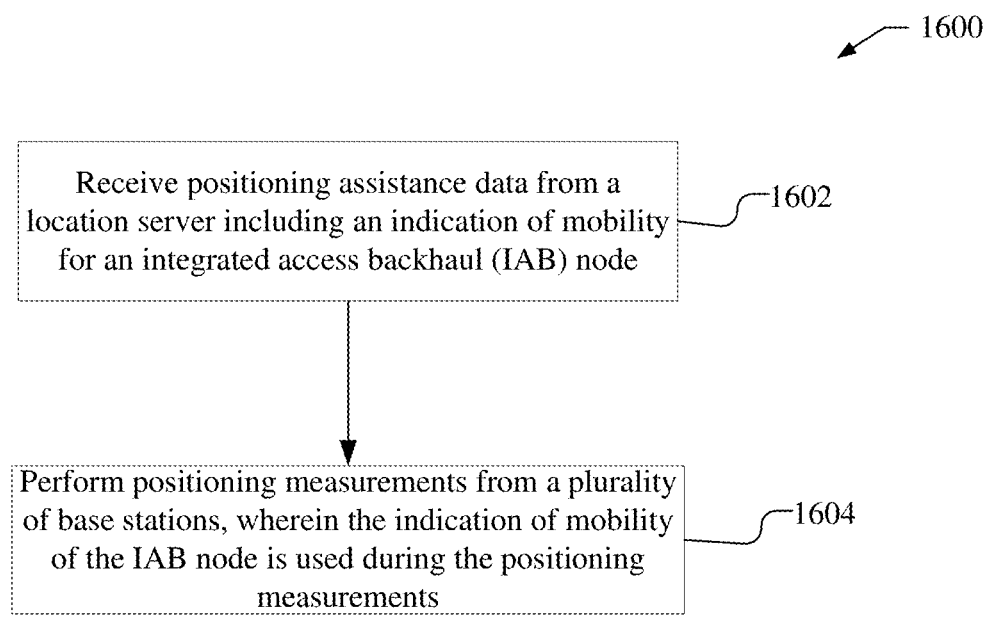
FIG. 16 shows a process flow illustrating a method for positioning a user equipment (UE).

FIG. 16 shows a process flow 1600 illustrating a method for positioning a user equipment (UE), e.g., UE 1130, performed by the UE. The process flow 1600 may start at block 1602 where the UE receive positioning assistance data from a location server including an indication of mobility for an integrated access backhaul (IAB) node, e.g., as discussed at stages 3 and 4 in FIG. 11. At block 1604, the UE performs positioning measurements from a plurality of base stations, wherein the indication of mobility of the IAB node is used during the positioning measurements, e.g., as discussed at stage 6a in FIG. 11.

In one implementation, performing positioning measurements from a plurality of base stations may include excluding generating positioning measurements using the IAB node when the indication of mobility of the IAB node indicates that the IAB node is mobile, e.g., as discussed at stage 6a in FIG. 11.

Figure 17:
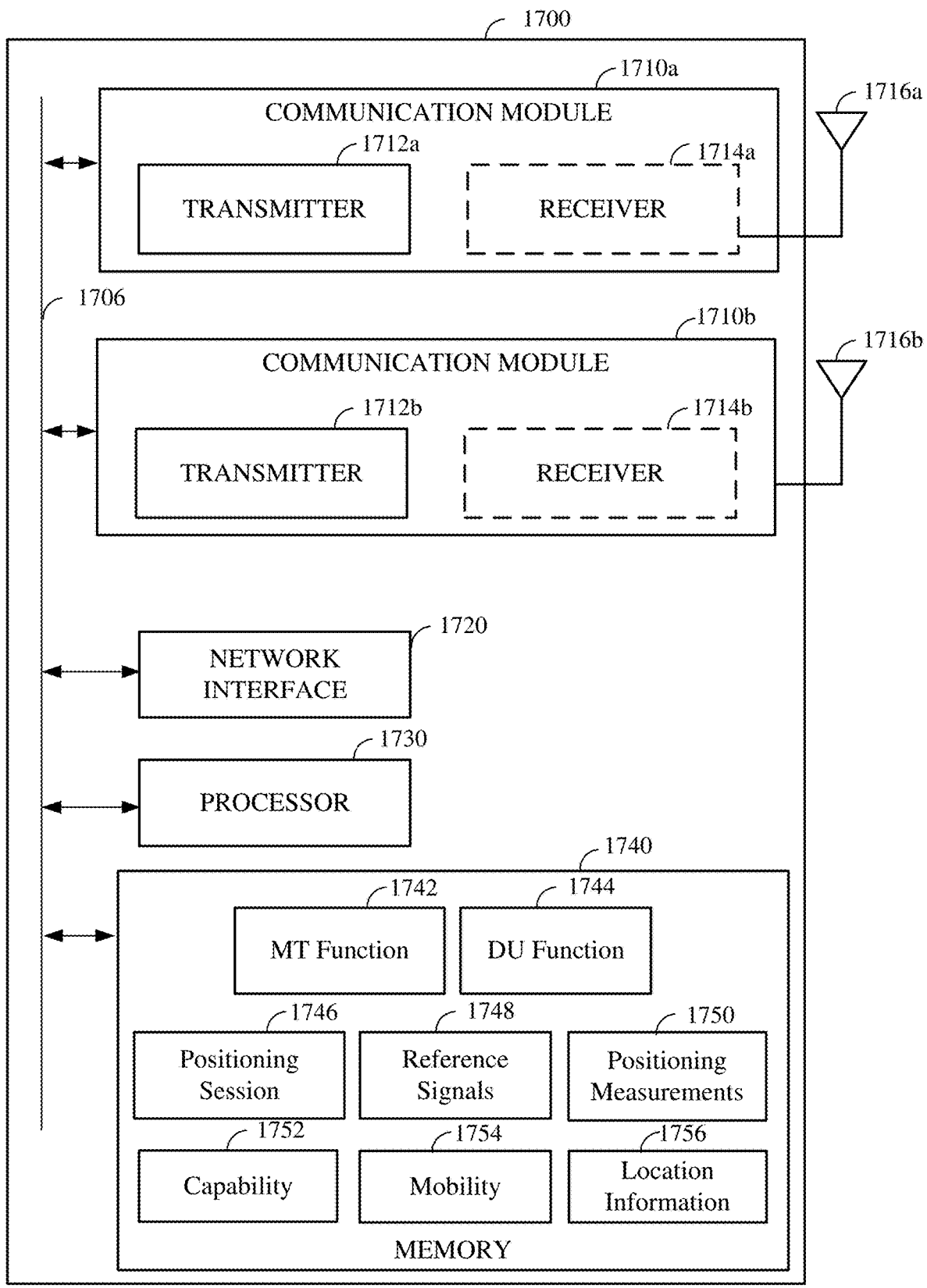
FIG. 17 is a diagram of a hardware implementation of an IAB node that is capable of positioning as discussed herein.

FIG. 17 shows a schematic diagram of a hardware implementation of an IAB node 1700, which may be a gNB, and configured to have a functionality similar to that depicted or described, for example, with reference to the IAB nodes described in FIGS. 5-13. The IAB node 1700 may include an external interface, which may include communication module 1710a used for MT functions, sometimes referred to herein as an MT communication module 1710a, and a communication module 1710b used for DU functions, referred to herein as a DU communication module 1710b, sometimes collectively referred to as communication modules 1710, and a network interface 1720. The IAB node 1700 may include more than two communications modules 1710. The communication modules 1710 are electrically coupled to one more antennas 1716a,b for wirelessly communicating with non-IAB devices and IAB devices, such as IAB DUs in IAB donors, or other IAB nodes, or IAB MTs in child IAB nodes, as described in FIGS. 5-13. The communication modules 1710a and 1710b may include a respective transmitter 1712a and 1712b for sending signals (e.g., downlink messages and signals, which may be arranged in frames, and which may include positioning reference signals and/or assistance data whose quantity may be controlled/varied as described herein) and, optionally (e.g., for nodes configured to receive and process uplink communications), and a respective receiver 1714a and 17124b. In embodiments in which the implemented node includes both a transmitter and a receiver, the communication modules 1710 comprising the transmitter and receiver may be referred to as a transceivers 1710. The IAB node 1700 may also include a network interface 1720 to communicate with other network nodes (e.g., sending and receiving queries and responses), such as IAB donors, other IAB nodes, and UEs. For example, each network element may be configured to communicate (e.g., via wireless backhaul communication) with an IAB donor or IAB node, or other suitable device of a network, to facilitate communication with one or more core network nodes. Additionally, and/or alternatively, communication with other network nodes may also be performed using the communication modules 1710a,b and/or the respective antennas 1716a,b.

The IAB node 1700 may include, in some embodiments, at least one processor 1730 (also referred to as a controller) and memory 1740 to manage communications with other nodes (e.g., sending and receiving messages), to generate communication signals (including to generate communication frames, signals and/or messages with adjustable quantities of resources that are allocated for location-related information such as PRS transmissions and assistance data transmissions), and to provide other related functionality, including functionality to implement the various processes and methods described herein. The one or more processors 1730 and memory 1740 may be coupled together with bus 1706. The one or more processors 1730 and other components of the IAB node 1700 may similarly be coupled together with bus 1706, a separate bus, or may be directly connected together or coupled using a combination of the foregoing. The memory 1740 may contain executable code or software instructions that when executed by the one or more processors 1730 cause the one or more processors 1730 to operate as a special purpose computer programmed to perform the procedures and techniques disclosed herein (e.g. such as the process flows 1200, 1300, and 1350).

As illustrated in FIG. 17, the memory 1740 includes one or more components or modules that when implemented by the one or more processors 1730 implements the methodologies as described herein. While the components or modules are illustrated as software in memory 1740 that is executable by the one or more processors 1730, it should be understood that the components or modules may be dedicated hardware either in the processor or off processor.

As illustrated, the memory 1740 may include a MT function module 1742 that configures the one or more processors 1730 to perform MT functions as discussed herein, e.g., via MT communication module 1710a. The memory 1740 may further include a DU function module 1744 that configures the one or more processors 1730 to perform DU functions as discussed herein, e.g., via DU communication module 1710b. The MT function and the DU function, e.g., in particular, the MT communication module 1710a and DU communication module 1710b may not be colocated.

The memory 1740 may include a positioning session module 1746 that configures the one or more processors 1730 to engage in one or more positioning sessions, via MT communication module 1710a and/or a DU communication modules 1710b, to determine the position of the IAB node 1700.

The memory 1740 may include a reference signal module 1748 that configures the one or more processors 1730 to send or receive, via communication modules 1710, reference signals for positioning. For example, the reference signal module 1748 may configure the one or more processors 1730 to send or receive reference signals to multiple base stations via MT communication modules 1710a. The multiple base stations, for example, may be non-IAB nodes or other IAB nodes. For example, the base stations may be descendants, or other nodes of a same donor IAB DU or donor IAB central unit (CU), or nodes of a different donor IAB DU or different donor IAB CU. In one implementation, the base stations may be multiple parent IAB-DUs, e.g., in IAB nodes or IAB donors. Additionally or alternatively, the reference signal module 1748 may configure the one or more processors 1730 to send or receive reference signals to multiple nodes, e.g., UEs or downstream IAB nodes, via DU communication modules 1710b. The reference signals, for example, may be DL PRS, UL PRS, SRS, SSB, CSI-RS, etc. or a combination thereof.

The memory 1740 may include a positioning measurements module 1750 that configures the one or more processors 1730 to perform positioning measurements with sent or received reference signals. The positioning measurements may include, e.g., Rx-Tx, RTT, AoA, AoD, and signal strength if only a single node, e.g., single parent IAB-DU is in each positioning session (and multiple positioning sessions are used). If multiple nodes are included in the positioning session, the positioning measurements may include, e.g., Rx-Tx, TDOA, RTT, AoA, AoD, and signal strength.

The memory 1740 may include a capability module 1752 that configures the one or more processors 1730 to prepare and send to a location server, via MT communication module 1710a, a capability message indicating the IAB nodes capability to send or receive reference signals to one or more parent IAB-DUs, non-IAB nodes or other IAB nodes.

The memory 1740 may further include a mobility module 1754 that configures the one or more processors 1730 to prepare and send to a location server, via MT communication module 1710a, a message indicating the mobility of the IAB node, e.g., whether the IAB node is fully stationary, occasionally mobile or fully mobile, etc.

The memory 1740 may further include a location information module 1756 to send to a location server, via MT communication module 1710a, location information such as positioning measurements for determining the position of the IAB node.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1740, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, an IAB node, such as IAB node 1700, with an unknown position in a wireless network includes a mobile terminated (MT) function and a distributed unit (DU) function, such as the one or more processors 1730 with dedicated hardware for implementing executable code or software instructions in memory 1740 such as the MT function module 1742 and DU function module 1744, respectively. The IAB node may include a means for sending or receiving messages for one or more positioning sessions to determine the position of the IAB node, which may be, e.g., the external interface, including communication module 1710 and network interface 1720, and the one or more processors 1730 with dedicated hardware for implementing executable code or software instructions in memory 1740 such as the positioning session module 1746. A means for sending or receiving reference signals for positioning to or from multiple nodes in the wireless network in the one or more positioning sessions may be, e.g., the external interface, including communication module 1710 and network interface 1720, and the one or more processors 1730 with dedicated hardware for implementing executable code or software instructions in memory 1740 such as the reference signal module 1748.

In one implementation, the reference signals are sent or received with the MT function and the multiple nodes may comprise multiple base stations. The IAB node may further include means for sending or receiving reference signals for positioning with the DU function to or from multiple nodes in the wireless network, wherein the multiple nodes comprise user equipments (UEs) or MT functions of downstream IAB nodes, which may be, e.g., the external interface, including communication module 1710, and the one or more processors 1730 with dedicated hardware for implementing executable code or software instructions in memory 1740 such as the reference signal module 1748.

In one implementation, the IAB node may further include a means for performing one or more of reception and transmission time (Rx-Tx), Round Trip Time (RTT), Angle of Arrival (AoA), Angle of Departure (AoD), and signal strength positioning measurements with each parent IAB-DU, which may be, e.g., the external interface, including communication module 1710 and the one or more processors 1730 with dedicated hardware for implementing executable code or software instructions in memory 1740 such as the positioning measurements module 1750.

In one implementation, the IAB node may further include a means for performing one or more of Time Difference of Arrival (TDOA), reception and transmission time (Rx-Tx), Round Trip Time (RTT), Angle of Arrival (AoA), Angle of Departure (AoD), and signal strength positioning measurements with the multiple parent IAB-DUs, which may be, e.g., the external interface, including communication module 1710 and the one or more processors 1730 with dedicated hardware for implementing executable code or software instructions in memory 1740 such as the positioning measurements module 1750.

In one implementation, an IAB node, such as IAB node 1700, with an unknown position in a wireless network includes a mobile terminated (MT) function and a distributed unit (DU) function, such as the one or more processors 1730 with dedicated hardware for implementing executable code or software instructions in memory 1740 such as the MT function module 1742 and DU function module 1744, respectively. The IAB node may include a means for engaging in one or more positioning sessions to determine the position of the IAB node, which may be, e.g., the external interface, including communication module 1710 and network interface 1720, and the one or more processors 1730 with dedicated hardware for implementing executable code or software instructions in memory 1740 such as the positioning session module 1746. A means for sending or receiving with the MT function reference signals for positioning to or from multiple base stations may be, e.g., the external interface, including communication module 1710 and network interface 1720, and the one or more processors 1730 with dedicated hardware for implementing executable code or software instructions in memory 1740 such as the reference signal module 1748.

In one implementation, the IAB node may further include a means for performing one or more of reception and transmission time (Rx-Tx), Round Trip Time (RTT), Angle of Arrival (AoA), Angle of Departure (AoD), and signal strength positioning measurements with each parent IAB-DU, which may be, e.g., the external interface, including communication module 1710 and the one or more processors 1730 with dedicated hardware for implementing executable code or software instructions in memory 1740 such as the positioning measurements module 1750.

In one implementation, the IAB node may further include a means for performing one or more of Time Difference of Arrival (TDOA), reception and transmission time (Rx-Tx), Round Trip Time (RTT), Angle of Arrival (AoA), Angle of Departure (AoD), and signal strength positioning measurements with the multiple parent IAB-DUs, which may be, e.g., the external interface, including communication module 1710 and the one or more processors 1730 with dedicated hardware for implementing executable code or software instructions in memory 1740 such as the positioning measurements module 1750.

In one implementation, the IAB node may further include a means for performing positioning measurements based on the reference signals sent or received to or from the multiple nodes, which may be, e.g., the one or more processors 1730 with dedicated hardware for implementing executable code or software instructions in memory 1740 such as the positioning measurements module 1750.

In one implementation, an IAB node, such as IAB node 1700, with an unknown position in a wireless network includes a mobile terminated (MT) function and a distributed unit (DU) function, such as the one or more processors 1730 with dedicated hardware for implementing executable code or software instructions in memory 1740 such as the MT function module 1742 and DU function module 1744, respectively. The IAB node may include a means for sending or receiving messages for one or more positioning sessions to determine the position of the IAB node, which may be, e.g., the external interface, including communication module 1710 and network interface 1720, and the one or more processors 1730 with dedicated hardware for implementing executable code or software instructions in memory 1740 such as the positioning session module 1746. A means for sending or receiving with the MT function reference signals for positioning to or from multiple base stations may be, e.g., the external interface, including communication module 1710 and network interface 1720, and the one or more processors 1730 with dedicated hardware for implementing executable code or software instructions in memory 1740 such as the reference signal module 1748.

In one implementation, the IAB node may further include a means for performing one or more of reception and transmission time (Rx-Tx), Round Trip Time (RTT), Angle of Arrival (AoA), Angle of Departure (AoD), and signal strength positioning measurements with each parent IAB-DU, which may be, e.g., the external interface, including communication module 1710 and the one or more processors 1730 with dedicated hardware for implementing executable code or software instructions in memory 1740 such as the positioning measurements module 1750.

In one implementation, the IAB node may further include a means for performing one or more of Time Difference of Arrival (TDOA), reception and transmission time (Rx-Tx), Round Trip Time (RTT), Angle of Arrival (AoA), Angle of Departure (AoD), and signal strength positioning measurements with the multiple parent IAB-DUs, which may be, e.g., the external interface, including communication module 1710 and the one or more processors 1730 with dedicated hardware for implementing executable code or software instructions in memory 1740 such as the positioning measurements module 1750.

In one implementation, the IAB node may further include a means for sending or receiving reference signals for positioning with the DU function to or from multiple nodes in the wireless network, wherein the multiple nodes comprise user equipments (UEs) or MT functions of downstream IAB nodes, which may be, e.g., the external interface, including communication module 1710, and the one or more processors 1730 with dedicated hardware for implementing executable code or software instructions in memory 1740 such as the reference signal module 1748.

In one implementation, the IAB node may further include a means for performing positioning measurements based on the reference signals sent or received to or from the multiple base stations, which may be, e.g., the one or more processors 1730 with dedicated hardware for implementing executable code or software instructions in memory 1740 such as the positioning measurements module 1750.

In one implementation, an IAB node, such as IAB node 1700, with an unknown position in a wireless network includes a mobile terminated (MT) function and a distributed unit (DU) function, such as the one or more processors 1730 with dedicated hardware for implementing executable code or software instructions in memory 1740 such as the MT function module 1742 and DU function module 1744, respectively. The IAB node may include a means for send or receive messages for one or more positioning sessions to determine the position of the IAB node, which may be, e.g., the external interface, including communication module 1710 and network interface 1720, and the one or more processors 1730 with dedicated hardware for implementing executable code or software instructions in memory 1740 such as the positioning session module 1746. A means for sending or receiving with the DU function reference signals for positioning to or from multiple nodes in the wireless network, wherein the multiple nodes comprise user equipments (UEs) or MT functions of downstream IAB nodes may be, e.g., the external interface, including communication module 1710 and network interface 1720, and the one or more processors 1730 with dedicated hardware for implementing executable code or software instructions in memory 1740 such as the reference signal module 1748.

In one implementation, the IAB node may further include a means for performing one or more of reception and transmission time (Rx-Tx), Round Trip Time (RTT), Angle of Arrival (AoA), Angle of Departure (AoD), and signal strength positioning measurements with the nodes, which may be, e.g., the external interface, including communication module 1710 and the one or more processors 1730 with dedicated hardware for implementing executable code or software instructions in memory 1740 such as the positioning measurements module 1750.

Figure 18:
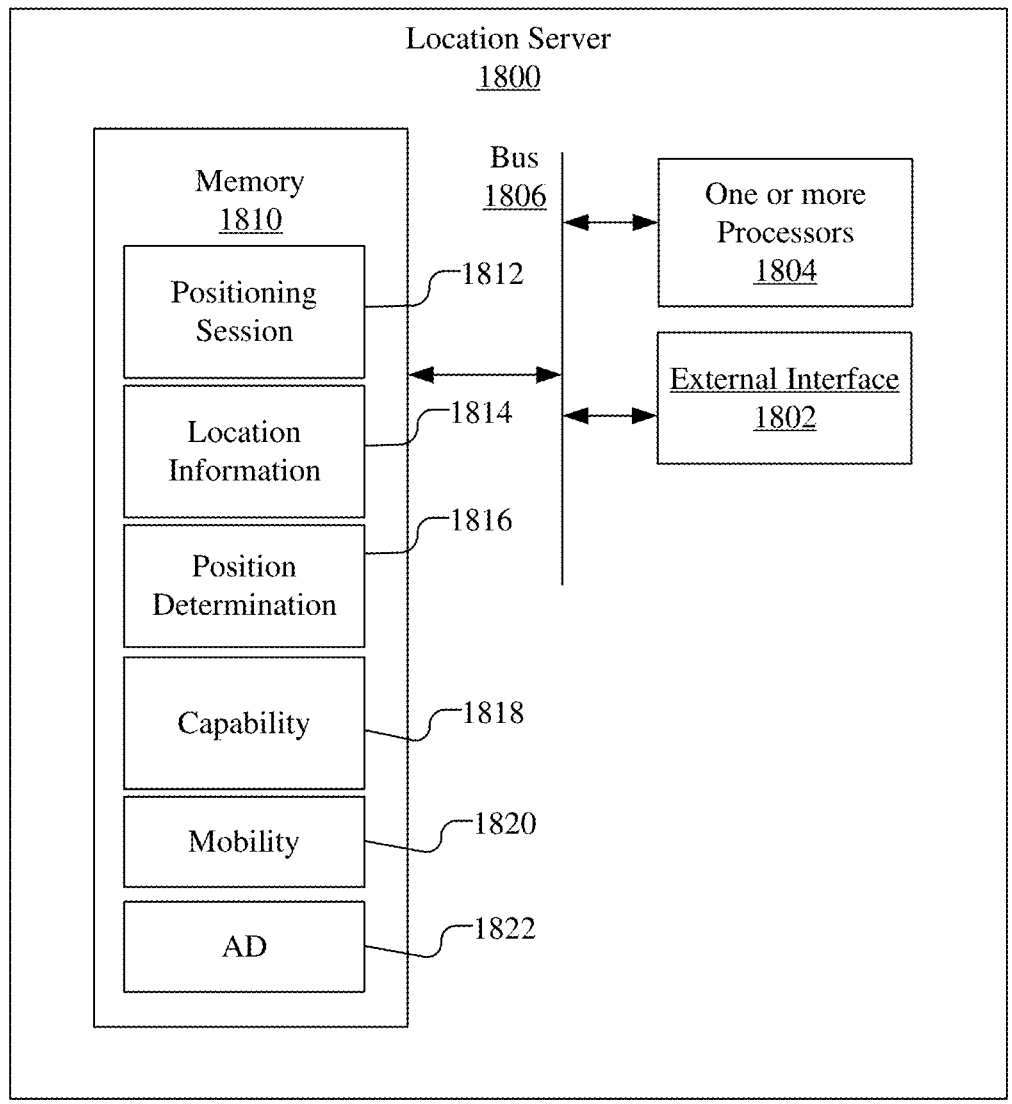
FIG. 18 is a diagram of a hardware implementation of a location server that is capable of positioning as discussed herein.

FIG. 18 is a diagram illustrating an example of a hardware implementation of a location server 1800, such as location server 164/196 shown in FIGS. 1 and 8-11, which may be a Location Management Function (LMF) in a NR network or a Secure User Plane Location (SUPL) Location Platform (SLP) or Enhanced Serving Mobile Location Center (eS-MLC) in LTE. The location server 1800 includes, e.g., hardware components such as an external interface 1802, which may be a wired or wireless interface capable of connecting to an IAB node, e.g., through a IAB donor, and to base stations 105 and UE 115, e.g., via intermediate network entities. The location server 1800 includes a one or more processors 1804 and memory 1810, which may be coupled together with bus 1806. The memory 1810 may contain executable code or software instructions that when executed by the one or more processors 1804 cause the one or more processors 1804 to operate as a special purpose computer programmed to perform the procedures and techniques disclosed herein.

As illustrated in FIG. 18, the memory 1810 includes one or more components or modules that when implemented by the one or more processors 1804 implements the methodologies described herein. While the components or modules are illustrated as software in memory 1810 that is executable by the one or more processors 1804, it should be understood that the components or modules may be dedicated hardware either in the processors 1804 or off processor.

As illustrated, the memory 1810 may include a positioning session module 1812 that configures the one or more processors 1804 to engage in a positioning session, via the external interface 1802, e.g., with an IAB node via an IAB donor, or UEs to determine a position of the IAB node or the UE.

A location information module 1814 configures the one or more processors to receive location information from an IAB node, e.g., via an IAB donor, base stations and/or one or more UEs 115, via the external interface 1802. The location information, for example, may be positioning measurements from reference signals received by the MT function and/or DU function of the IAB node for positioning from multiple nodes in the wireless network. The positioning measurement results may be include downlink or uplink measurements between UEs and base stations, sidelink measurements between UEs, and measurements between base stations. The positioning measurement results may, e.g., one or more of Time Difference of Arrival (TDOA), Round Trip Time (RTT), Angle of Arrival (AoA), Angle of Departure (AoD), and signal strength. The location information may additionally or alternatively include estimated positions determined by a UE, e.g., in a UE based positioning procedure.

The memory 1810 may include a position determination module 1816 that configures the one or more processors 1804 to determine a position estimate for the IAB node using received location information. A position estimate for a UE may also be determined. The position estimate may be determined by excluding UE positioning measurements that were generated by a mobile IAB node.

The memory 1810 may further include a capability module 1818 that configures the one or more processors 1804 to send and receive, via the external interface 1802, capability information for an IAB node. The capability information, for example, may indicate the IAB nodes capability to send or receive reference signals to one or more parent IAB-DUs, non-IAB nodes or other IAB nodes.

The memory 1810 may further include a mobility module 1820 that may configure the one or more processors 1804 to receive, via the external interface 1802, from an IAB node an indication of the mobility of the IAB node, for example, whether the IAB node is fully mobile, fully stationary, or occasionally mobile. The indication of mobility may be used for positioning of a UE, for example, by generating positioning assistance data for UE that excludes mobile IAB nodes, or by excluding from position determination for the UE positioning measurements that were generated by a mobile IAB node (e.g., received in location information).

The memory 1810 may include an assistance data module 1822 that configures the one or more processors 1804 to generate assistance data and to forward the assistance data to a UE. The assistance data may include, e.g., locations of base stations including IAB nodes and IAB donors. The assistance data may provide an indication of the mobility of an IAB node, e.g., received via the mobility module 1820. The assistance data may exclude IAB nodes that indicate that they are mobile, e.g., fully mobile or fully mobile or occasionally mobile.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1810) and executed by one or more processor units (e.g. processors 1804), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1810, and are configured to cause the one or more processors (e.g. processors 1804) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a location server, such as location server 1800, may be configured to perform positioning for an integrated access backhaul (IAB) node with an unknown position in a wireless network, the IAB node including a mobile terminated (MT) function and a distributed unit (DU) function. The location server may include a means for receiving location information from the IAB node, the location information comprising positioning measurements from reference signals received by the IAB node for positioning from multiple nodes in the wireless network, which may be, e.g., the external interface 1802 and the one or more processors 1804 with dedicated hardware for implementing executable code or software instructions in memory 1810 such as the location information module 1814. A means for determining a position for the IAB node using the received location information may be, e.g., the one or more processors 1804 with dedicated hardware for implementing executable code or software instructions in memory 1810 such as the position determination module 1816.

In one implementation, a location server, such as location server 1800, may be configured to perform positioning for an integrated access backhaul (IAB) node with an unknown position in a wireless network, the IAB node including a mobile terminated (MT) function and a distributed unit (DU) function. The location server may include a means for receiving from an integrated access backhaul (IAB) node an indication of mobility of the IAB node, which may be, e.g., the external interface 1802 and the one or more processors 1804 with dedicated hardware for implementing executable code or software instructions in memory 1810 such as the mobility module 1820. A means for using the indication of mobility of the IAB node for positioning of the UE may be, e.g., the one or more processors 1804 with dedicated hardware for implementing executable code or software instructions in memory 1810 such as the position determination module 1816 or the assistance data module 1822.

In one implementation, the location server may further include a means for generating positioning assistance data for UE excluding the IAB node when the indication of mobility of the IAB node indicates that the IAB node is mobile, which may be, e.g., the one or more processors 1804 with dedicated hardware for implementing executable code or software instructions in memory 1810 such as the assistance data module 1822.

In one implementation, the location server may further include a means for receiving positioning measurements generated using the IAB node, which may be, e.g., the external interface 1802 and the one or more processors 1804 with dedicated hardware for implementing executable code or software instructions in memory 1810 such as the location information module 1814. A means for excluding the positioning measurements generated using the IAB node for positioning of the UE when the indication of mobility of the IAB node indicates that the IAB node is mobile may be, e.g., the one or more processors 1804 with dedicated hardware for implementing executable code or software instructions in memory 1810 such as the position determination module 1816.

Figure 19:
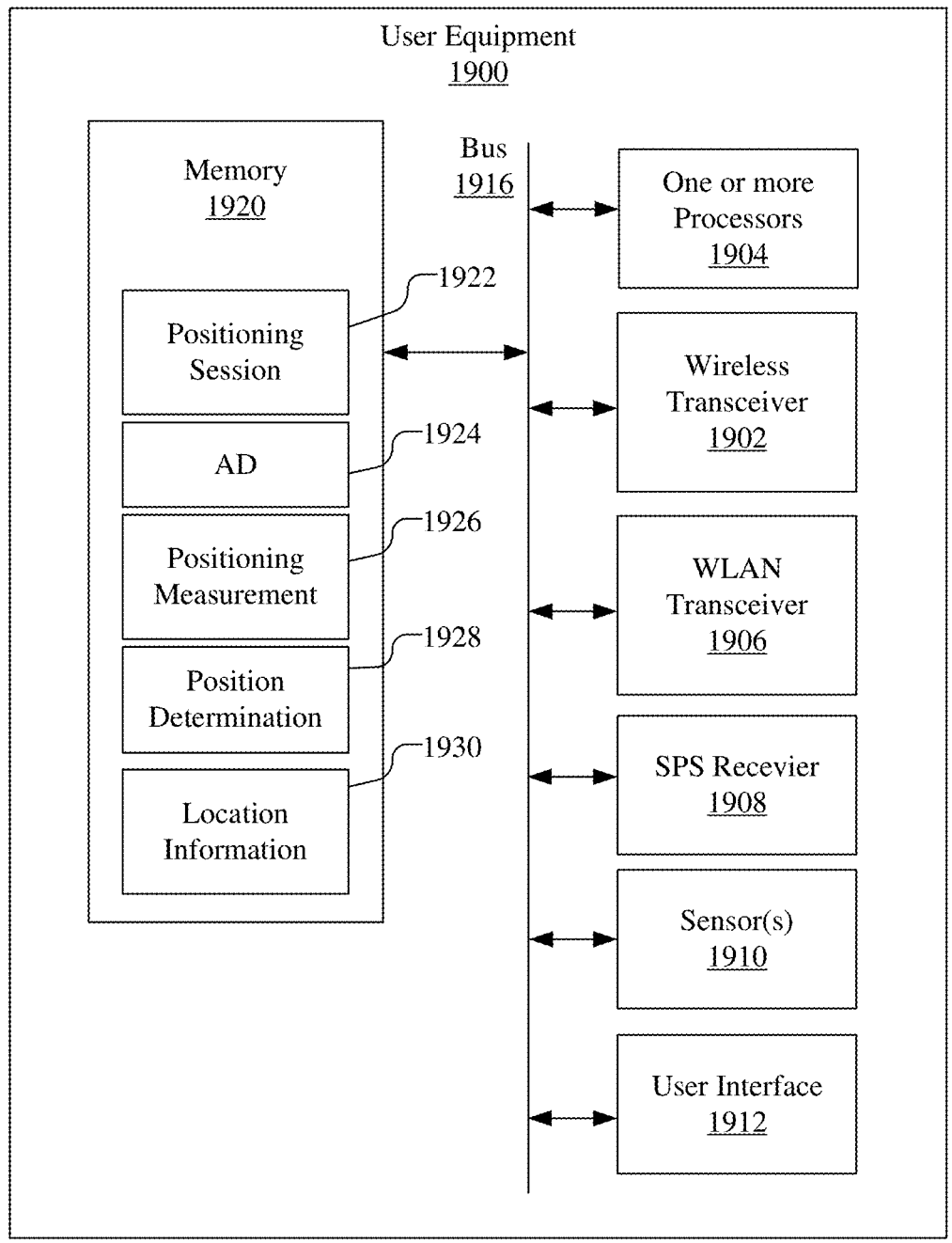
FIG. 19 is a diagram illustrating an example of a hardware implementation of a UE capable of positioning as discussed herein.

FIG. 19 is a diagram illustrating an example of a hardware implementation of UE 1900, such as UE 115. The UE 1900 may include a wireless transceiver 1902 to wirelessly communicate with a base station, e.g., IAB node. The UE 1900 may also include additional transceivers, such a wireless local area network (WLAN) transceiver 1906, as well as an SPS receiver 1908 for receiving and measuring signals from SPS SVs. The UE 1900 may further include one or more sensors 1910, such as cameras, accelerometers, gyroscopes, electronic compass, magnetometer, barometer, etc. The UE 1900 may further include a user interface 1912 that may include e.g., a display, a keypad or other input device, such as virtual keypad on the display, through which a user may interface with the UE 1900. The UE 1900 further includes one or more processors 1904 and memory 1920, which may be coupled together with bus 1916. The one or more processors 1904 and other components of the UE 1900 may similarly be coupled together with bus 1916, a separate bus, or may be directly connected together or coupled using a combination of the foregoing. The memory 1920 may contain executable code or software instructions that when executed by the one or more processors 1904 cause the one or more processors to operate as a special purpose computer programmed to perform the algorithms disclosed herein.

As illustrated in FIG. 19, the memory 1920 may include one or more components or modules that may be implemented by the one or more processors 1904 to perform the methodologies described herein. While the components or modules are illustrated as software in memory 1920 that is executable by the one or more processors 1904, it should be understood that the components or modules may be dedicated hardware either in the one or more processors 1904 or off the processors.

As illustrated, the memory 1920 may include a positioning session module 1922 that configures the one or more processors 1904 to engage in a positioning session, via the wireless transceiver 1902, e.g., to determine a position of the UE 1900.

The memory 1920 may include an assistance data module 1924 that configures the one or more processors 1904 to receive assistance data from a location server, e.g., location server 164/196. The assistance data may include, e.g., locations of base stations including IAB nodes, and/or IAB donors. The assistance data may provide an indication of the mobility of an IAB node. The assistance data may exclude IAB nodes that indicate that they are mobile, e.g., fully mobile or fully mobile or occasionally mobile.

The memory 1920 may include a positioning measurement module 1926 that configures the one or more processors 1904 to perform positioning measurements with a plurality of base stations, wherein the indication of mobility of the IAB node received in assistance data may be used during the positioning measurement. For example, the positioning measurement module 1926 may configure the one or more processors 1904 to receive, via the wireless transceiver 1902, receive downlink signals from base stations and/or to perform positioning measurements, or to transmit uplink reference signals, to the base stations for performing positioning measurements. The positioning measurements may include, for example, one or more of Time Difference of Arrival (TDOA), Round Trip Time (RTT), Angle of Arrival (AoA), Angle of Departure (AoD), and signal strength.

The memory 1920 may include a position determination module 1928 that configures the one or more processors 1904 to determine a position estimate for the UE, e.g., in a UE based positioning procedure, using the position measurements and information from the assistance data. The position determination may use the indication of mobility of an IAB node, e.g., by excluding from position determination positioning measurements that were generated by a mobile IAB node.

The memory 1920 may include a location information module 1930 that configures the one or more processors 1904 to send to a location server, via the wireless transceiver 1902, location information for the UE. The location information, for example, may be positioning measurement results obtained using positioning measurement module 1926 and/or the position estimate obtained using position determination module 1928.

The methodologies described herein may be implemented by various means depending upon the application. For example, these methodologies may be implemented in hardware, firmware, software, or any combination thereof. For a hardware implementation, the one or more processors 1904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1920) and executed by one or more processors 1904, causing the one or more processors 1904 to operate as a special purpose computer programmed to perform the techniques disclosed herein. Memory may be implemented within the one or processors 1904 or external to the one or more processors 1904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1900 may be stored as one or more instructions or code on a non-transitory computer-readable storage medium such as memory 1920. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1900 may be provided as signals on transmission media included in a communication apparatus. For example, a communication apparatus comprising part or all of UE 1900 may include a transceiver having signals indicative of instructions and data. The instructions and data are stored on non-transitory computer readable media, e.g., memory 1920, and are configured to cause the one or more processors 1904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a UE, such as UE 1900, configured to perform positioning for the UE may include a means for receiving positioning assistance data from a location server including an indication of mobility for an integrated access backhaul (IAB) node, which may be, e.g., the wireless transceiver 1902 and the one or more processors 1904 with dedicated hardware for implementing executable code or software instructions in memory 1920 such as the assistance data module 1924. A means for performing positioning measurements from a plurality of base stations, wherein the indication of mobility of the IAB node is used during the positioning measurements, may be, e.g., the one or more processors 1904 with dedicated hardware for implementing executable code or software instructions in memory 1920 such as the position determination module 1928.

In one implementation, the UE may further include a means for excluding generating positioning measurements using the IAB node when the indication of mobility of the IAB node indicates that the IAB node is mobile, which may be, e.g., the one or more processors 1904 with dedicated hardware for implementing executable code or software instructions in memory 1920 such as the position determination module 1928.

Figure 20:
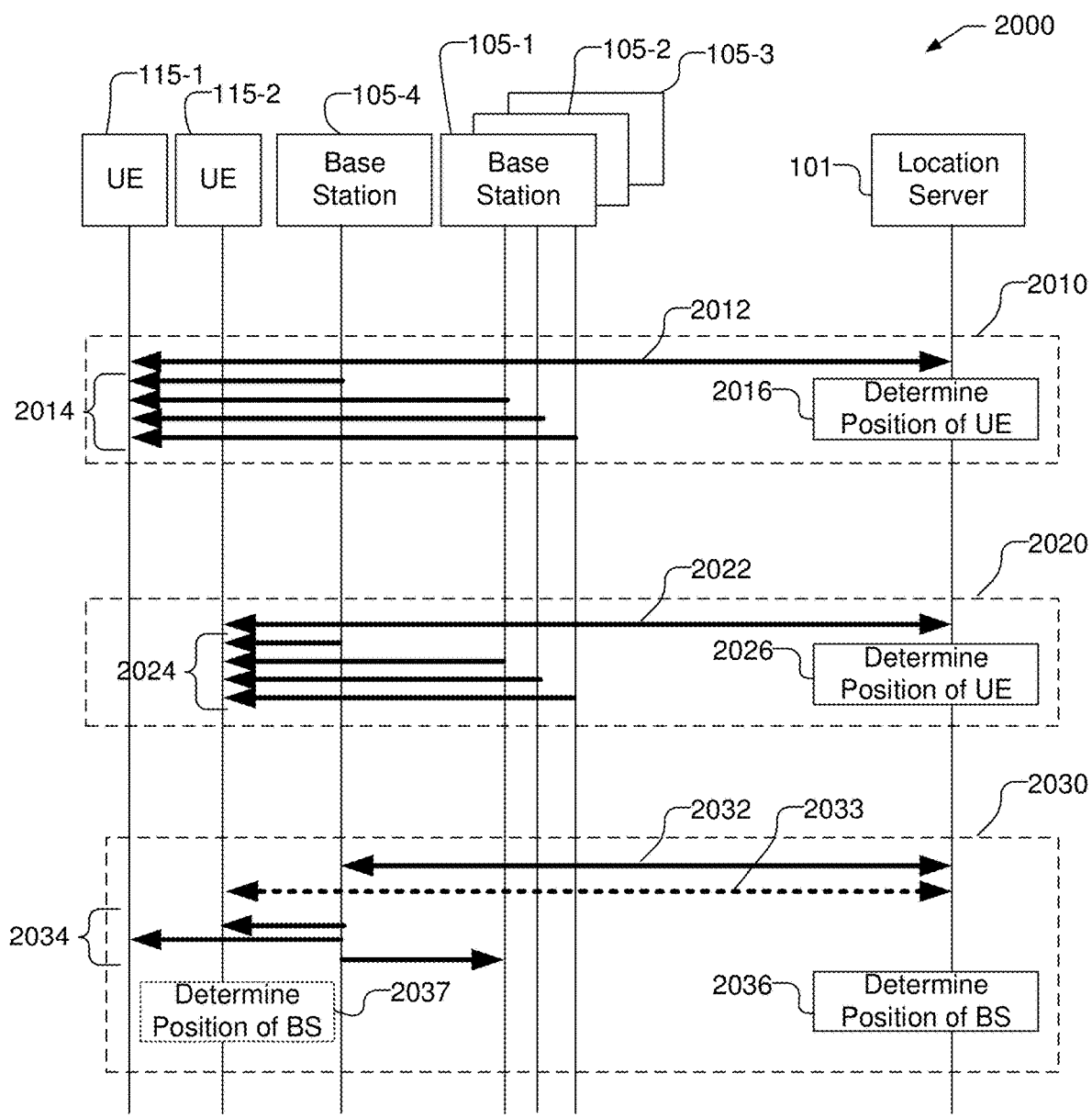
FIG. 20 shows a simplified exemplary procedure for determining a position of a base station.

FIG. 20 shows a simplified exemplary procedure 2000 for determining a position of a base station 105-4. As illustrated, in a first stage 2010, a location server 101 and UE 115-1 may engage in a positioning session, illustrated by arrow 2012. In the positioning session, positioning measurements between UE 115-1 and base stations 105-1, 105-2, 105-3, and base station 105-4, are obtained using reference signals 2014. The reference signals 2014 are illustrated as DL reference signals, but UL or DL and UL reference signals may be used. Moreover, the position measurements may be, e.g., TDOA, AoA, AoD, RTT, or signal strength, etc. As illustrated, UE 115-1 obtains positioning measurements with base station 105-4 despite the position of base station 105-4 being unknown. For example, in some implementations, the UE 115-1 may receive a command message, e.g., from location server 101 or base station 105-4, to perform positioning measurements with base station 105-4. The location server 101 may receive the positioning measurements, e.g., from UE 115-1, and at block 2016 determines a position for the UE 115-1.

At a second stage 2020, the location server 101 and UE 115-2 may engage in a positioning session, illustrated by arrow 2022. In the positioning session, positioning measurements between UE 115-2 and base stations 105-1, 105-2, 105-3, and base station 105-4, are obtained using reference signals 2024. The reference signals 2024 are illustrated as DL reference signals, but UL or DL and UL reference signals may be used. Moreover, the position measurements may be, e.g., TDOA, AoA, AoD, RTT, or signal strength, etc. As illustrated, UE 115-2 obtains positioning measurements with base station 105-4 despite the position of base station 105-4 being unknown. For example, in some implementations, the UE 115-2 may receive a command message, e.g., from location server 101 or base station 105-4, to perform positioning measurements with base station 105-4. The location server 101 may receive the positioning measurements, e.g., from UE 115-2, and at block 2026 determines a position for the UE 115-2.

At a third stage 2030, the position of the base station 105-4 may be determined. The location server 101 and the base station 105-4 may engage in a positioning session, illustrated by arrow 2032. In some implementations, the location server 101 may engage in a positioning session with another node, e.g., UE-2, to determine the position of the base station 105-4, as illustrated by the dotted arrow 2033. For example, the UE 115-2 may receive a command message, e.g., from location server 101 or base station 105-4, to perform positioning measurements with base station 105-4. In the positioning session, positioning measurements between base station 105-4 and UEs 115-1, 115-2 and UE 115-2 are obtained using reference signals 2034. The reference signals 2034 are illustrated as DL reference signals, but UL or DL and UL reference signals may be used. Moreover, the position measurements may be, e.g., TDOA, AoA, AoD, RTT, or signal strength, etc. In some implementations, the positioning measurements between base station 105-4 and UE 115-1 from first stage 2010 and between base station 105-4 and UE 115-2 from second stage 2020 may be used, thereby obviating the need for new positioning measurements with UEs 115-1 and 115-2 in third stage 2030. With the positions of UEs 115-1 and 115-2, and base station 105-1 known, and positioning measurements with the UEs 115-1 and 115-2, and base station 105-1, at block 2036 the location server 101 may determine the position of the base station 105-4. In a UE based positioning process, at block 2037, the UE 115-2 may determine the position of the base station 105-4 based on the positions of UEs 115-1 and 115-2, and base station 105-1 known, and positioning measurements with the UEs 115-1 and 115-2, and base station 105-1.

Figure 21:
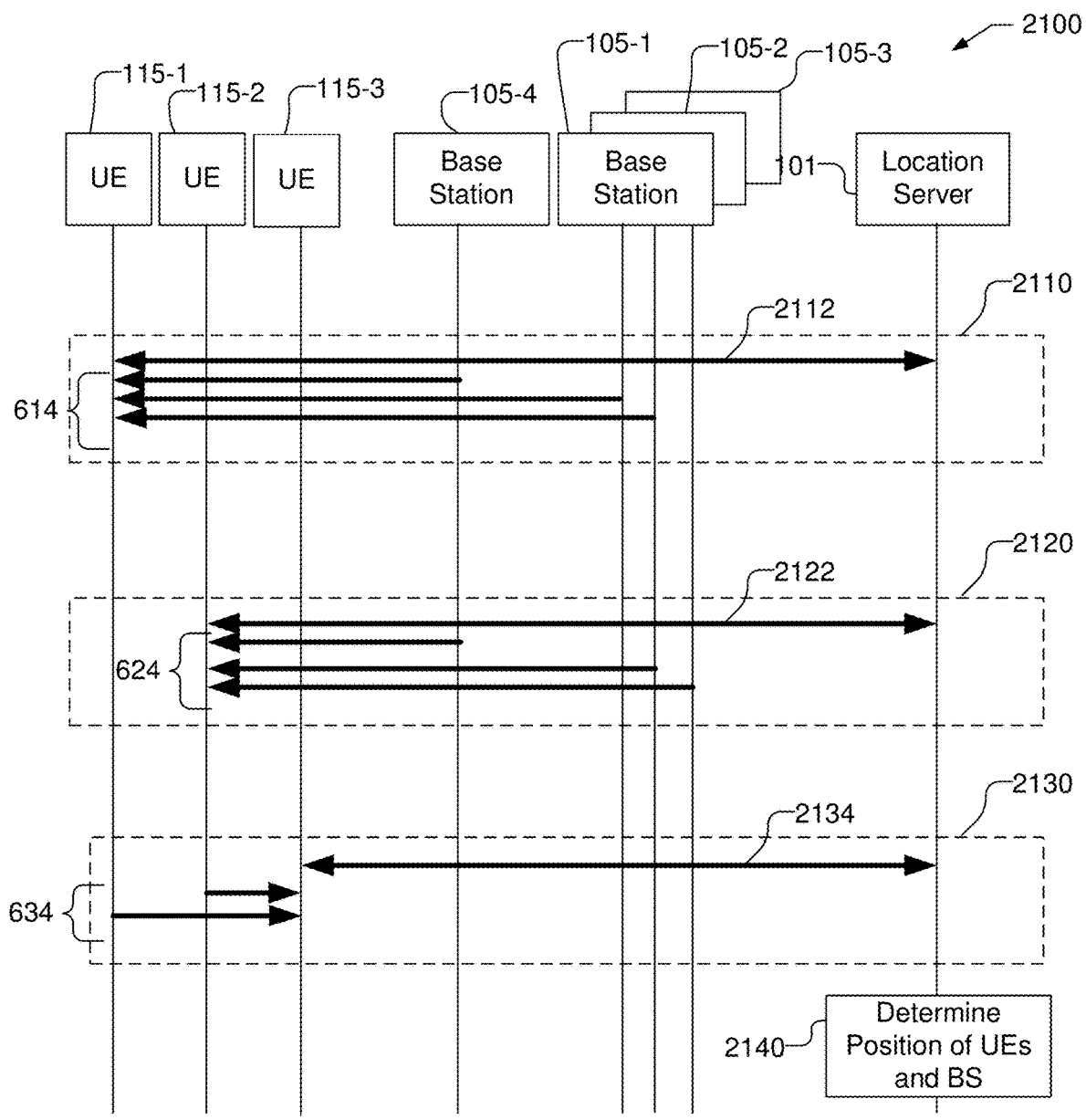
FIG. 21 shows another simplified exemplary procedure for determining a position of a base station.

FIG. 21 shows another simplified exemplary procedure 2100 for determining a position of a base station 105-4. As illustrated, in a first stage 2110, a location server 101 and UE 115-1 may engage in a positioning session, illustrated by arrow 2112. In the positioning session, positioning measurements between UE 115-1 and base stations 105-1 and 105-2, and base station 105-4, are obtained using reference signals 2114. The reference signals 2114 are illustrated as DL reference signals, but UL or DL and UL reference signals may be used. Moreover, the position measurements may be, e.g., TDOA, AoA, AoD, RTT, or signal strength, etc. In some implementations, the UE 115-1 may receive a command message, e.g., from location server 101 or base station 105-4, to perform positioning measurements with base station 105-4. The position of the UE 115-1 may not be determined in positioning session 2110.

At a second stage 2120, the location server 101 and UE 115-2 may engage in a positioning session, illustrated by arrow 2122. In the positioning session, positioning measurements between UE 115-2 and base stations 105-2, 105-3, and base station 105-4, are obtained using reference signals 2124. The reference signals 2124 are illustrated as DL reference signals, but UL or DL and UL reference signals may be used. Moreover, the position measurements may be, e.g., TDOA, AoA, AoD, RTT, or signal strength, etc. In some implementations, the UE 115-2 may receive a command message, e.g., from location server 101 or base station 105-4, to perform positioning measurements with base station 105-4. The position of the UE 115-2 may not be determined in positioning session 2120.

At a third stage 2130, the location server 101 and UE 115-3 may engage in a positioning session, illustrated by arrow 2132. In the positioning session, positioning measurements between UE 115-3 and UEs 115-1 and 115-2 are obtained using sidelink reference signals 2124. The position of the UE 115-3 may not be determined in positioning session 2130.

From the three positioning sessions shown in stages 2110, 2120, and 2130, the location server 101 has eight positioning measurements and there are four unknown positions, e.g., for base station 105-4 and UEs 115-1, 115-2 and 115-3. Assuming only xy-plane (2-coordinates for each position), there are 4*2=8 unknowns. There are 8 unknowns and 8 equations, which may be solved by the location server 101. Thus, at block 2140, the location server 101 may jointly determine the positions of base station 105-4 and UEs 115-1, 115-2 and 115-3.

As illustrated, the positioning session at stage 2130 did not include positioning measurements with the base station 105-4, but nevertheless may be used to determine the position of base station 105-4. If desired, a similar procedure may be used to determine the positions of multiple base stations, rather than multiple UEs.

Figure 22:
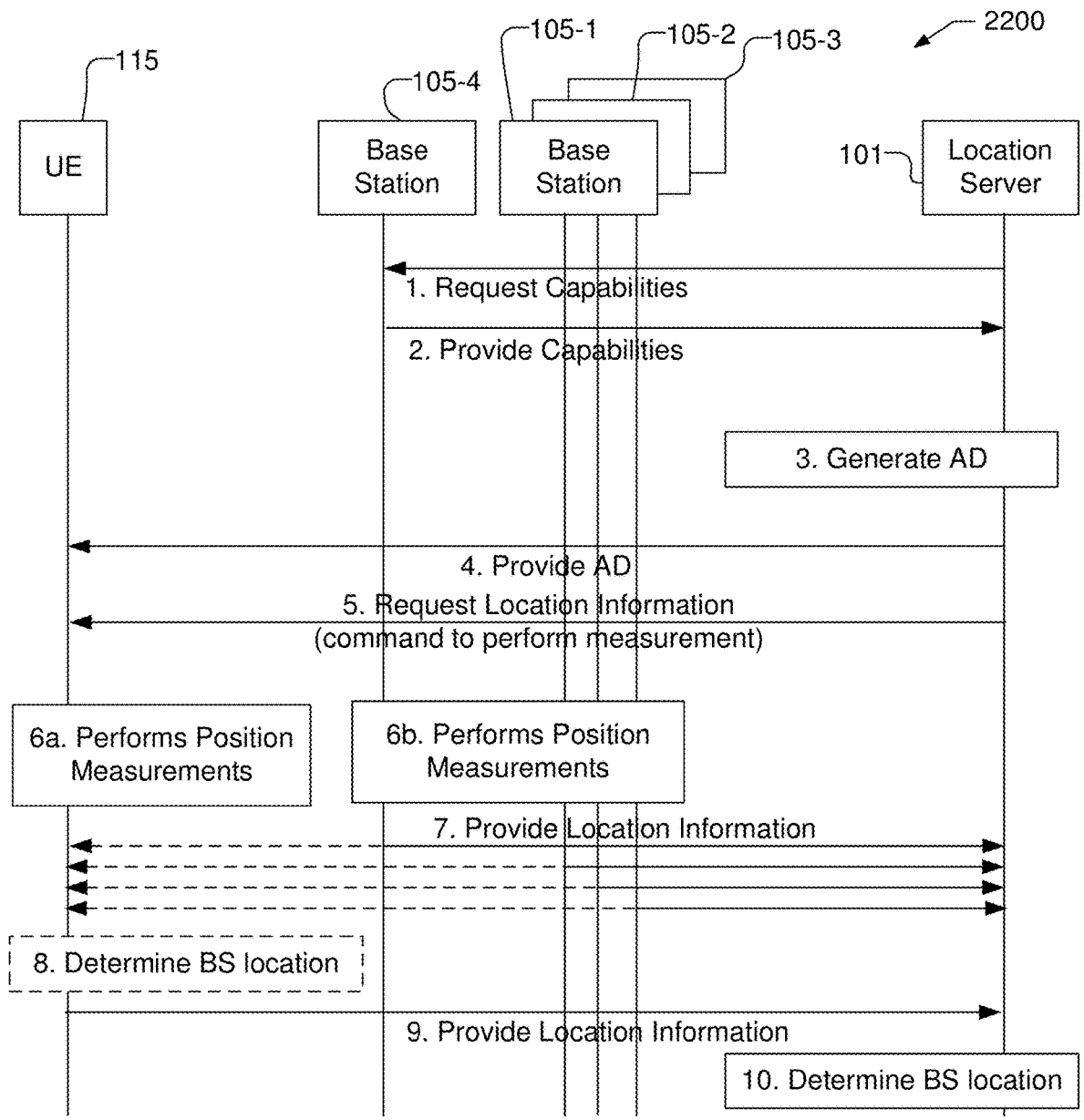
FIG. 22 shows a procedure including messages that may be used for determining a position of a base station.

FIG. 22 shows a procedure 2200 including messages that may be used for determining a position of a base station, such as base station 105-4.

At stage 1, a location server 101 sends a Request Capabilities message to base station 105-4 to be positioned, e.g., via intervening network entities, such as an AMF (not shown) to request the capabilities of base station 105-4. The Request Capabilities message may indicate the type of capabilities needed. For example, the query may be for positioning capabilities of the base station 105-4, e.g., whether the base station has full UE functionality, e.g., capable of an LPP sessions, or limited functionality, e.g., capable of measuring Channel-State Information Reference Signal (CSI-RS) or PRS from UEs or other base stations.

At stage 2, the base station 105-4 returns a Provide Capabilities message to location server 101 comprising the positioning capabilities of base station 105-4. The base station 105-4 may also provide an indication of mobility, e.g., whether the base station 105-4 is fully stationary, occasionally mobile, or fully mobile, etc.

At stage 3, the location server 101 may generate positioning assistance data (AD). The assistance data may include assistance data for the base station 105-5 and other base stations 105-1, 105-2, and 105-3. The assistance data, for example, may include the locations of base stations 105-1, 105-2, and 105-3, which may be used by the UE 115, e.g., in a UE based positioning procedure. The assistance data may further include, e.g., the mobility indication for the base station 105-4 and any of the base stations 105-1, 105-2, and 105-3, if known. The assistance data may additionally include assistance data for performing positioning measurements with another UE (not shown), e.g., sidelink. The assistance data for another UE may not include the identity of the UE, e.g., the UE-ID, and may not include measurement timestamps for the UE or the measurement timestamps may be quantized, e.g., current, recent, old.

At stage 4, the location server 101 provides the assistance data to the UE 115.

At stage 5, the location server 101 sends a Request Location Information message to the UE 115 to request desired location information, e.g., positioning measurements. The message may include, e.g., the type of positioning measurements, the desired accuracy, response time, etc. Moreover, the message may include a command to perform positioning measurements with base station 105-4, the command may indicate if the positioning measurement is mandatory. The command may indicate that the UE 115 is to initiate a positioning session to determine the position of the UE and that positioning measurements of the base station 105-4 are to be obtained or that the positioning session is for the base station 105-4. It should be understood that if base station 105-4 indicated in the Provide Capabilities message in stage 2 that the base station 105-4 had full UE functionality, e.g., capable of an LPP sessions, the location server 101 may send the Request Location Information message to the base station 105-4 instead of UE 115. The location server 101 may send additional Request Location Information messages to other UEs, as well as base stations for determining a position of the base station 105-4.

At stage 6*a*, the UE 115 performs the requested positioning measurement using the reference signal transmissions from the base stations 105-1, 105-2, 105-3, and 105-4. For example, the positioning measurements may be one or more of a TOA, RSTD, or Rx-Tx, AoA, AoD, signal strength, etc. It should be understood that the UE 115 may further perform positioning measurements with additional nodes, e.g., other UEs and base stations, some of which may have known positions and some of which may have unknown positions.

At stage 6*b*, the base stations 105-1, 105-2, 105-3, and 105-4 perform the request positioning measurement using the reference signal transmissions from the UE 115. For example, the positioning measurements may be one or more of a TOA, RSTD, or Rx-Tx, AoA, AoD, signal strength, etc.

It should be understood that the base stations 105-1, 105-2, 105-3, and 105-4 may further perform positioning measurements with additional nodes, e.g., additional UEs and between base stations or with other base stations, some of which may have known positions and some of which may have unknown positions.

It should be understood that one or both of stages 6*a* and 6*b* may be performed. For example, for RTT positioning measurements, both stages 6*a* and 6*b* would be performed. Moreover, it should be understood that At stage 7, the base stations 105-1, 105-2, 105-3, and 105-4 may provide the location information obtained at stage 6*b* to the location server 101. The location information, for example, may be the desired positioning measurements. As illustrated with dotted arrows in stage 7, the base stations 105-1, 105-2, 105-3, and 105-4 may provide the location information obtained at stage 6*b* to the UE 115 instead of the location server 101, e.g., in a UE based positioning procedure.

At optional stage 8, e.g., for a UE based positioning procedure, the UE 115 may determine the position of the base station 105-4, e.g., using the position measurements from stage 6*a* and the assistance data received at stage 4, and the location information received from the base stations at stage 7 if performed. The UE 115 may additionally determine the position of the UE 115 along with the position of the base station 105-4, e.g., in an iterative approach or in a joint approach.

At stage 9, the UE 115 provides the location information to the location server 101. The location information, for example, may be the positioning measurements obtained at stage 6*a* or the position of the base station 105-4 and/or UE 115 determined at stage 8, or both.

At stage 10, the location server 101 may determine or confirm the position of the base station 105-4, e.g., using the location information received at one or both stages 7 and 9. The location server 101 may determine the position of the UE 115 along with the position of the base station 105-4, e.g., in an iterative approach or in a joint approach.

Figure 23:
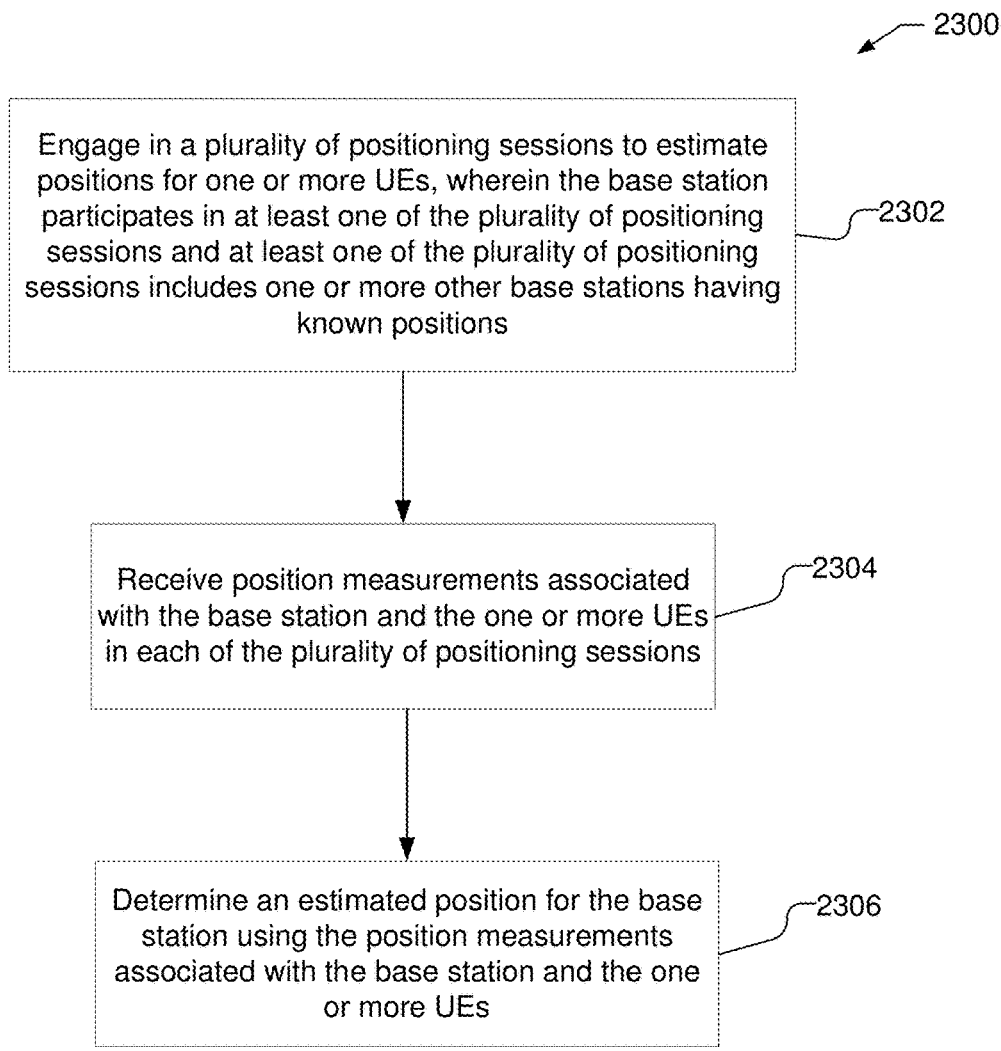
FIG. 23 shows a process flow illustrating a method for positioning for a base station with an unknown position performed by location server.

FIG. 23 shows a process flow 2300 illustrating a method for positioning for a base station with an unknown position performed by location server, such as location server 101, in a wireless network.

Process flow 2300 may start at block 2302 where the location server engages in a plurality of positioning sessions to estimate positions for one or more user equipments (UEs), wherein the base station participates in at least one of the plurality of positioning sessions and at least one of the plurality of positioning sessions includes one or more other base stations having known positions, e.g., as illustrated in stages 2010, 2020, and 2030 of FIG. 20, stages 2110, 2120, and 2130 of FIG. 21, and discussed at stage 5 of FIG. 22. For example, the location server may engage in positioning sessions by sending or receiving messages for the position sessions. At block 2304, the location server receives position measurements associated with the base station and the one or more UEs in each of the plurality of positioning sessions, e.g., as illustrated in stages 2010, 2020, and 2030 of FIG. 20, stages 2110, 2120, and 2130 of FIG. 21, and discussed at stages 7 and 9 of FIG. 22. At block 2306, the location server determines an estimated position for the base station using the position measurements associated with the base station and the one or more UEs, e.g., as illustrated in stage 2036 of FIG. 20, stage 2140 of FIG. 21, and stage 10 of FIG. 22.

In some implementations, the plurality of positioning sessions comprises a plurality of nodes in the wireless network having unknown positions, each node is one of a UE or a base station, the location server may determine estimated positions for each node in the plurality of nodes, e.g., as illustrated in stages 2016, 2026, and 2036 of FIG. 20 and stage 2140 of FIG. 21 and stage 10 of FIG. 22.

In some implementations, the estimated position for at least one node in the plurality of nodes is determined before determining the estimated position for the base station, and wherein determining the estimated position for the base station further uses the estimated positions for the at least one node in the plurality of nodes, e.g., as illustrated in stages 2016, 2026, and 2036 of FIG. 20 and stage 10 of FIG. 22.

In some implementations, the location server may determine the estimated positions for the at least one node in the plurality of nodes by repeatedly identifying subsets of position measurements involving nodes having known positions and determining estimated positions of individual nodes using an identified subset of position measurements, wherein an individual node with an estimated position is included in subsets of position measurements for determining estimated positions of other nodes, e.g., as illustrated in stages 2010, 2020, and 2030 of FIG. 20. The location server may determine an uncertainty value for each estimated position based on uncertainties in the position measurements, wherein identifying the subsets of position measurements comprises minimizing an overall uncertainty value for each subset of position measurements.

In some implementations, the estimated positions for each node in the plurality of nodes and the estimated position for the base station are determined at the same time, e.g., as illustrated in stage 2140 of FIG. 21 and stage 10 of FIG. 22.

In some implementations, the estimated positions for each node in the plurality of nodes and the estimated position for the base station are determined using pairwise position measurements between nodes including downlink or uplink measurements between UEs and base stations, sidelink measurements between UEs, and measurements between base stations, e.g., as illustrated in stages 2016, 2026, and 2036 of FIG. 20 and stage 2140 of FIG. 21 and stage 10 of FIG. 22. The measurements between base stations comprise measurements made by a base station or measurements made by a separate UE-function that is co-located with the base station.

In some implementations, the estimated positions for node in the plurality of nodes and the estimated position for the base station are determined using one or more of Time Difference of Arrival (TDOA), Round Trip Time (RTT), Angle of Arrival (AoA), Angle of Departure (AoD), and signal strength.

Figure 24:
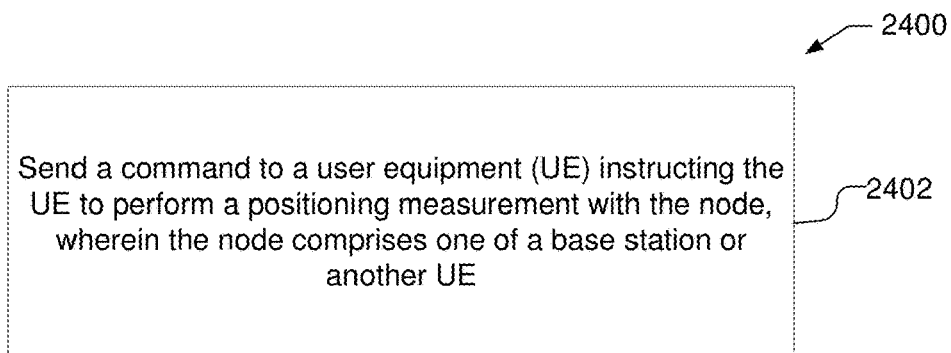
FIG. 24 shows a process flow illustrating a method for positioning for a node having an unknown position in a wireless network performed by a network entity.

FIG. 24 shows a process flow 2400 illustrating a method for positioning for a node having an unknown position in a wireless network performed by a network entity. At block 2402, the network entity sends a command to a user equipment (UE) instructing the UE to perform a positioning measurement with the node, wherein the node comprises one of a base station or another UE, e.g., as discussed in stages 2010, 2020, and 2030 of FIG. 20, stages 2110, 2120, and 2130 of FIG. 21, and stage 5 of FIG. 22.

In some implementations, the network entity may be one of a location server, the node having the unknown position, a base station, or another UE.

In some implementations, the command instructing the UE to perform the positioning measurement is mandatory, e.g., as discussed in stage 5 of FIG. 22.

In some implementations, the command instructing the UE to perform the positioning measurement specifies the type of positioning measurement, e.g., as discussed in stage 5 of FIG. 22. For example, the type of positioning measurement comprises one or more of Time Difference of Arrival (TDOA), Round Trip Time (RTT), Angle of Arrival (AoA), Angle of Departure (AoD), and signal strength.

In some implementations, the command instructing the UE to perform the positioning measurement comprises a command to initiate a positioning session for the UE that includes the node having the unknown position, e.g., as discussed in stage 5 of FIG. 22.

Figure 25:
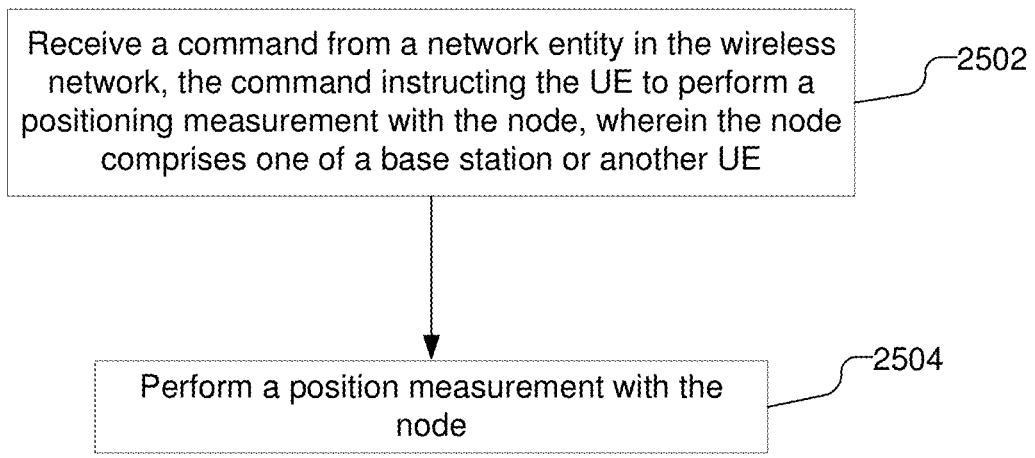
FIG. 25 shows a process flow illustrating a method for positioning for a node having an unknown position in a wireless network performed by a user equipment (UE).

FIG. 25 shows a process flow 2500 illustrating a method for positioning for a node having an unknown position in a wireless network performed by a user equipment (UE). At block 2502, the UE receives a command from a network entity in the wireless network, the command instructing the UE to perform a positioning measurement with the node, wherein the node comprises one of a base station or another UE, e.g., as discussed in stages 2010, 2020, and 2030 of FIG. 20, stages 2110, 2120, and 2130 of FIG. 21, and stage 5 of FIG. 22. At block 2504, the UE performs performing a position measurement with the node, e.g., as discussed in stages 2010, 2020, and 2030 of FIG. 20, stages 2110, 2120, and 2130 of FIG. 21, and stages 6a and 6b of FIG. 22.

In some implementations, the network entity may be one of a location server, the node having the unknown position, a base station, or another UE.

In some implementations, the command instructing the UE to perform the positioning measurement is mandatory, e.g., as discussed in stage 5 of FIG. 22.

In some implementations, the command instructing the UE to perform the positioning measurement specifies the type of positioning measurement, e.g., as discussed in stage 5 of FIG. 22. For example, the type of positioning measurement comprises one or more of downlink Time Difference of Arrival (TDOA), Round Trip Time (RTT), Angle of Arrival (AoA), and Angle of Departure (AoD).

In some implementations, the UE may perform the position measurement with the node by transmitting or receiving a reference signal to or from the node, e.g., as discussed in stages 2010, 2020, and 2030 of FIG. 20, stages 2110, 2120, and 2130 of FIG. 21, and stages 6a and 6b of FIG. 22.

In some implementations, the command instructing the UE to perform the positioning measurement comprises a command to initiate a positioning session for the UE that includes the node having the unknown position, e.g., as discussed in stage 5 of FIG. 22.

In some implementations, the UE may transmit the position measurement to a location server, e.g., as discussed in stages 2010, 2020, and 2030 of FIG. 20, stages 2110, 2120, and 2130 of FIG. 21, and stage 9 of FIG. 22.

In some implementations, the UE may receive assistance data for performing the positioning measurement with the node, e.g., as discussed in stages 3 and 4 of FIG. 22. In some implementations, the node may be the another UE, and the UE-ID is not included in the assistance data, e.g., as discussed in stage 3 of FIG. 22. Additionally, the assistance data may not include measurement timestamps for the another UE or the measurement timestamps are quantized, e.g., as discussed in stage 3 of FIG. 22.

Figure 26:
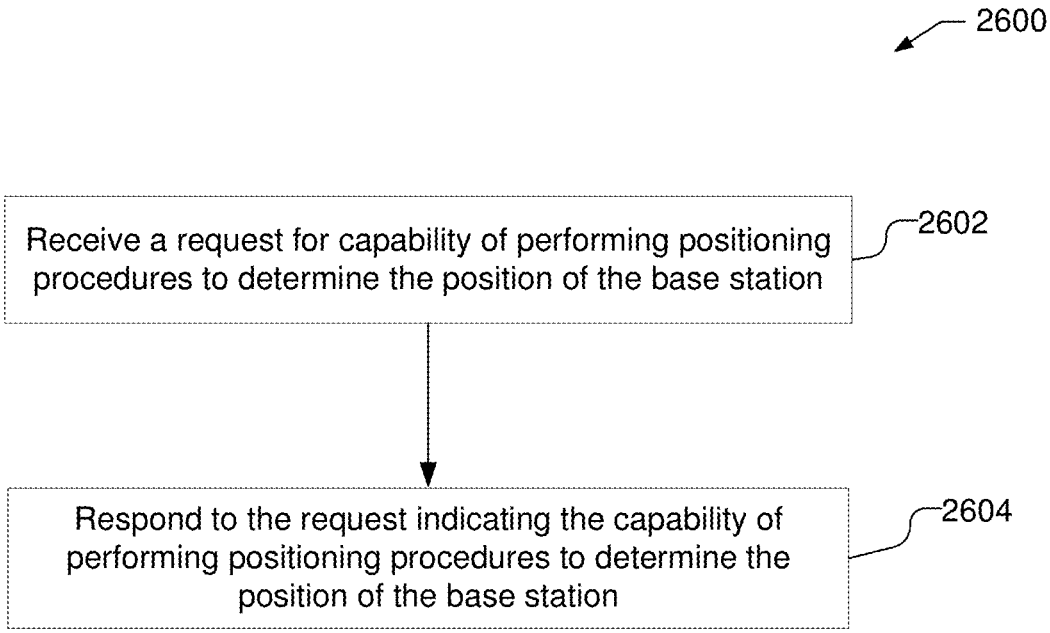
FIG. 26 shows a process flow illustrating a method for positioning for a base station having an unknown position in a wireless network performed by the base station.

FIG. 26 shows a process flow 2600 illustrating a method for positioning for a base station having an unknown position in a wireless network performed by the base station. At block 2602, the base station receives a request for capability of performing positioning procedures to determine the position of the base station, e.g., as discussed in stage 1 of FIG. 22. At block 2604, the base station responds to the request indicating the capability of performing positioning procedures to determine the position of the base station, e.g., as discussed in stage 2 of FIG. 22.

In some implementations, the request for capability is with respect to ability to perform user equipment (UE) functions including the positioning procedures, and wherein responding to the request indicates a capability a capability to enter a UE-to-positioning server protocol session or a capability of limited UE functions comprising performing positioning procedures, performing positioning protocols, or both, e.g., as discussed in stage 2 of FIG. 22.

In some implementations, the base station may indicate a capability for the UE-function to enter a UE-to-positioning server protocol session, and the UE-function may engage in a positioning session with a plurality of network entities having known positions to determine a position of the base station, e.g., as discussed at stage 5 of FIG. 22.

In some implementations, the base station may indicate a capability for the UE-function to enter a UE-to-positioning server protocol session, the base station may further enter a positioning session using the UE-to-positioning server protocol and concurrently enter a positioning session using a base station-to-positioning server protocol.

In some implementations, the base station may indicate a capability of limited UE functions comprising performing positioning procedures, performing positioning protocols, or both, and the UE may positioning measurements with one or more network entities having known positions to determine a position of the base station, e.g., as discussed in stages 2010, 2020, and 2030 of FIG. 20, stages 2110, 2120, and 2130 of FIG. 21, and stages 6a and 6b of FIG. 22.

In some implementations, the request for capability is received from a UE, another base station or a location server, e.g., as discussed in stage 1 of FIG. 22.

In some implementations, the base-station and/or its attached UE-function may send a message providing an indication of mobility of the base station, e.g., as discussed in stage 2 of FIG. 22. The indication of mobility of the base station comprises fully mobile, fully stationary, or occasionally mobile.

Figure 27:
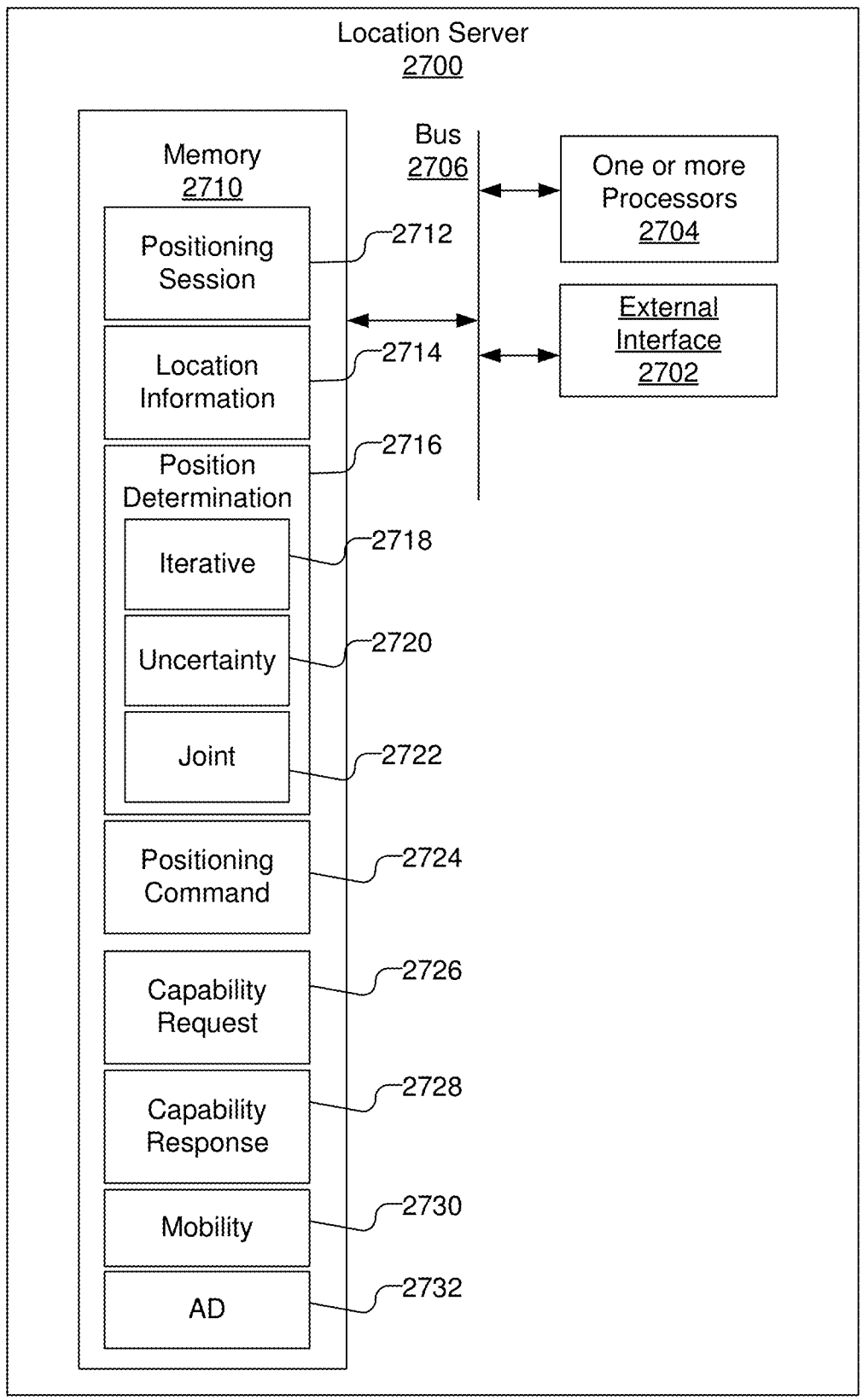
FIG. 27 is a diagram illustrating an example of a hardware implementation of a location server capable of positioning as discussed herein.

FIG. 27 is a diagram illustrating an example of a hardware implementation of a location server 2700, such as location server 101 shown in FIGS. 1 and 20-22, which may be a Location Management Function (LMF) in a NR network or a Secure User Plane Location (SUPL) Location Platform (SLP) or Enhanced Serving Mobile Location Center (eS-MLC) in LTE. The location server 2700 includes, e.g., hardware components such as an external interface 2702, which may be a wired or wireless interface capable of connecting to a base station 105 and UE 115, e.g., via intermediate network entities. The location server 2700 includes a one or more processors 2704 and memory 2710, which may be coupled together with bus 2706. The memory 2710 may contain executable code or software instructions that when executed by the one or more processors 2704 cause the one or more processors 2704 to operate as a special purpose computer programmed to perform the procedures and techniques disclosed herein.

As illustrated in FIG. 27, the memory 2710 includes one or more components or modules that when implemented by the one or more processors 2704 implements the methodologies described herein. While the components or modules are illustrated as software in memory 2710 that is executable by the one or more processors 2704, it should be understood that the components or modules may be dedicated hardware either in the processors 2704 or off processor.

As illustrated, the memory 2710 may include a positioning session unit 2712 that configures the one or more processors 2704 to engage in a positioning session, via the external interface 2702, e.g., with one or more UEs to determine a position of a base station having an unknown position and the one or more UEs. The positioning session unit 2712 may configure the one or more processors 2704 to engage in a positioning session directly with a base station, e.g., if the base station is capable of entering a UE-to-positioning server protocol session, such as LPP.

A location information unit 2714 configures the one or more processors to receive location information from one or more UEs 115 and/or base stations 105, via the external interface 2702. The location information, for example, may be a positioning measurement results. The positioning measurement results may be include downlink or uplink measurements between UEs and base stations, sidelink measurements between UEs, and measurements between base stations. The positioning measurement results may, e.g., one or more of Time Difference of Arrival (TDOA), Round Trip Time (RTT), Angle of Arrival (AoA), Angle of Departure (AoD), and signal strength. The location information may additionally or alternatively include estimated positions determined by a UE, e.g., in a UE based positioning procedure.

The memory 2710 may include a position determination unit 2716 that configures the one or more processors 2704 to determine a position estimate for the base station using received location information. A position estimate for the one or more UEs, as well as additional base stations may also be determined using the received location information.

The position determination unit 2716 may include an iterative unit 2718 that configures the one or more processors 2704 to determine a position estimate using an iterative approach. For example, an estimated position for one or more nodes, e.g., UEs or other base stations, may be determined prior to and are used in the estimation of the position of the base station. The one or more processors 2704 for example, may repeatedly identify subsets of position measurements involving nodes having known positions and determine estimated positions of individual nodes using an identified subset of position measurements, wherein an individual node with an estimated position is included in subsets of position measurements for determining estimated positions of other nodes. The position determination unit 2716 may include an uncertainty unit 2720 that configures the one or more processors 2704 to determine an uncertainty value for each estimated position based on uncertainties in the position measurements. The uncertainty values may be used by the one or more processors 2704 when identifying the subsets of position measurements to minimize an overall uncertainty value for each subset of position measurements.

The position determination unit 2716 may include a joint unit 2722 that configures the one or more processors 2704 to determine a position estimate using a joint approach. The one or more processors 2704 may estimate positions for each in a plurality of nodes, e.g., such as one or more UEs and one or more other base stations and estimate the position for the base station with an unknown position at the same time.

The memory 2710 may further include a positioning command unit 2724 that configures the one or more processors 2704 to generate and send a command message to a UE, via external interface 2702, instructing the UE to perform a positioning measurement with a node that has an unknown position, e.g., one of a base station or another UE. The command message, for example, may indicate that the positioning measurement is mandatory. The command message, for example, may indicate that the type of positioning measurement to be performed, e.g., one or more of Time Difference of Arrival (TDOA), Round Trip Time (RTT), Angle of Arrival (AoA), Angle of Departure (AoD), and signal strength. The command message may indicate that the UE is to initiate a positioning session for the UE and that positioning measurements for the node are to be included.

The memory 2710 may further include a capability request unit 2726 that configures the one or more processors 2704 to generate and send, via the external interface 2702, to a base station a request for capabilities for performing positioning procedures to determine the position of the base station. For example, the request for capabilities may be with respect to the ability to enter a UE-to-positioning server protocol procedure or performing positioning procedures, performing positioning and/or protocols, or both.

The memory 2710 may further include a capability response unit 2728 that configures the one or more processors 2704 to receive, via the external interface 2702, from a base station a capabilities response indicating the capability of performing positioning procedures to determine the position of the base station, e.g., the ability to enter a UE-to-positioning server protocol procedure or performing positioning procedures, performing positioning and/or protocols.

The memory 2710 may further include a mobility unit 2730 that may configure the one or more processors 2704 to receive, via the external interface 2702, from a base station an indication of the mobility of the base station, for example, whether the base station is fully mobile, fully stationary, or occasionally mobile.

The memory 2710 may include an assistance data unit 2732 that configures the one or more processors 2704 to generate assistance data and to forward the assistance data to a UE. The assistance data may include, e.g., locations of base stations, a previous estimated position for the UE, information for performing positioning measurements with a base station having an unknown position. The assistance data may provide an indication of the mobility of a base station, e.g., received via the mobility unit 2730. The assistance data may exclude base stations that indicate that they are mobile, e.g., fully mobile or fully mobile or occasionally mobile. If a node to be measured is another UE, the assistance data may exclude an identifier of the other UE, e.g., exclude the UE-ID. Further, the assistance data may exclude measurement timestamps for another UE or the measurement timestamps may be quantized, e.g., indicated with general descriptors such as "current," "recent," or "old."

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2710) and executed by one or more processor units (e.g. processors 2704), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2710, and are configured to cause the one or more processors (e.g. processors 2704) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A location server, such as location server 2700, may include a means for engaging in a plurality of positioning sessions to estimate positions for one or more user equipments (UEs), wherein the base station participates in at least one of the plurality of positioning sessions and at least one of the plurality of positioning sessions includes one or more other base stations having known positions, which may be, e.g., the external interface 2702 and the one or more processors 2704 with dedicated hardware for implementing executable code or software instructions in memory 2710 such as the positioning sessions module 2712. A means for receiving position measurements associated with the base station and the one or more UEs in each of the plurality of positioning sessions may be, e.g., the external interface 2702 and the one or more processors 2704 with dedicated hardware for implementing executable code or software instructions in memory 2710 such as the location information module 2714. A means for determining an estimated position for the base station using the position measurements associated with the base station and the one or more UEs may be, e.g., the one or more processors 2704 with dedicated hardware for implementing executable code or software instructions in memory 2710 such as the position determination module 2716.

A location server, such as location server 2700, may include a means for sending a command to a user equipment (UE) instructing the UE to perform a positioning measurement with the node, wherein the node comprises one of a base station or another UE, which may be, e.g., the external interface 2702 and the one or more processors 2704 with dedicated hardware for implementing executable code or software instructions in memory 2710 such as the positioning command module 2724.

Figure 28:
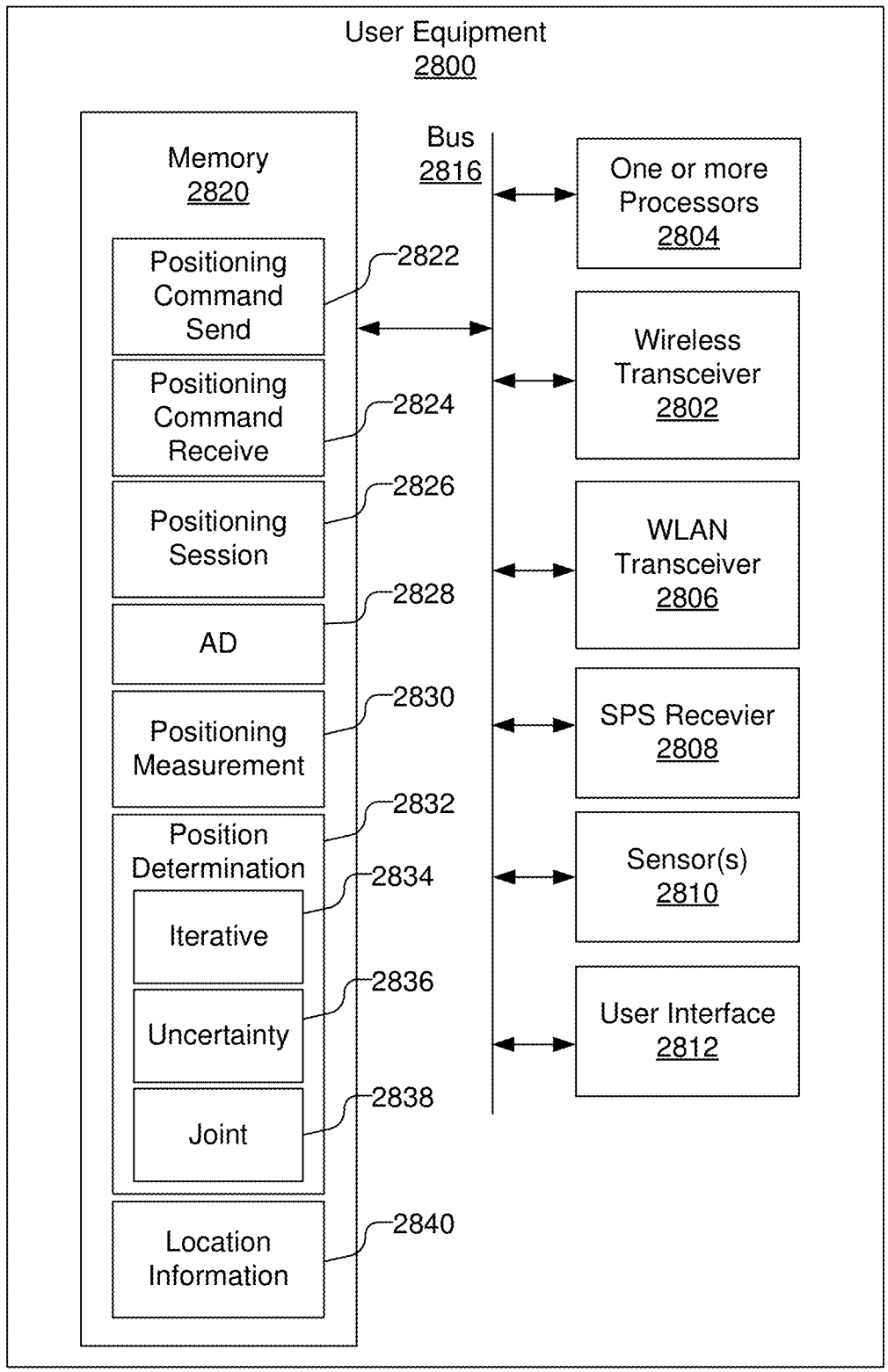
FIG. 28 is a diagram illustrating an example of a hardware implementation of a UE capable of positioning as discussed herein.

FIG. 28 is a diagram illustrating an example of a hardware implementation of UE 2800, such as UE 115. The UE 2800 may include a wireless transceiver 2802 to wirelessly communicate with a base station, e.g., base station 105. The UE 2800 may also include additional transceivers, such a wireless local area network (WLAN) transceiver 2806, as well as an SPS receiver 2808 for receiving and measuring signals from SPS SVs. The UE 2800 may further include one or more sensors 2810, such as cameras, accelerometers, gyroscopes, electronic compass, magnetometer, barometer, etc. The UE 2800 may further include a user interface 2812 that may include e.g., a display, a keypad or other input device, such as virtual keypad on the display, through which a user may interface with the UE 2800. The UE 2800 further includes one or more processors 2804 and memory 2820, which may be coupled together with bus 2816. The one or more processors 2804 and other components of the UE 2800 may similarly be coupled together with bus 2816, a separate bus, or may be directly connected together or coupled using a combination of the foregoing. The memory 2820 may contain executable code or software instructions that when executed by the one or more processors 2804 cause the one or more processors to operate as a special purpose computer programmed to perform the algorithms disclosed herein.

As illustrated in FIG. 28, the memory 2820 may include one or more components or modules that may be implemented by the one or more processors 2804 to perform the methodologies described herein. While the components or modules are illustrated as software in memory 2820 that is executable by the one or more processors 2804, it should be understood that the components or modules may be dedicated hardware either in the one or more processors 2804 or off the processors.

As illustrated, the memory 2820 may include a positioning command send unit 2822 that configures the one or more processors 2804 to generate and send to another UE, via wireless transceiver 2802, a command message instructing the other UE to perform a positioning measurement with a node that has an unknown position, e.g., one of a base station or another UE. The command message, for example, may indicate that the positioning measurement is mandatory. The command message, for example, may indicate that the type of positioning measurement to be performed, e.g., one or more of Time Difference of Arrival (TDOA), Round Trip Time (RTT), Angle of Arrival (AoA), Angle of Departure (AoD), and signal strength. The command message may indicate that the UE is to initiate a positioning session for the UE and that positioning measurements for the node are to be included.

The memory 2820 may further include a positioning command receive unit 2824 that configures the one or more processors 2804 to receive, via wireless transceiver 2802, and process a command message from a network entity, instructing the UE to perform a positioning measurement with a node that has an unknown position, e.g., one of a base station or another UE. The network entity, for example, may be a location server, a base station, another UE, and may be the node having the unknown position. The command message, for example, may indicate that the positioning measurement is mandatory. The command message, for example, may indicate that the type of positioning measurement to be performed, e.g., one or more of Time Difference of Arrival (TDOA), Round Trip Time (RTT), Angle of Arrival (AoA), Angle of Departure (AoD), and signal strength. The command message may indicate that the UE is to initiate a positioning session for the UE and that positioning measurements for the node are to be included.

The memory 2820 may include a positioning session unit 2826 that configures the one or more processors 2804 to engage in a positioning session, via the wireless transceiver 2802, e.g., to determine a position of a node having the unknown position. The positioning session unit 2826 may configure the one or more processors 2804 to engage in a positioning session to determine the position of the UE along with the node having the unknown position.

The memory 2820 may include an assistance data unit 2828 that configures the one or more processors 2804 to receive assistance data from a location server, e.g., location server 101. The assistance data may include, e.g., locations of base stations, a previous estimated position for the UE, information for performing positioning measurements with node having the unknown position. The assistance data may provide an indication of the mobility of a base station. The assistance data may exclude base stations that indicate that they are mobile, e.g., fully mobile or fully mobile or occasionally mobile. If a node to be measured is another UE, the assistance data may exclude an identifier of the other UE, e.g., exclude the UE-ID. Further, the assistance data may exclude measurement timestamps for another UE or the measurement timestamps may be quantized, e.g., indicated with general descriptors such as "current," "recent," or "old."

The memory 2820 may include a positioning measurement unit 2830 that configures the one or more processors 2804 to perform positioning measurements with the node having the unknown position, as well as other nodes, such as base stations or UEs. For example, the positioning measurement unit 2830 may configure the one or more processors 2804 to receive, via the wireless transceiver 2802, receive downlink or sidelink reference signals from the node with the unknown position and to perform positioning measurements, or to transmit uplink or sidelink reference signals, to the node for performing positioning measurements. The positioning measurements may include, for example, one or more of Time Difference of Arrival (TDOA), Round Trip Time (RTT), Angle of Arrival (AoA), Angle of Departure (AoD), and signal strength.

The memory 2820 may include a position determination unit 2832 that configures the one or more processors 2804 to determine a position estimate for the node having the unknown position, e.g., in a UE based positioning procedure, using the position measurements and information from the assistance data, and any additional location information received, e.g., from the node or other UEs or base stations. A position estimate may be for the node, as well as for the UE, as well as for other UEs and base stations.

The position determination unit 2832 may include an iterative unit 2834 that configures the one or more processors 2804 to determine a position estimate using an iterative approach. For example, an estimated position for one or more nodes, e.g., UEs or other base stations, may be determined prior to and are used in the estimation of the position of the node. The one or more processors 2804 for example, may repeatedly identify subsets of position measurements involving nodes having known positions and determine estimated positions of individual nodes using an identified subset of position measurements, wherein an individual node with an estimated position is included in subsets of position measurements for determining estimated positions of other nodes. The position determination unit 2832 may include an uncertainty unit 2836 that configures the one or more processors 2804 to determine an uncertainty value for each estimated position based on uncertainties in the position measurements. The uncertainty values may be used by the one or more processors 2804 when identifying the subsets of position measurements to minimize an overall uncertainty value for each subset of position measurements.

The position determination unit 2832 may include a joint unit 2838 that configures the one or more processors 2804 to determine a position estimate using a joint approach. The one or more processors 2804 may estimate positions for each in a plurality of nodes, e.g., such as one or more UEs and one or more other base stations and estimate the position for the base station with an unknown position at the same time.

A location information unit 2840 configures the one or more processors 2804 to send to a location server, via the wireless transceiver 2802, location information for the node, as well as the UE or any other nodes. The location information, for example, may be positioning measurement results obtained using positioning measurement unit 2830 and/or the position estimate obtained using position determination unit 2832.

The methodologies described herein may be implemented by various means depending upon the application. For example, these methodologies may be implemented in hardware, firmware, software, or any combination thereof. For a hardware implementation, the one or more processors 2804 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 2800 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2820) and executed by one or more processors 2804, causing the one or more processors 2804 to operate as a special purpose computer programmed to perform the techniques disclosed herein. Memory may be implemented within the one or processors 2804 or external to the one or more processors 2804. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 2800 may be stored as one or more instructions or code on a non-transitory computer-readable storage medium such as memory 2820. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 2800 may be provided as signals on transmission media included in a communication apparatus. For example, a communication apparatus comprising part or all of UE 2800 may include a transceiver having signals indicative of instructions and data. The instructions and data are stored on non-transitory computer readable media, e.g., memory 2820, and are configured to cause the one or more processors 2804 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A user equipment (UE), such as UE 2800 may include a means for receiving a command from a network entity in the wireless network, the command instructing the UE to perform a positioning measurement with the node, wherein the node comprises one of a base station or another UE, which may be, e.g., the external interface (wireless transceiver) 2802 and the one or more processors 2804 with dedicated hardware for implementing executable code or software instructions in memory 2810 such as the positioning command receive module 2824. A means for performing a position measurement with the node may be, e.g., the external interface (wireless transceiver) 2802 and the one or more processors 2804 with dedicated hardware for implementing executable code or software instructions in memory 2810 such as the positioning measurement module 2830.

A user equipment (UE), such as UE 2800, may include a means for sending a command to a user equipment (UE) instructing the UE to perform a positioning measurement with the node, wherein the node comprises one of a base station or another UE, which may be, e.g., the external interface (wireless transceiver) 2802 and the one or more processors 2804 with dedicated hardware for implementing executable code or software instructions in memory 2810 such as the positioning command send module 2822.

Figure 29:
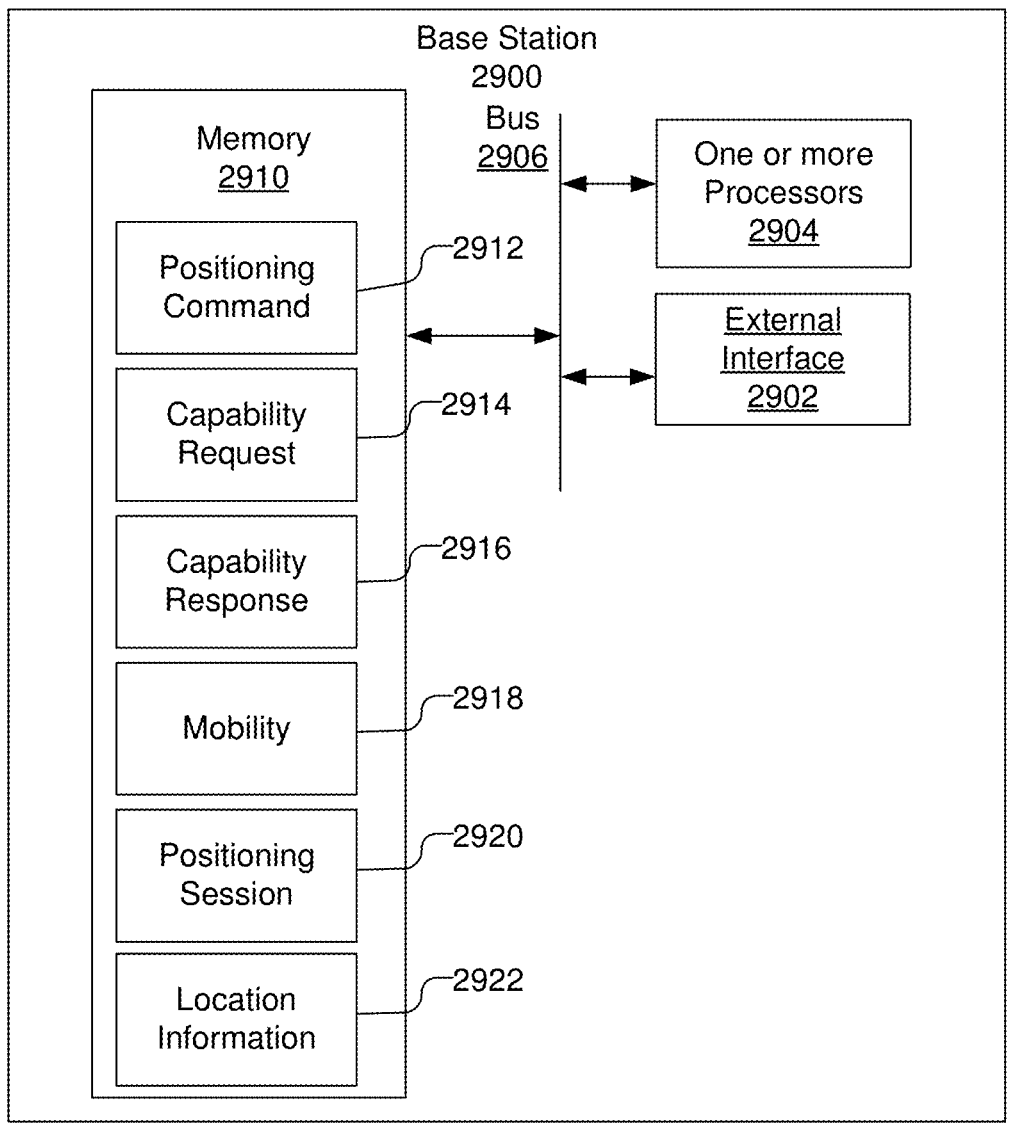
FIG. 29 is a diagram illustrating an example of a hardware implementation of a base station capable of positioning as discussed herein.

FIG. 29 is a diagram illustrating an example of a hardware implementation of a base station 2900, such as base station 105. The base station 2900 includes, e.g., hardware components such as an external interface 2902, which may be a wired and/or wireless interface capable of connecting to an location server, such as location server 101, and capable of wirelessly connecting to UE 115. The base station 2900 includes a one or more processors 2904 and memory 2910, which may be coupled together with bus 2906. The memory 2910 may contain executable code or software instructions that when executed by the one or more processors 2904 cause the one or more processors 2904 to operate as a special purpose computer programmed to perform the procedures and techniques disclosed herein.

As illustrated in FIG. 29, the memory 2910 includes one or more components or modules that when implemented by the one or more processors 2904 implements the methodologies as described herein. While the components or modules are illustrated as software in memory 2910 that is executable by the one or more processors 2904, it should be understood that the components or modules may be dedicated hardware either in the processor or off processor.

As illustrated, the memory 2910 may include a positioning command unit 2912 that configures the one or more processors 2904 to generate and send a command message to a UE, via external interface 2902, instructing the UE to perform a positioning measurement with a node that has an unknown position, e.g., one of a base station or another UE. The command message, for example, may indicate that the positioning measurement is mandatory. The command message, for example, may indicate that the type of positioning measurement to be performed, e.g., one or more of Time Difference of Arrival (TDOA), Round Trip Time (RTT), Angle of Arrival (AoA), Angle of Departure (AoD), and signal strength. The command message may indicate that the UE is to initiate a positioning session for the UE and that positioning measurements for the node are to be included.

The memory 2910 may further include a capability request unit 2914 that configures the one or more processors 2904 to receive, via the external interface 2902, from a location server a request for capabilities for performing positioning procedures to determine the position of the base station. For example, the request for capabilities may be with respect to the ability to enter a UE-to-positioning server protocol procedure or performing positioning procedures, performing positioning and/or protocols, or both.

The memory 2910 may further include a capability response unit 2916 that configures the one or more processors 2904 to send, via the external interface 2902, to a location server a capabilities response indicating the capability of performing positioning procedures to determine the position of the base station, e.g., the ability to enter a UE-to-positioning server protocol procedure or performing positioning procedures, performing positioning and/or protocols.

The memory 2910 may further include a mobility unit 2918 or a similar unit that may configure the one or more processors 2904 to send, via the external interface 2902, to a location server an indication of the mobility of the base station, for example, whether the base station is fully mobile, fully stationary, or occasionally mobile.

The memory 2910 may further include a positioning session unit 2920 that configures the one or more processors 2904 to engage in a positioning session, via the external interface 2902, e.g., with one or more UEs, one or more other base stations, a location server or a combination thereof. For example, the base station may engage in a positioning session with a plurality of network entities having known positions to determine a position of the base station. The base station may enter a positioning session using a UE-to-positioning server protocol, such as LPP and may concurrently enter a positioning session using a base station-to-positioning server protocol, such as NRPPa. The base station may perform positioning measurements with one or more network entities having known positions to determine a position of the base station. The positioning measurements, for example, may include one or more of Time Difference of Arrival (TDOA), Round Trip Time (RTT), Angle of Arrival (AoA), Angle of Departure (AoD), and signal strength.

The memory 2910 may further include a location information unit 2922 that configures the one or more processors 2904 to transmit location information to a location server or UE, via the external interface 2902. The location information, for example, may be positioning measurement results determined during the positioning session.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2910, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A base station, such as base station 2900, may include a means for receiving a request for capability of performing positioning procedures to determine a position of the base station, which may be, e.g., the external interface 2902 and the one or more processors 2904 with dedicated hardware for implementing executable code or software instructions in memory 2910 such as the capability request module 2914. A means for responding to the request indicating the capability of performing positioning procedures to determine the position of the base station may be, e.g., the external interface 2902 and the one or more processors 2904 with dedicated hardware for implementing executable code or software instructions in memory 2910 such as the capability response module 2916.

A base station, such as base station 2900, may include a means for sending a command to a user equipment (UE) instructing the UE to perform a positioning measurement with the node, wherein the node comprises one of a base station or another UE, which may be, e.g., the external interface 2902 and the one or more processors 2904 with dedicated hardware for implementing executable code or software instructions in memory 2910 such as the positioning command module 2912.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In one implementation (1) a method for positioning for an integrated access backhaul (IAB) node with an unknown position in a wireless network performed by a location server, wherein the IAB node comprises a mobile terminated (MT) function and a distributed unit (DU) function, the method comprises: receiving location information from the IAB node, the location information comprising positioning measurements from reference signals received by the IAB node for positioning from multiple nodes in the wireless network; and determining a position for the IAB node using the received location information.

There may be some implementations (2) of the above-described method (1), wherein the reference signals are received by the MT function in the IAB node and the multiple nodes are base stations comprising one or more of parent IAB-DUs, non-IAB nodes or other IAB nodes.

There may be some implementations (3) of the above-described method (1), wherein the reference signals are received by the DU function in the IAB node and the multiple nodes comprise user equipments (UEs) or MT functions of downstream IAB nodes.

In one implementation (4) a location server configured to perform positioning for an integrated access backhaul (IAB) node with an unknown position in a wireless network, wherein the IAB node comprises a mobile terminated (MT) function and a distributed unit (DU) function, the location server comprises: an external interface configured to communicate with other nodes in the wireless network; at least one memory; and at least one processor coupled to the external interface and the at least one memory, the at least one processor configured to: receive location information from the IAB node, the location information comprising positioning measurements from reference signals received by the IAB node for positioning from multiple nodes in the wireless network; and determine a position for the IAB node using the received location information.

There may be some implementations (5) of the above-described location server (4), wherein the reference signals are received by the MT function in the IAB node and the multiple nodes are base stations comprising one or more of parent IAB-DUs, non-IAB nodes or other IAB nodes.

There may be some implementations (6) of the above-described location server (4), wherein the reference signals are received by the DU function in the IAB node and the multiple nodes comprise user equipments (UEs) or MT functions of downstream IAB nodes.

In one implementation (7) a location server configured to perform positioning for an integrated access backhaul (IAB) node with an unknown position in a wireless network, wherein the IAB node comprises a mobile terminated (MT) function and a distributed unit (DU) function, the location server comprises: means for receiving location information from the IAB node, the location information comprising positioning measurements from reference signals received by the IAB node for positioning from multiple nodes in the wireless network; and means for determining a position for the IAB node using the received location information.

There may be some implementations (8) of the above-described location server (7), wherein the reference signals are received by the MT function in the IAB node and the multiple nodes are base stations comprising one or more of parent IAB-DUs, non-IAB nodes or other IAB nodes.

There may be some implementations (9) of the above-described location server (7), wherein the reference signals are received by the DU function in the IAB node and the multiple nodes comprise user equipments (UEs) or MT functions of downstream IAB nodes.

In one implementation (10) a non-transitory storage medium including program code stored thereon, the program code is operable to configure at least one processor in a location server to perform positioning for an integrated access backhaul (IAB) node with an unknown position in a wireless network, wherein the IAB node comprises a mobile terminated (MT) function and a distributed unit (DU) function, the non-transitory storage medium comprises: program code to receive location information from the IAB node, the location information comprising positioning measurements from reference signals received by the IAB node for positioning from multiple nodes in the wireless network; and program code to determine a position for the IAB node using the received location information.

There may be some implementations (11) of the above-described non-transitory storage medium (10), wherein the reference signals are received by the MT function in the IAB node and the multiple nodes are base stations comprising one or more of parent IAB-DUs, non-IAB nodes or other IAB nodes.

There may be some implementations (12) of the above-described non-transitory storage medium (10), wherein the reference signals are received by the DU function in the IAB node and the multiple nodes comprise user equipments (UEs) or MT functions of downstream IAB nodes.

In one implementation (13) a method for positioning a user equipment (UE) performed by a location server, the method comprises: receiving from an integrated access backhaul (IAB) node an indication of mobility of the IAB node; and using the indication of mobility of the IAB node for positioning of the UE.

There may be some implementations (14) of the above-described method (13), wherein the indication of mobility comprises fully mobile, fully stationary, or occasionally mobile.

There may be some implementations (15) of the above-described method (13), wherein the using the indication of mobility of the IAB node for positioning of the UE comprises generating positioning assistance data for UE excluding the IAB node when the indication of mobility of the IAB node indicates that the IAB node is mobile.

There may be some implementations (16) of the above-described method (13), wherein the using the indication of mobility of the IAB node for positioning of the UE comprises: receiving positioning measurements generated using the IAB node; and excluding the positioning measurements generated using the IAB node for positioning of the UE when the indication of mobility of the IAB node indicates that the IAB node is mobile.

In one implementation (17) a location server configured to perform positioning for a user equipment (UE), the location server comprises: an external interface configured to communicate with other nodes in a wireless network; at least one memory; and at least one processor coupled to the external interface and the at least one memory, the at least one processor configured to: receive from an integrated access backhaul (IAB) node an indication of mobility of the IAB node; and use the indication of mobility of the IAB node for positioning of the UE.

There may be some implementations (18) of the above-described location server (17), wherein the indication of mobility comprises fully mobile, fully stationary, or occasionally mobile.

There may be some implementations (19) of the above-described location server (17), wherein the at least one processor is configured to use the indication of mobility of the IAB node for positioning of the UE by being configured to generate positioning assistance data for UE excluding the IAB node when the indication of mobility of the IAB node indicates that the IAB node is mobile.

There may be some implementations (20) of the above-described location server (17), wherein the at least one processor is configured to use the indication of mobility of the IAB node for positioning of the UE by being configured to: receive positioning measurements generated using the IAB node; and exclude the positioning measurements generated using the IAB node for positioning of the UE when the indication of mobility of the IAB node indicates that the IAB node is mobile.

In one implementation (21) a location server configured to perform positioning for a user equipment (UE), the location server comprises: means for receiving from an integrated access backhaul (IAB) node an indication of mobility of the IAB node; and means for using the indication of mobility of the IAB node for positioning of the UE.

There may be some implementations (22) of the above-described location server (21), wherein the indication of mobility comprises fully mobile, fully stationary, or occasionally mobile.

There may be some implementations (23) of the above-described location server (21), wherein the means for using the indication of mobility of the IAB node for positioning of the UE comprises means for generating positioning assistance data for UE excluding the IAB node when the indication of mobility of the IAB node indicates that the IAB node is mobile.

There may be some implementations (24) of the above-described location server (21), wherein the means for using the indication of mobility of the IAB node for positioning of the UE comprises: means for receiving positioning measurements generated using the IAB node; and means for excluding the positioning measurements generated using the IAB node for positioning of the UE when the indication of mobility of the IAB node indicates that the IAB node is mobile.

In one implementation (25) a non-transitory storage medium including program code stored thereon, the program code is operable to configure at least one processor in a location server to perform positioning for a user equipment (UE), the non-transitory storage medium comprises: program code to receive from an integrated access backhaul (IAB) node an indication of mobility of the IAB node; and program code to use the indication of mobility of the IAB node for positioning of the UE.

There may be some implementations (26) of the above-described non-transitory storage medium (25), wherein the indication of mobility comprises fully mobile, fully stationary, or occasionally mobile.

There may be some implementations (27) of the above-described non-transitory storage medium (25), wherein the program code to use the indication of mobility of the IAB node for positioning of the UE comprises program code to generate positioning assistance data for UE excluding the IAB node when the indication of mobility of the IAB node indicates that the IAB node is mobile.

There may be some implementations (28) of the above-described non-transitory storage medium (25), wherein the program code to use the indication of mobility of the IAB node for positioning of the UE comprises: program code to receive positioning measurements generated using the IAB node; and program code to exclude the positioning measurements generated using the IAB node for positioning of the UE when the indication of mobility of the IAB node indicates that the IAB node is mobile.

In one implementation (29) a method for positioning a user equipment (UE) performed by the UE, the method comprises: receiving positioning assistance data from a location server including an indication of mobility for an integrated access backhaul (IAB) node; and performing positioning measurements from a plurality of base stations, wherein the indication of mobility of the IAB node is used during the positioning measurements.

There may be some implementations (30) of the above-described method (29), wherein performing positioning measurements from the plurality of base stations comprises excluding generating positioning measurements using the IAB node when the indication of mobility of the IAB node indicates that the IAB node is mobile.

In one implementation (31) a user equipment (UE) configured to perform positioning for the UE, the UE comprises: a wireless transceiver configured to communicate with base stations in a wireless network; at least one memory; and at least one processor coupled to the wireless transceiver and the at least one memory, the at least one processor configured to: receive positioning assistance data from a location server including an indication of mobility for an integrated access backhaul (IAB) node; and perform positioning measurements from a plurality of base stations, wherein the indication of mobility of the IAB node is used during the positioning measurements.

There may be some implementations (32) of the above-described UE (31), wherein the at least one processor is configured to perform positioning measurements from the plurality of base stations by being configured to exclude generating positioning measurements using the IAB node when the indication of mobility of the IAB node indicates that the IAB node is mobile.

In one implementation (33) a user equipment (UE) configured to perform positioning for the UE, the UE comprises: means for receiving positioning assistance data from a location server including an indication of mobility for an integrated access backhaul (IAB) node; and means for performing positioning measurements from a plurality of base stations, wherein the indication of mobility of the IAB node is used during the positioning measurements.

There may be some implementations (34) of the above-described UE (33), wherein the means for performing positioning measurements from the plurality of base stations excludes generating positioning measurements using the IAB node when the indication of mobility of the IAB node indicates that the IAB node is mobile.

In one implementation (35) a non-transitory storage medium including program code stored thereon, the program code is operable to configure at least one processor in a user equipment (UE) to perform positioning for the UE, the non-transitory storage medium comprises: program code to receive positioning assistance data from a location server including an indication of mobility for an integrated access backhaul (IAB) node; and program code to perform positioning measurements from a plurality of base stations, wherein the indication of mobility of the IAB node is used during the positioning measurements.

There may be some implementations (36) of the above-described non-transitory storage medium (35), wherein the program code to perform positioning measurements from the plurality of base stations excludes generating positioning measurements using the IAB node when the indication of mobility of the IAB node indicates that the IAB node is mobile.

In one implementation (37) a method for positioning for a base station with an unknown position performed by location server in a wireless network, comprising: engaging in a plurality of positioning sessions to estimate positions for one or more user equipments (UEs), wherein the base station participates in at least one of the plurality of positioning sessions and at least one of the plurality of positioning sessions includes one or more other base stations having known positions; receiving position measurements associated with the base station and the one or more UEs in each of the plurality of positioning sessions; and determining an estimated position for the base station using the position measurements associated with the base station and the one or more UEs.

There may be some implementations (38) of the above-described method (37), wherein the plurality of positioning sessions comprises a plurality of nodes in the wireless network having unknown positions, each node is one of a UE or a base station, the method further comprising determining estimated positions for each node in the plurality of nodes.

There may be some implementations (39) of the above-described method (38), wherein the estimated position for at least one node in the plurality of nodes is determined before determining the estimated position for the base station, and wherein determining the estimated position for the base station further uses the estimated positions for the at least one node in the plurality of nodes.

There may be some implementations (40) of the above-described method (38), wherein determining the estimated positions for the at least one node in the plurality of nodes comprises: repeatedly identifying subsets of position measurements involving nodes having known positions and determining estimated positions of individual nodes using an identified subset of position measurements, wherein an individual node with an estimated position is included in subsets of position measurements for determining estimated positions of other nodes.

There may be some implementations (41) of the above-described method (40), further comprising determining an uncertainty value for each estimated position based on uncertainties in the position measurements, wherein identifying the subsets of position measurements comprises minimizing an overall uncertainty value for each subset of position measurements.

There may be some implementations (42) of the above-described method (38), wherein the estimated positions for each node in the plurality of nodes and the estimated position for the base station are determined at the same time.

There may be some implementations (43) of the above-described method (38), wherein the estimated positions for each node in the plurality of nodes and the estimated position for the base station are determined using pairwise position measurements between nodes including downlink or uplink measurements between UEs and base stations, sidelink measurements between UEs, and measurements between base stations.

There may be some implementations (44) of the above-described method (43), wherein the measurements between base stations comprise measurements made by a base station or measurements made by a separate UE-function that is co-located with the base station.

There may be some implementations (45) of the above-described method (38), wherein the estimated positions for node in the plurality of nodes and the estimated position for the base station are determined using one or more of Time Difference of Arrival (TDOA), Round Trip Time (RTT), Angle of Arrival (AoA), Angle of Departure (AoD), and signal strength.

In one implementation (46) a location server configured for positioning of a base station with an unknown position in a wireless network, comprising: an external interface configured to communicate with other nodes in the wireless network; and at least one memory; and at least one processor coupled to the external interface and the at least one memory, the at least one processor configured to: engage in a plurality of positioning sessions to estimate positions for one or more user equipments (UEs), wherein the base station participates in at least one of the plurality of positioning sessions and at least one of the plurality of positioning sessions includes one or more other base stations having known positions; receive position measurements associated with the base station and the one or more UEs in each of the plurality of positioning sessions; and determine an estimated position for the base station using the position measurements associated with the base station and the one or more UEs.

There may be some implementations (47) of the above-described location server (46), wherein the plurality of positioning sessions comprises a plurality of nodes in the wireless network having unknown positions, each node is one of a UE or a base station, the method further comprising determining estimated positions for each node in the plurality of nodes.

There may be some implementations (48) of the above-described location server (47), wherein the estimated position for at least one node in the plurality of nodes is determined before determining the estimated position for the base station, and wherein determining the estimated position for the base station further uses the estimated positions for the at least one node in the plurality of nodes.

There may be some implementations (49) of the above-described location server (47), wherein the at least one processor is configured to determine the estimated positions for the at least one node in the plurality of nodes by being configured to: repeatedly identify subsets of position measurements involving nodes having known positions and determining estimated positions of individual nodes using an identified subset of position measurements, wherein an individual node with an estimated position is included in subsets of position measurements for determining estimated positions of other nodes.

There may be some implementations (50) of the above-described location server (49), wherein the at least one processor is further configured to determine an uncertainty value for each estimated position based on uncertainties in the position measurements, wherein identifying the subsets of position measurements comprises minimizing an overall uncertainty value for each subset of position measurements.

There may be some implementations (51) of the above-described location server (47), wherein the estimated positions for each node in the plurality of nodes and the estimated position for the base station are determined at the same time.

There may be some implementations (52) of the above-described location server (47), wherein the estimated positions for each node in the plurality of nodes and the estimated position for the base station are determined using pairwise position measurements between nodes including downlink or uplink measurements between UEs and base stations, sidelink measurements between UEs, and measurements between base stations.

There may be some implementations (53) of the above-described location server (52), wherein the measurements between base stations comprise measurements made by a base station or measurements made by a separate UE-function that is co-located with the base station.

There may be some implementations (54) of the above-described location server (47), wherein the estimated positions for node in the plurality of nodes and the estimated position for the base station are determined using one or more of Time Difference of Arrival (TDOA), Round Trip Time (RTT), Angle of Arrival (AoA), Angle of Departure (AoD), and signal strength.

In one implementation (55) a location server configured for positioning of a base station with an unknown position in a wireless network, comprising: means for engaging in a plurality of positioning sessions to estimate positions for one or more user equipments (UEs), wherein the base station participates in at least one of the plurality of positioning sessions and at least one of the plurality of positioning sessions includes one or more other base stations having known positions; means for receiving position measurements associated with the base station and the one or more UEs in each of the plurality of positioning sessions; and means for determining an estimated position for the base station using the position measurements associated with the base station and the one or more UEs.

In one implementation (56) a non-transitory storage medium including program code stored thereon, the program code is operable to configure at least one processor in a location server to perform positioning of a base station with an unknown position in a wireless network, comprising: program code to engage in a plurality of positioning sessions to estimate positions for one or more user equipments (UEs), wherein the base station participates in at least one of the plurality of positioning sessions and at least one of the plurality of positioning sessions includes one or more other base stations having known positions; program code to receive position measurements associated with the base station and the one or more UEs in each of the plurality of positioning sessions; and program code to determine an estimated position for the base station using the position measurements associated with the base station and the one or more UEs.

In one implementation (57) a method for positioning for a node having an unknown position in a wireless network performed by a network entity, comprising: sending a command to a user equipment (UE) instructing the UE to perform a positioning measurement with the node, wherein the node comprises one of a base station or another UE.

There may be some implementations (58) of the above-described method (57), wherein the network entity comprises one of a location server, the node having the unknown position, a base station, or another UE.

There may be some implementations (59) of the above-described method (57), wherein the command instructing the UE to perform the positioning measurement is mandatory.

There may be some implementations (60) of the above-described method (57), wherein the command instructing the UE to perform the positioning measurement specifies a type of positioning measurement.

There may be some implementations (61) of the above-described method (60), wherein the type of positioning measurement comprises one or more of Time Difference of Arrival (TDOA), Round Trip Time (RTT), Angle of Arrival (AoA), Angle of Departure (AoD), and signal strength.

There may be some implementations (62) of the above-described method (57), wherein the command instructing the UE to perform the positioning measurement comprises a command to initiate a positioning session for the UE that includes the node having the unknown position.

In one implementation (63) a network entity configured for positioning for a node having an unknown position in a wireless network, comprising: an external interface configured to communicate with other nodes in the wireless network; at least one memory; and at least one processor coupled to the external interface and the at least one memory, the at least one processor configured to: send a command to a user equipment (UE) instructing the UE to perform a positioning measurement with the node, wherein the node comprises one of a base station or another UE.

There may be some implementations (64) of the above-described network entity (63), wherein the network entity comprises one of a location server, the node having the unknown position, a base station, or another UE.

There may be some implementations (65) of the above-described network entity (63), wherein the command instructing the UE to perform the positioning measurement is mandatory.

There may be some implementations (66) of the above-described network entity (63), wherein the command instructing the UE to perform the positioning measurement specifies a type of positioning measurement.

There may be some implementations (67) of the above-described network entity (66), wherein the type of positioning measurement comprises one or more of Time Difference of Arrival (TDOA), Round Trip Time (RTT), Angle of Arrival (AoA), Angle of Departure (AoD), and signal strength.

There may be some implementations (68) of the above-described network entity (63), wherein the command instructing the UE to perform the positioning measurement comprises a command to initiate a positioning session for the UE that includes the node having the unknown position.

In one implementation (69) a network entity configured for positioning for a node having an unknown position in a wireless network, comprising: means for sending a command to a user equipment (UE) instructing the UE to perform a positioning measurement with the node, wherein the node comprises one of a base station or another UE.

In one implementation (70) a non-transitory storage medium including program code stored thereon, the program code is operable to configure at least one processor in a network entity configured for positioning for a node having an unknown position in a wireless network, comprising: program code to send a command to a user equipment (UE) instructing the UE to perform a positioning measurement with the node, wherein the node comprises one of a base station or another UE.

In one implementation (71) a method for positioning for a node having an unknown position in a wireless network performed by a user equipment (UE), comprising: receiving a command from a network entity in the wireless network, the command instructing the UE to perform a positioning measurement with the node, wherein the node comprises one of a base station or another UE; and performing a position measurement with the node.

There may be some implementations (72) of the above-described method (71), wherein the network entity comprises one of a location server, the node having the unknown position, a base station, or another UE.

There may be some implementations (73) of the above-described method (71), wherein the command instructing the UE to perform the positioning measurement is mandatory.

There may be some implementations (74) of the above-described method (71), wherein the command instructing the UE to perform the positioning measurement specifies a type of positioning measurement.

There may be some implementations (75) of the above-described method (74), wherein the type of positioning measurement comprises one or more of downlink Time Difference of Arrival (TDOA), Round Trip Time (RTT), Angle of Arrival (AoA), and Angle of Departure (AoD).

There may be some implementations (76) of the above-described method (71), wherein performing the position measurement with the node comprises transmitting or receiving a reference signal to or from the node.

There may be some implementations (77) of the above-described method (71), wherein the command instructing the UE to perform the positioning measurement comprises a command to initiate a positioning session for the UE that includes the node having the unknown position.

There may be some implementations (78) of the above-described method (71), further comprising transmitting the position measurement to a location server.

There may be some implementations (79) of the above-described method (71), further comprising receiving assistance data for performing the positioning measurement with the node.

There may be some implementations (80) of the above-described method (79), wherein the node is the another UE, and wherein a UE-ID is not included in the assistance data.

There may be some implementations (81) of the above-described method (79), wherein the node is the another UE, and wherein the assistance data does not include measurement timestamps for the another UE or the measurement timestamps are quantized.

In one implementation (82) a user equipment (UE) configured for positioning for a node having an unknown position in a wireless network, comprising: an external interface configured to communicate with other nodes in the wireless network; at least one memory; and at least one processor coupled to the external interface and the at least one memory, the at least one processor configured to: receiving a command from a network entity in the wireless network, the command instructing the UE to perform a positioning measurement with the node, wherein the node comprises one of a base station or another UE; and performing a position measurement with the node.

There may be some implementations (83) of the above-described UE (82), wherein the network entity comprises one of a location server, the node having the unknown position, a base station, or another UE.

There may be some implementations (84) of the above-described UE (82), wherein the command instructing the UE to perform the positioning measurement is mandatory.

There may be some implementations (85) of the above-described UE (82), wherein the command instructing the UE to perform the positioning measurement specifies a type of positioning measurement.

There may be some implementations (86) of the above-described UE (85), wherein the type of positioning measurement comprises one or more of downlink Time Difference of Arrival (TDOA), Round Trip Time (RTT), Angle of Arrival (AoA), and Angle of Departure (AoD).

There may be some implementations (87) of the above-described UE (82), wherein the at least one processor is configured to perform the position measurement with the node by being configured to transmit or receive a reference signal to or from the node.

There may be some implementations (88) of the above-described UE (82), wherein the command instructing the UE to perform the positioning measurement comprises a command to initiate a positioning session for the UE that includes the node having the unknown position.

There may be some implementations (89) of the above-described UE (82), wherein the at least one processor is further configured to transmit the position measurement to a location server.

There may be some implementations (90) of the above-described UE (82), wherein the at least one processor is further configured to receive assistance data for performing the positioning measurement with the node.

There may be some implementations (91) of the above-described UE (90), wherein the node is the another UE, and wherein a UE-ID is not included in the assistance data.

There may be some implementations (92) of the above-described UE (90), wherein the node is the another UE, and wherein the assistance data does not include measurement timestamps for the another UE or the measurement timestamps are quantized.

In one implementation (93) a user equipment (UE) configured for positioning for a node having an unknown position in a wireless network, comprising: means for receiving a command from a network entity in the wireless network, the command instructing the UE to perform a positioning measurement with the node, wherein the node comprises one of a base station or another UE; and means for performing a position measurement with the node.

In one implementation (94) a non-transitory storage medium including program code stored thereon, the program code is operable to configure at least one processor in a user equipment (UE) configured for positioning for a node having an unknown position in a wireless network, comprising: program code to receive a command from a network entity in the wireless network, the command instructing the UE to perform a positioning measurement with the node, wherein the node comprises one of a base station or another UE; and program code to perform a position measurement with the node.

In one implementation (95) a method for positioning for a base station having an unknown position in a wireless network performed by the base station, comprising: receiving a request for capability of performing positioning procedures to determine a position of the base station; and responding to the request indicating the capability of performing positioning procedures to determine the position of the base station.

There may be some implementations (96) of the above-described method (95), wherein the request for capability is with respect to ability to enter a UE-to-positioning server protocol session, and wherein responding to the request indicates a capability to enter a UE-to-positioning server protocol session or a capability of limited UE functions comprising performing positioning procedures, performing positioning protocols, or both.

There may be some implementations (97) of the above-described method (96), wherein the responding to the request indicates a capability a capability to enter a UE-to-positioning server protocol session, the method further comprising: engaging in a positioning session with a plurality of network entities having known positions to determine a position of the base station.

There may be some implementations (98) of the above-described method (96), wherein the responding to the request indicates a capability to enter a UE to positioning server protocol session, the method further comprising: entering a positioning session using the UE to positioning server protocol; and concurrently entering a positioning session using a base station to positioning server protocol.

There may be some implementations (99) of the above-described method (96), wherein the responding to the request indicates a capability of limited UE functions comprising performing positioning procedures, performing positioning protocols, or both, the method further comprising: performing positioning measurements with one or more network entities having known positions to determine a position of the base station. 1

There may be some implementations (100) of the above-described method (95), wherein the request for capability is received from a UE, another base station or a location server. 1

There may be some implementations (101) of the above-described method (95), further comprising sending a message providing an indication of mobility of the base station. 1

There may be some implementations (102) of the above-described method (101), wherein the indication of mobility of the base station comprises fully mobile, fully stationary, or occasionally mobile. 1

In one implementation (103) a base station configured for positioning the base station which has an unknown position in a wireless network, comprising: an external interface configured to communicate with other nodes in the wireless network; at least one memory; and at least one processor coupled to the external interface and the at least one memory, the at least one processor configured to: receive a request for capability of performing positioning procedures to determine a position of the base station; and respond to the request indicating the capability of performing positioning procedures to determine the position of the base station. 1

There may be some implementations (104) of the above-described base station (103), wherein the request for capability is with respect to ability to enter a UE-to-positioning server protocol session, and wherein responding to the request indicates a capability to enter a UE-to-positioning server protocol session or a capability of limited UE functions comprising performing positioning procedures, performing positioning protocols, or both. 1

There may be some implementations (105) of the above-described base station (104), wherein the responding to the request indicates a capability a capability to enter a UE-to-positioning server protocol session, the at least one processor further configured to: engage in a positioning session with a plurality of network entities having known positions to determine a position of the base station. 1

There may be some implementations (106) of the above-described base station (104), wherein the responding to the request indicates a capability to enter a UE to positioning server protocol session, the at least one processor further configured to: enter a positioning session using the UE to positioning server protocol; and concurrently enter a positioning session using a base station to positioning server protocol. 1

There may be some implementations (107) of the above-described base station (104), wherein the responding to the request indicates a capability of limited UE functions comprising performing positioning procedures, performing positioning protocols, or both, the at least one processor further configured to: perform positioning measurements with one or more network entities having known positions to determine a position of the base station. 1

There may be some implementations (108) of the above-described base station (103), wherein the request for capability is received from a UE, another base station or a location server. 1

There may be some implementations (109) of the above-described base station (103), wherein the at least one processor further configured send a message providing an indication of mobility of the base station. 1

There may be some implementations (110) of the above-described base station (109), wherein the indication of mobility of the base station comprises fully mobile, fully stationary, or occasionally mobile. 1

In one implementation (111) a base station configured for positioning the base station which has an unknown position in a wireless network, comprising: means for receiving a request for capability of performing positioning procedures to determine a position of the base station; and means for responding to the request indicating the capability of performing positioning procedures to determine the position of the base station. 1

In one implementation (112) a non-transitory storage medium including program code stored thereon, the program code is operable to configure at least one processor in base station configured for positioning the base station which has an unknown position in a wireless network, comprising: program code to receive a request for capability of performing positioning procedures to determine a position of the base station; and program code to respond to the request indicating the capability of performing positioning procedures to determine the position of the base station.

Therefore, it is intended that claimed subject matter not be limited to the particular examples disclosed, but that such claimed subject matter may also include all aspects falling within the scope of appended claims, and equivalents thereof.

What is claimed is:

1. A method, on an integrated access backhaul (IAB) node in a wireless network, for positioning of the IAB node, wherein the IAB node comprises a mobile terminated (MT) function and a distributed unit (DU) function, the method comprising:
    sending or receiving messages between the MT function of the IAB node and a location server that is in a core network, via a parent IAB node of the IAB node and a function of a donor IAB node for access to the core network, for one or more positioning sessions to determine a position of the IAB node, wherein the parent IAB node is communicatively between the IAB node and the donor IAB node; and
    sending or receiving reference signals for positioning of the IAB node to or from the MT function of the IAB node and the DU function of another node of multiple nodes in the wireless network in the one or more positioning sessions, wherein the another node of the multiple nodes is the parent IAB node, wherein positioning measurements are made using the reference signals and the multiple nodes comprise multiple base stations in the wireless network.

2. The method of claim 1, wherein the multiple nodes comprise user equipments (UEs) or MT functions of downstream IAB nodes.

3. The method of claim 1, wherein the multiple nodes comprise non-IAB nodes or other IAB nodes.

4. The method of claim 3, wherein the multiple nodes comprise ancestors, descendants, or other nodes of a same donor IAB DU or donor IAB central unit (CU), or nodes of a different donor IAB DU or different donor IAB CU.

5. The method of claim 3, wherein the multiple nodes comprise multiple parent IAB-DUs.

6. The method of claim 5, wherein the IAB node engages in a plurality of positioning sessions, and wherein the MT function sends or receives reference signals for positioning to or from one parent IAB-DU in each positioning session.

7. The method of claim 6, further comprising performing one or more of reception and transmission time (Rx-Tx), Round Trip Time (RTT), Angle of Arrival (AoA), Angle of Departure (AoD), and signal strength positioning measurements with each parent IAB-DU.

8. The method of claim 5, wherein the IAB node engages in one positioning session, and wherein the MT function sends or receives reference signals for positioning to or from the multiple parent IAB-DUs in the one positioning session.

9. The method of claim 8, further comprising performing one or more of Time Difference of Arrival (TDOA), reception and transmission time (Rx-Tx), Round Trip Time (RTT), Angle of Arrival (AoA), Angle of Departure (AoD), and signal strength positioning measurements with the multiple parent IAB-DUs.

10. The method of claim 5, wherein the positions of one or more of the multiple parent IAB-DUs are determined prior to determining the position of the IAB node.

11. The method of claim 10, wherein the position of the IAB node is determined using the positions of the one or more of the multiple parent IAB-DUs.

12. The method of claim 1, wherein the reference signals for positioning comprise at least one of downlink positioning reference signals (PRS), uplink PRS, sounding reference signals (SRS), synchronization signal block (SSB) signals, and channel state information reference signals (CSI-RS), or a combination thereof.

13. The method of claim 1, wherein the reference signals are sent or received with the DU function and the multiple nodes comprise user equipments (UEs) or MT functions of downstream IAB nodes.

14. The method of claim 1, wherein a message sent or received in the one or more positioning sessions comprises a message to indicate a capability to send or receive reference signals to one or more parent IAB-DUs, non-IAB nodes or other IAB nodes.

15. The method of claim 1, further comprising:
performing positioning measurements based on the reference signals received from one or more nodes in the wireless network; and
wherein a message sent in the one or more positioning sessions comprises location information based on the positioning measurements to the location server for positioning of the IAB node.

16. The method of claim 15, wherein the location server receives an indication of mobility of the IAB node.

17. The method of claim 1, wherein the DU function of the IAB node is used for positioning if the DU function and the MT function of the IAB node are not co-located.

18. The method of claim 1, wherein the DU function and the MT function are used together to determine the position of the IAB node.

19. An integrated access backhaul (IAB) node in a wireless network configured to perform positioning for the IAB node, wherein the IAB node comprises a mobile terminated (MT) function and a distributed unit (DU) function, the IAB node comprising:
an external interface configured to communicate with other nodes in the wireless network;
at least one memory; and
at least one processor coupled to the external interface and the at least one memory, the at least one processor configured to:
send or receive messages between the MT function of the IAB node and a location server that is in a core network, via a parent IAB node of the IAB node and a function of a donor IAB node for access to the core network, for one or more positioning sessions to determine a position of the IAB node, wherein the parent IAB node is communicatively between the IAB node and the donor IAB node; and
send or receive reference signals for positioning of the IAB node to or from the MT function of the IAB node and the DU function of another node of multiple nodes in the wireless network in the one or more positioning sessions, wherein the another node of the multiple nodes is the parent IAB node, wherein positioning measurements are made using the reference signals and the multiple nodes comprise multiple base stations in the wireless network.

20. The IAB node of claim 19, wherein the at least one processor is further configured to send or receive reference signals for positioning with the DU function to or from multiple nodes in the wireless network, wherein the multiple nodes comprise user equipments (UEs) or MT functions of downstream IAB nodes.

21. The IAB node of claim 19, wherein the multiple nodes comprise non-IAB nodes or other IAB nodes.

22. The IAB node of claim 21, wherein the multiple nodes comprise ancestors, descendants, or other nodes of a same donor IAB DU or donor IAB central unit (CU), or nodes of a different donor IAB DU or different donor IAB CU.

23. The IAB node of claim 21, wherein the multiple nodes comprise multiple parent IAB-DUs.

24. The IAB node of claim 23, wherein the IAB node engages in a plurality of positioning sessions, and wherein the MT function sends or receives reference signals for positioning to or from one parent IAB-DU in each positioning session.

25. The IAB node of claim 24, wherein the at least one processor is further configured to perform one or more of reception and transmission time (Rx-Tx), Round Trip Time (RTT), Angle of Arrival (AoA), Angle of Departure (AoD), and signal strength positioning measurements with each parent IAB-DU.

26. The IAB node of claim 23, wherein the IAB node engages in one positioning session, and wherein the MT function sends or receives reference signals for positioning to or from the multiple parent IAB-DUs in the one positioning session.

27. The IAB node of claim 26, wherein the at least one processor is further configured to perform one or more of Time Difference of Arrival (TDOA), reception and transmission time (Rx-Tx), Round Trip Time (RTT), Angle of Arrival (AoA), Angle of Departure (AoD), and signal strength positioning measurements with the multiple parent IAB-DUs.

28. The IAB node of claim 19, wherein the reference signals for positioning comprise at least one of downlink positioning reference signals (PRS), uplink PRS, sounding reference signals (SRS), synchronization signal block (SSB) signals, and channel state information reference signals (CSI-RS), or a combination thereof.

29. The IAB node of claim 19, wherein to send or receive the reference signals, the at least one processor is configured to send or receive the reference signals with the DU function and the multiple nodes comprise user equipments (UEs) or MT functions of downstream IAB nodes.

30. The IAB node of claim 19, wherein a message sent or received in the one or more positioning sessions comprises a message to indicate a capability to send or receive reference signals to one or more parent IAB-DUs, non-IAB nodes or other IAB nodes.

31. The IAB node of claim 19, wherein the at least one processor is further configured to:
perform positioning measurements based on the reference signals received from one or more nodes in the wireless network; and wherein a message sent in the one or more positioning sessions comprises location information based on the positioning measurements to the location server for positioning of the IAB node.

32. An integrated access backhaul (IAB) node in a wireless network configured to perform positioning for the IAB node, wherein the IAB node comprises a mobile terminated (MT) function and a distributed unit (DU) function, the IAB node comprising:
  means for sending or receiving messages between the MT function of the IAB node and a location server that is in a core network, via a parent IAB node of the IAB node and a function of a donor IAB node for access to the core network, for one or more positioning sessions to determine a position of the IAB node, wherein the parent IAB node is communicatively between the IAB node and the donor IAB node; and
  means for sending or receiving reference signals for positioning of the IAB node to or from the MT function of the IAB node and the DU function of another node of multiple nodes in the wireless network in the wireless network in the one or more positioning sessions, wherein the another node of the multiple nodes is the parent IAB node, wherein positioning measurements are made using the reference signals and the multiple nodes comprise multiple base stations in the wireless network.

33. A non-transitory storage medium including program code stored thereon, the program code is operable to configure at least one processor in an integrated access backhaul (IAB) node in a wireless network to perform positioning for the IAB node, wherein the IAB node comprises a mobile terminated (MT) function and a distributed unit (DU) function, the non-transitory storage medium comprising:
  program code to send or receive messages between the MT function of the IAB node and a location server that is in a core network, via a parent IAB node of the IAB node and a function of a donor IAB node for access to the core network, for one or more positioning sessions to determine a position of the IAB node, wherein the parent IAB node is communicatively between the IAB node and the donor IAB node; and
  program code to send or receive reference signals for positioning of the IAB node to or from the MT function of the IAB node and the DU function of another node of multiple nodes in the wireless network in the one or more positioning sessions, wherein the another node of the multiple nodes is the parent IAB node, wherein positioning measurements are made using the reference signals and the multiple nodes comprise multiple base stations in the wireless network.

* * * * *